US011990074B2

(12) United States Patent
Zhang et al.

(10) Patent No.: US 11,990,074 B2
(45) Date of Patent: May 21, 2024

(54) DISPLAY DRIVING METHOD FOR INCREASING CHARGING DURATION AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Yinlong Zhang, Beijing (CN); Zhihua Sun, Beijing (CN); Yanping Liao, Beijing (CN); Jiantao Liu, Beijing (CN); Jianbo Xian, Beijing (CN); Yue Yang, Beijing (CN); Xibin Shao, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/793,776

(22) PCT Filed: Sep. 14, 2021

(86) PCT No.: PCT/CN2021/118343

§ 371 (c)(1),
(2) Date: Jul. 19, 2022

(87) PCT Pub. No.: WO2022/053067

PCT Pub. Date: Mar. 17, 2022

(65) Prior Publication Data

US 2023/0186823 A1 Jun. 15, 2023

(30) Foreign Application Priority Data

Sep. 14, 2020 (CN) ........................ 202010964060.0

(51) Int. Cl.
*G09G 3/20* (2006.01)

(52) U.S. Cl.
CPC ............. *G09G 3/20* (2013.01); *G09G 3/2092* (2013.01); *G09G 2310/0205* (2013.01);
(Continued)

(58) Field of Classification Search
CPC ........................................................ G09G 3/20
See application file for complete search history.

(56) References Cited

U.S. PATENT DOCUMENTS 6,072,457 A 6/2000 Hashimoto et al.
9,305,513 B1 4/2016 Novoselov et al.
(Continued)

FOREIGN PATENT DOCUMENTS

CN 101359143 A 2/2009
CN 102646404 A 8/2012
(Continued)

OTHER PUBLICATIONS

Office Action in corresponding U.S. Appl. No. 17/341,756, dated Sep. 12, 2022.
(Continued)

*Primary Examiner* — Gustavo Polo
(74) *Attorney, Agent, or Firm* — Leason Ellis LLP

(57) ABSTRACT

A display driving method and a display device. The display driving method includes: scanning a plurality of subpixels arranged in an N×M array one row by one row or multiple rows by multiple rows to turn on each row of scanned subpixels, so that two adjacent rows of sub-pixels are simultaneously in an on-state for a duration greater than or equal to twice a unit scanning time, the unit scanning time is a time required to scan one row of sub-pixels, wherein N and M are both integers greater than 1; applying data signals to at least two rows of sub-pixels that are simultaneously in
(Continued)

the on-state, such that at least a portion of rows of sub-pixels are applied with data signals for a duration greater than the unit scanning time.

19 Claims, 14 Drawing Sheets

(52) U.S. Cl.
CPC ............... *G09G 2310/0224* (2013.01); *G09G 2310/0251* (2013.01); *G09G 2310/0267* (2013.01); *G09G 2310/0275* (2013.01); *G09G 2310/0278* (2013.01); *G09G 2310/0286* (2013.01); *G09G 2310/08* (2013.01)

(56) References Cited

U.S. PATENT DOCUMENTS

| | | | | |
|---|---|---|---|---|
| 9,390,654 | B2 | 7/2016 | Xu | |
| 2009/0128541 | A1 | 5/2009 | Tsai et al. | |
| 2011/0128259 | A1 | 6/2011 | Suzuki et al. | |
| 2012/0293536 | A1* | 11/2012 | Yonemaru ............ | G09G 3/3648 345/589 |
| 2014/0168281 | A1 | 6/2014 | Ahn et al. | |
| 2019/0066560 | A1 | 2/2019 | Mi et al. | |
| 2019/0355309 | A1 | 11/2019 | Miwa et al. | |
| 2020/0043420 | A1 | 2/2020 | Kang et al. | |

FOREIGN PATENT DOCUMENTS

| | | | |
|---|---|---|---|
| CN | 103021369 | A | 4/2013 |
| CN | 103927985 | A | 7/2014 |
| CN | 104123923 | A | 10/2014 |
| CN | 105225649 | A | 1/2016 |
| CN | 105280153 | A | 1/2016 |
| CN | 109509455 | A | 3/2019 |
| CN | 109599070 | A | 4/2019 |
| CN | 110322827 | A | 10/2019 |
| JP | 10253987 | A | 9/1998 |
| JP | 2005165038 | A | 6/2005 |
| JP | 2009037166 | A | 2/2009 |

OTHER PUBLICATIONS

Extended European Search Report for corresponding European application No. 21866119.7, dated Feb. 2, 2024.

* cited by examiner

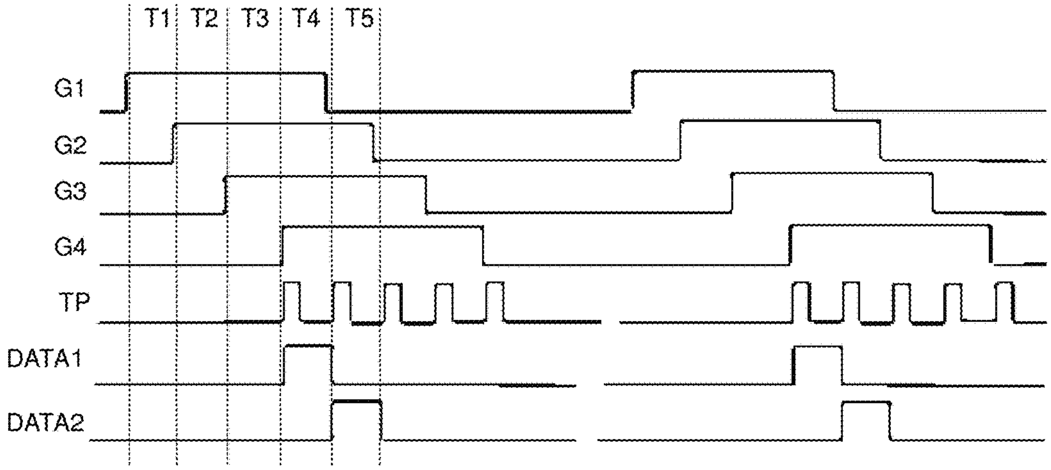

FIG. 2

S301: Scanning a plurality of sub-pixels arranged in an N×M array one row by one row or multiple rows by multiple rows, so as to turn on each row of sub-pixels that are scanned for a predetermined duration, such that the duration of two adjacent rows of sub-pixels being simultaneously in the on-state is greater than twice the unit scanning time

↓

S302: Applying data signals to at least two rows of sub-pixels that are simultaneously in the on-state, such that the duration of at least a portion of the rows of sub-pixels being applied with data signals is greater than the unit scanning time

FIG. 3

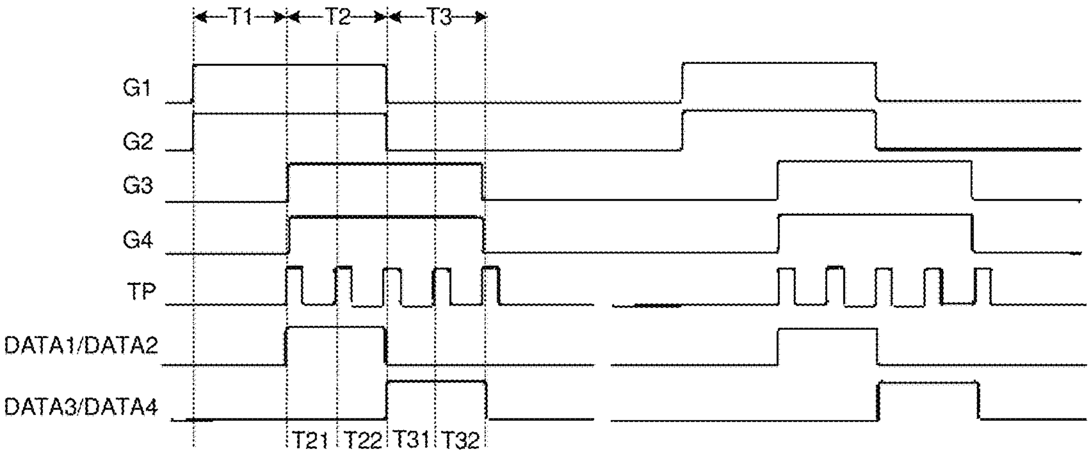

FIG. 4

DISPLAY DRIVING METHOD FOR INCREASING CHARGING DURATION AND DISPLAY DEVICE

CROSS REFERENCE

This application is a national stage application, filed under 35 U.S.C. § 371, of International Patent Application No. PCT/CN2021/118343, filed on Sep. 14, 2021, which claims priority of the Chinese application No. 202010964060.0, filed on Sep. 14, 2020, both of which are incorporated by reference herein in their entireties as a part of this application.

TECHNICAL FIELD

The present disclosure relates to the technical field of display technology, and in particular, to a display driving method and a display device.

BACKGROUND

With the advancement of technology, display equipment is developing towards large size and high resolution. However, with the increase in size and resolution of display equipment, the charging time left for each row of pixels is getting shorter and shorter, resulting in that the charging rate of pixels cannot meet the requirement, thus affecting the display.

SUMMARY

An embodiment of the disclosure provides a display driving method, comprising: scanning a plurality of sub-pixels arranged in an N×M array one row by one row or multiple rows by multiple rows, so as to turn on each row of sub-pixels that are scanned, such that two adjacent rows of sub-pixels are simultaneously in an on-state for a duration greater than or equal to twice a unit scanning time, the unit scanning time is a time required to scan one row of sub-pixels, wherein N and M are both integers greater than 1; and applying data signals to at least two rows of sub-pixels that are simultaneously in the on-state, such that at least a portion of rows of sub-pixels are applied with data signals for a duration greater than the unit scanning time.

For example, a time period of each row of sub-pixels being in the on-state comprises a charging period and a pre-charging period before the charging period, wherein a duration of the charging period is equal to twice the unit scanning time, and a duration of the pre-charging period is greater than or equal to the unit scanning time.

For example, the pre-charging period of the each row of sub-pixels comprises a first pre-charging period, and a duration of the first pre-charging period is equal to the unit scanning time, start and end times of time periods during which a (2k-1)-th row of sub-pixels and a 2k-th row of sub-pixels are in the on-state are the same; the display driving method comprises: during a charging period of the (2k-1)-th row of sub-pixels and the 2k-th row of sub-pixels, applying one of a (2k-1)-th row of data signals and a 2k-th row of data signals to the (2k-1)-th row of sub-pixels and the 2k-th row of sub-pixels; and during a pre-charging period of a (2k+1)-th row of sub-pixels and a (2k+2)-th row of sub-pixels, applying one of the (2k-1)-th row of data signals and the 2k-th row of data signals to the (2k+1)-th row of sub-pixels and the (2k+2)-th row of sub-pixels; wherein, k=1, 2, 3, . . . .

For example, the pre-charging period of the each row of sub-pixels comprises a first pre-charging period, and a duration of the first pre-charging period is equal to the unit scanning time, and start and end times of time periods during which two adjacent rows of sub-pixels are in the on-state differ by the unit scanning time; the display driving method comprises: during a charging period of a (2k-1)-th row of sub-pixels, applying one of a (2k-1)-th row of data signals and a 2k-th row of data signals to the (2k-1)-th row of sub-pixels; during a first pre-charging period of a 2k-th row of sub-pixels and a first half of a charging period of the 2k-th row of sub-pixels, applying one of the (2k-1)-th row of data signals and the 2k-th row of data signals to the 2k-th row of sub-pixels; and during a second half of the charging period of the 2k-th row of sub-pixels, applying one of a (2k+1)-th row of data signals and a 2(k+1)-th row of data signals to the 2k-th row of sub-pixels; and during a first pre-charging period of a (2k+1)-th row of sub-pixels, applying one of the (2k-1)-th row of data signals and the 2k-th row of data signals to the (2k+1)-th row of sub-pixels; wherein, k=1, 2, 3, . . . .

For example, the pre-charging period of the each row of sub-pixels comprises a first pre-charging period, and a duration of the first pre-charging period is equal to the unit scanning time, and start and end times of time periods during which two adjacent rows of sub-pixels are in the on-state differ by the unit scanning time; the display driving method comprises: during a second half of a charging period of a (2k-1)-th row of sub-pixels, applying one of a (2k-1)-th row of data signals and a 2k-th row of data signals to the (2k-1)-th row of sub-pixels; during a charging period of a 2k-th row of sub-pixels, applying one of the (2k-1)-th row of data signals and the 2k-th row of data signals to the 2k-th row of sub-pixels; during a first pre-charging period of a (2k+1)-th row of sub-pixels and a first half of a charging period of the (2k+1)-th row of sub-pixels, applying one of the (2k-1)-th row of data signals and the 2k-th row of data signals to the (2k+1)-th row of sub-pixels; and during a second half of the charging period of the (2k+1)-th row of sub-pixels, applying one of a (2k+1)-th row of data signals and a 2(k+1)-th row of data signals to the (2k+1)-th row of sub-pixels; and during a first pre-charging period of a 2(k+1)-th row of sub-pixels, applying one of the (2k-1)-th row of data signals and the 2k-th row of data signals to the 2(k+1)-th row of sub-pixels; wherein, k=1, 2, 3, . . . .

For example, a duration of the each row of sub-pixels being in the on-state is six times the unit scanning time, a duration of the pre-charging period is four times the unit scanning time, and start and end times of time periods during which two adjacent rows of sub-pixels are in the on-state differ by the unit scanning time; the display driving method comprises: during a charging period of a (6k-5)-th row of sub-pixels, applying a (6k-5)-th row of data signals to the (6k-5)-th row of sub-pixels; during a last one unit scanning time of a pre-charging period of a (6k-4)-th row of sub-pixels and a first half of a charging period of the (6k-4)-th row of sub-pixels, applying the (6k-5)-th row of data signals to the (6k-4)-th row of sub-pixels; and during a second half of the charging period of the (6k-4)-th row of sub-pixels, applying a (6k-3)-th row of data signals to the (6k-4)-th row of sub-pixels; during last two unit scanning times of a pre-charging period of a (6k-3)-th row of sub-pixels, applying the (6k-5)-th row of data signals to the (6k-3)-th row of sub-pixels; and during a charging period of the (6k-3)-th row of sub-pixels, applying a (6k-3)-th row of data signals to the (6k-3)-th row of sub-pixels; during middle two unit scanning times of a pre-charging period of a (6k-2)-th row of subpixels, applying the (6k-5)-th row of data signals to the (6k-2)-th row of sub-pixels; during a last one unit scanning time of the pre-charging period of the (6k-2)-th row of sub-pixels and a first half of a charging period of the (6k-2)-th row of sub-pixels, applying the (6k-3)-th row of data signals to the (6k-2)-th row of sub-pixels; and during a second half of the charging period of the (6k-2)-th row of sub-pixels, applying a (6k-1)-th row of data signals to the (6k-2)-th row of sub-pixels; during first two unit scanning times of a pre-charging period of a (6k-1)-th row of sub-pixels, applying the (6k-5)-th row of data signals to the (6k-1)-th row of sub-pixels; during last two unit scanning times of the pre-charging period of the (6k-1)-th row of sub-pixels, applying the (6k-3)-th row of data signals to the (6k-1)-th row of sub-pixels; and during a charging period of the (6k-1)-th row of sub-pixels, applying the (6k-1)-th row of data signals to the (6k-1)-th row of sub-pixels; during a first one unit scanning time of a pre-charging period of a 6k-th row of sub-pixels, applying the (6k-5)-th row of data signals to the 6k-th row of sub-pixels; during middle two unit scanning times of the pre-charging period of the 6k-th row of sub-pixels, applying the (6k-3)-th row of data signals to the 6k-th row of sub-pixels; during a last one unit scanning time of the pre-charging period of the 6k-th row of sub-pixels and a first half of a charging period of the 6k-th row of sub-pixels, applying the (6k-1)-th row of data signals to the 6k-th row of sub-pixels; and during a second half of the charging period of the 6k-th row of sub-pixels, applying a (6k+1)-th row of data signals to the 6k-th row of sub-pixels; during first two unit scanning times of a pre-charging period of a (6k+1)-th row of sub-pixels, applying the (6k-3)-th row of data signals to the (6k+1)-th row of sub-pixels; during last two unit scanning times of the pre-charging period of the (6k+1)-th row of sub-pixels, applying the (6k-1)-th row of data signals to the (6k+1)-th row of sub-pixels; and during a charging period of the (6k+1)-th row of sub-pixels, applying the (6k+1)-th row of data signals to the (6k+1)-th row of sub-pixels; during a first one unit scanning time of a pre-charging period of a (6k+2)-th row of sub-pixels, applying the (6k-3)-th row of data signals to the (6k+2)-th row of sub-pixels; during middle two unit scanning times of the pre-charging period of the (6k+2)-th row of sub-pixels, applying the (6k-1)-th row of data signals to the (6k+2)-th row of sub-pixels; during a last one unit scanning time of the pre-charging period of the (6k+2)-th row of sub-pixels and a first half of a charging period of the (6k+2)-th row of sub-pixels, applying the (6k+1)-th row of data signals to the (6k+2)-th row of sub-pixels; and during a second half of the charging period of the (6k+2)-th row of sub-pixels, applying a (6k+3)-th row of data signals to the (6k+2)-th row of sub-pixels; during first two unit scanning times of a pre-charging period of a (6k+3)-th row of sub-pixels, applying the (6k-1)-th row of data signals to the (6k+3)-th row of sub-pixels; during last two unit scanning times of the pre-charging period of the (6k+3)-th row of sub-pixels, applying the (6k+1)-th row of data signals to the (6k+3)-th row of sub-pixels; and during a charging period of the (6k+3)-th row of sub-pixels, applying the (6k+3)-th row of data signals to the (6k+3)-th row of sub-pixels; during a first one unit scanning time of a pre-charging period of a (6k+4)-th row of sub-pixels, applying the (6k-1)-th row of data signals to the (6k+4)-th row of sub-pixels; during middle two unit scanning times of the pre-charging period of the (6k+4)-th row of sub-pixels, applying the (6k+1)-th row of data signals to the (6k+4)-th row of sub-pixels; during a last one unit scanning time of the pre-charging period of the (6k+4)-th row of sub-pixels and a first half of a charging period of the (6k+4)-th row of sub-pixels, applying the (6k+3)-th row of data signals to the (6k+4)-th row of sub-pixels; and during a second half of the charging period of the (6k+4)-th row of sub-pixels, applying a (6k+5)-th row of data signals to the (6k+4)-th row of sub-pixels; wherein, k=1, 2, 3, . . . .

For example, a duration of the each row of sub-pixels being in the on-state is six times the unit scanning time, a duration of the pre-charging period is four times the unit scanning time, and start and end times of time periods during which two adjacent rows of sub-pixels are in the on-state differ by the unit scanning time; the display driving method comprises: during a second half of a charging period of a (6k-5)-th row of sub-pixels, applying a (6k-4)-th row of data signals to the (6k-5)-th row of sub-pixels; during a charging period of a (6k-4)-th row of sub-pixels, applying the (6k-4)-th row of data signals to the (6k-4)-th row of sub-pixels; during a last one unit scanning time of a pre-charging period of a (6k-3)-th row of sub-pixels and a first half of a charging period of the (6k-3)-th row of sub-pixels, applying the (6k-4)-th row of data signals to the (6k-3)-th row of sub-pixels; and during a second half of the charging period of the (6k-3)-th row of sub-pixels, applying a (6k-2)-th row of data signals to the (6k-3)-th row of sub-pixels; during last two unit scanning times of a pre-charging period of a (6k-2)-th row of sub-pixels, applying the (6k-4)-th row of data signals to the (6k-2)-th row of sub-pixels; and during a charging period of the (6k-2)-th row of sub-pixels, applying the (6k-2)-th row of data signals to the (6k-2)-th row of sub-pixels; during middle two unit scanning times of a pre-charging period of a (6k-1)-th row of sub-pixels, applying the (6k-4)-th row of data signals to the (6k-1)-th row of sub-pixels; during a last one unit scanning time of the pre-charging period of the (6k-1)-th row of sub-pixels and a first half of a charging period of the (6k-1)-th row of sub-pixels, applying the (6k-2)-th row of data signals to the (6k-1)-th row of sub-pixels; and during a second half of the charging period of the (6k-1)-th row of sub-pixels, applying a 6k-th row of data signals to the (6k-1)-th row of sub-pixels; during first two unit scanning times of a pre-charging period of a 6k-th row of sub-pixels, applying the (6k-4)-th row of data signals to the 6k-th row of sub-pixels; during last two unit scanning times of the pre-charging period of the 6k-th row of sub-pixels, applying the (6k-2)-th row of data signals to the 6k-th row of sub-pixels; and during a charging period of the 6k-th row of sub-pixels, applying the 6k-th row of data signals to the 6k-th row of sub-pixels; during a first one unit scanning time of a pre-charging period of a (6k+1)-th row of sub-pixels, applying the (6k-4)-th row of data signals to the (6k+1)-th row of sub-pixels; during middle two unit scanning times of the pre-charging period of the (6k+1)-th row of sub-pixels, applying the (6k-2)-th row of data signals to the (6k+1)-th row of sub-pixels; during a last one unit scanning time of the pre-charging period of the (6k+1)-th row of sub-pixels and a first half of a charging period of the (6k+1)-th row of sub-pixels, applying the 6k-th row of data signals to the (6k+1)-th row of sub-pixels; and during a second half of the charging period of the (6k+1)-th row of sub-pixels, applying a (6k+2)-th row of data signals to the (6k+1)-th row of sub-pixels; during first two unit scanning times of a pre-charging period of a (6k+2)-th row of sub-pixels, applying the (6k-2)-th row of data signals to the (6k+2)-th row of sub-pixels; during last two unit scanning times of the pre-charging period of the (6k+2)-th row of sub-pixels, applying the 6k-th row of data signals to the (6k+2)-th row of sub-pixels; and during a charging period of the (6k+2)-th row of sub-pixels, applying the (6k+2)-th row of data signals to the (6k+2)-th row of sub-pixels; during a first one unit scanning time of a pre-charging period of a (6k+3)-th row of sub-pixels, applying the (6k-2)-th row of data signals to the (6k+3)-th row of sub-pixels; during middle two unit scanning times of the pre-charging period of the (6k+3)-th row of sub-pixels, applying the 6k-th row of data signals to the (6k+3)-th row of sub-pixels; during a last one unit scanning time of the pre-charging period of the (6k+3)-th row of sub-pixels and a first half of a charging period of the (6k+3)-th row of sub-pixels, applying the (6k+2)-th row of data signals to the (6k+3)-th row of sub-pixels; and during a second half of the charging period of the (6k+3)-th row of sub-pixels, applying a (6k+4)-th row of data signals to the (6k+3)-th row of sub-pixels; during first two unit scanning times of a pre-charging period of a (6k+4)-th row of sub-pixels, applying the 6k-th row of data signals to the (6k+4)-th row of sub-pixels; during last two unit scanning times of the pre-charging period of the (6k+4)-th row of sub-pixels, applying the (6k+2)-th row of data signals to the (6k+4)-th row of sub-pixels; and during a charging period of the (6k+4)-th row of sub-pixels, applying the (6k+4)-th row of data signals to the (6k+4)-th row of sub-pixels; during a first one unit scanning time of a pre-charging period of a (6k+5)-th row of sub-pixels, applying the 6k-th row of data signals to the (6k+5)-th row of sub-pixels; during middle two unit scanning times of the pre-charging period of the (6k+5)-th row of sub-pixels, applying the (6k+2)-th row of data signals to the (6k+5)-th row of sub-pixels; during a last one unit scanning time of the pre-charging period of the (6k+5)-th row of sub-pixels and a first half of a charging period of the (6k+5)-th row of sub-pixels, applying the (6k+4)-th row of data signals to the (6k+5)-th row of sub-pixels; and during a second half of the charging period of the (6k+5)-th row of sub-pixels, applying a (6k+6)-th row of data signals to the (6k+5)-th row of sub-pixels; wherein, k=1, 2, 3, . . . .

For example, during a first time period, a n-th row of sub-pixels and a (n+1)-th row of sub-pixels are simultaneously turned on, where n is an integer, and 1<n<N-1; during a second time period, a (n+2)-th row of sub-pixels and a (n+3)-th row of sub-pixels are simultaneously turned on, and data signals are applied to the n-th row of sub-pixels and the (n+1)-th row of sub-pixels, and a length of the second time period is greater than or equal to twice the unit scanning time.

For example, applying the data signals to the n-th row of sub-pixels and the (n+1)-th row of sub-pixels comprises: applying one of a n-th row of data signals and a (n+1)-th row of data signals to the n-th row of sub-pixels and the (n+1)-th row of sub-pixels.

For example, the second time period comprises a first sub-period and a second sub-period, and applying the data signals to the n-th row of sub-pixels and the (n+1)-th row of sub-pixels comprises: during the first sub-period of the second time period, applying a n-th row of data signals to the n-th row of sub-pixels and the (n+1)-th row of sub-pixels; and during the second sub-period of the second time period, applying a (n+1)-th row of data signals to the n-th row of sub-pixels and the (n+1)-th row of sub-pixels.

For example, during a first time period, a n-th row of sub-pixels and a (n+1)-th row of sub-pixels are sequentially turned on, where n is an integer, and 1<n<N-3; during a second time period, a (n+2)-th row of sub-pixels and a (n+3)-th row of sub-pixels are sequentially turned on, and one of a n-th row of data signals and a (n+1)-th row of data signals are applied to the n-th row of sub-pixels and the (n+1)-th row of sub-pixels, wherein a length of the second time period is greater than or equal to twice the unit scanning time; during a third time period, the n-th row of sub-pixels are turned off, and one of a (n+2)-th row of data signals and a (n+3)-th row of data signals are applied to the (n+1)-th row of sub-pixels, the (n+2)-th row of sub-pixels, and the (n+3)-th row of sub-pixels.

For example, lengths of the first time period and the second time period are both equal to twice the unit scanning time.

For example, lengths of the first time period and the second time period are both equal to twice the unit scanning time, and a length of the third time period is equal to the unit scanning time.

For example, a duration of each row of sub-pixels being applied with data signals is greater than the unit scanning time; or a duration of a first row of sub-pixels being applied with data signals is equal to the unit scanning time, and a duration of each row of sub-pixels other than the first row of sub-pixels being applied with data signals is greater than the unit scanning time.

An embodiment of the disclosure further provides a display driving method, comprising: in a first frame, scanning a plurality of sub-pixels arranged in an N×M array by progressive scanning or interlaced scanning in an interval of at least one row, so as to turn on each row of sub-pixels that are scanned, such that two adjacent rows of sub-pixels that are sequentially turned on are simultaneously in an on-state for a duration greater than or equal to twice a unit scanning time; and applying data signals to the each row of sub-pixels that are turned on, such that at least a portion of sub-pixels in the plurality of sub-pixels are applied with data signals for a duration greater than the unit scanning time, the unit scanning time is a time required to scan one row of sub-pixels, wherein N and M are both integers greater than 1; and in a second frame, scanning the plurality of sub-pixels arranged in the N×M array by progressive scanning or interlaced scanning in an interval of at least one row, so as to turn on each row of sub-pixels that are scanned, such that two adjacent rows of sub-pixels that are sequentially turned on are simultaneously in an on-state for a duration greater than or equal to twice the unit scanning time; and applying data signals to the each row of sub-pixels that are turned on, such that another portion of sub-pixels in the plurality of sub-pixels are applied with data signals for a duration greater than the unit scanning time.

For example, a time period of the each row of sub-pixels being in the on-state comprises a charging period and a pre-charging period before the charging period, wherein a duration of the charging period is equal to twice the unit scanning time, and a duration of the pre-charging period is greater than or equal to the unit scanning time.

For example, the pre-charging period of the each row of sub-pixels comprises a first pre-charging period, and a duration of the first pre-charging period is equal to the unit scanning time, and start and end times of time periods of a (2k-1)-th row of sub-pixels and a 2k-th row of sub-pixels being in the on-state are the same; the display driving method comprises: in the first frame or the second frame, during a charging period of the (2k-1)-th row of sub-pixels and the 2k-th row of sub-pixels, applying one of a (2k-1)-th row of data signals and a 2k-th row of data signals to the (2k-1)-th row of sub-pixels and the 2k-th row of sub-pixels; and during a first pre-charging period of a (2k+1)-th row of sub-pixels and a (2k+2)-th row of sub-pixels, applying one of the (2k-1)-th row of data signals and the 2k-th row of data signals to the (2k+1)-th row of sub-pixels and the (2k+2)-th row of sub-pixels; wherein, k=1, 2, 3, . . . .

For example, the pre-charging period of the each row of sub-pixels comprises a first pre-charging period, and a duration of the first pre-charging period is equal to the unit scanning time, and start and end times of time periods of two adjacent rows of sub-pixels being in the on-state differ by the unit scanning time; the display driving method comprises: in the first frame or the second frame, during a charging period of a (2k-1)-th row of sub-pixels, applying one of a (2k-1)-th row of data signals and a 2k-th row of data signals to the (2k-1)-th row of sub-pixels; during a first pre-charging period of a 2k-th row of sub-pixels and a first half of a charging period of the 2k-th row of sub-pixels, applying one of the (2k-1)-th row of data signals and the 2k-th row of data signals to the 2k-th row of sub-pixels; and during a second half of the charging period of the 2k-th row of sub-pixels, applying one of a (2k+1)-th row of data signals and a 2(k+1)-th row of data signals to the 2k-th row of sub-pixels; and during a first pre-charging period of a (2k+1)-th row of sub-pixels, applying one of the (2k-1)-th row of data signals and the 2k-th row of data signals to the (2k+1)-th row of sub-pixels; wherein, k=1, 2, 3, For example, the pre-charging period of the each row of sub-pixels comprises a first pre-charging period, and a duration of the first pre-charging period is equal to the unit scanning time, and start and end times of time periods of two adjacent rows of sub-pixels being in the on-state differ by the unit scanning time; the display driving method comprises: in the first frame or the second frame, during a second half of a charging period of a (2k-1)-th row of sub-pixels, applying one of a (2k-1)-th row of data signals and a 2k-th row of data signals to the (2k-1)-th row of sub-pixels; during a charging period of a 2k-th row of sub-pixels, applying one of the (2k-1)-th row of data signals and the 2k-th row of data signals to the 2k-th row of sub-pixels; during a first pre-charging period of a (2k+1)-th row of sub-pixels and a first half of a charging period of the (2k+1)-th row of sub-pixels, applying one of the (2k-1)-th row of data signals and the 2k-th row of data signals to the (2k+1)-th row of sub-pixels; and during a second half of the charging period of the (2k+1)-th row of sub-pixels, applying one of a (2k+1)-th row of data signals and a 2(k+1)-th row of data signals to the (2k+1)-th row of sub-pixels; and during a first pre-charging period of a 2(k+1)-th row of sub-pixels, applying one of the (2k-1)-th row of data signals and the 2k-th row of data signals to the 2(k+1)-th row of sub-pixels; wherein, k=1, 2, 3, . . . .

For example, a duration of the each row of sub-pixels being in the on-state is six times the unit scanning time, a duration of the pre-charging period is four times the unit scanning time, and start and end times of time periods of two adjacent rows of sub-pixels being in the on-state differ by the unit scanning time; the display driving method comprises: in the first frame or the second frame, during a charging period of a (6k-5)-th row of sub-pixels, applying a (6k-5)-th row of data signals to the (6k-5)-th row of sub-pixels; during a last one unit scanning time of a pre-charging period of a (6k-4)-th row of sub-pixels and a first half of a charging period of the (6k-4)-th row of sub-pixels, applying the (6k-5)-th row of data signals to the (6k-4)-th row of sub-pixels; and during a second half of the charging period of the (6k-4)-th row of sub-pixels, applying a (6k-3)-th row of data signals to the (6k-4)-th row of sub-pixels; during last two unit scanning times of a pre-charging period of a (6k-3)-th row of sub-pixels, applying the (6k-5)-th row of data signals to the (6k-3)-th row of sub-pixels; and during a charging period of the (6k-3)-th row of sub-pixels, applying the (6k-3)-th row of data signals to the (6k-3)-th row of sub-pixels; during middle two unit scanning times of a pre-charging period of a (6k-2)-th row of sub-pixels, applying the (6k-5)-th row of data signals to the (6k-2)-th row of sub-pixels; during a last one unit scanning time of the pre-charging period of the (6k-2)-th row of sub-pixels and a first half of a charging period of the (6k-2)-th row of sub-pixels, applying the (6k-3)-th row of data signals to the (6k-2)-th row of sub-pixels; and during a second half of the charging period of the (6k-2)-th row of sub-pixels, applying a (6k-1)-th row of data signals to the (6k-2)-th row of sub-pixels; during first two unit scanning times of a pre-charging period of a (6k-1)-th row of sub-pixels, applying the (6k-5)-th row of data signals to the (6k-1)-th row of sub-pixels; during last two unit scanning times of the pre-charging period of the (6k-1)-th row of sub-pixels, applying the (6k-3)-th row of data signals to the (6k-1)-th row of sub-pixels; and during a charging period of the (6k-1)-th row of sub-pixels, applying the (6k-1)-th row of data signals to the (6k-1)-th row of sub-pixels; during a first one unit scanning time of a pre-charging period of a 6k-th row of sub-pixels, applying the (6k-5)-th row of data signals to the 6k-th row of sub-pixels; during middle two unit scanning times of the pre-charging period of the 6k-th row of sub-pixels, applying the (6k-3)-th row of data signals to the 6k-th row of sub-pixels; during a last one unit scanning time of the pre-charging period of the 6k-th row of sub-pixels and a first half of a charging period of the 6k-th row of sub-pixels, applying the (6k-1)-th row of data signals to the 6k-th row of sub-pixels; and during a second half of the charging period of the 6k-th row of sub-pixels, applying a (6k+1)-th row of data signals to the 6k-th row of sub-pixels; during first two unit scanning times of a pre-charging period of a (6k+1)-th row of sub-pixels, applying the (6k-3)-th row of data signals to the (6k+1)-th row of sub-pixels; during last two unit scanning times of the pre-charging period of the (6k+1)-th row of sub-pixels, applying the (6k-1)-th row of data signals to the (6k+1)-th row of sub-pixels; and during a charging period of the (6k+1)-th row of sub-pixels, applying the (6k+1)-th row of data signals to the (6k+1)-th row of sub-pixels; during a first one unit scanning time of a pre-charging period of a (6k+2)-th row of sub-pixels, applying the (6k-3)-th row of data signals to the (6k+2)-th row of sub-pixels; during middle two unit scanning times of the pre-charging period of the (6k+2)-th row of sub-pixels, applying the (6k-1)-th row of data signals to the (6k+2)-th row of sub-pixels; during a last one unit scanning time of the pre-charging period of the (6k+2)-th row of sub-pixels and a first half of a charging period of the (6k+2)-th row of sub-pixels, applying the (6k+1)-th row of data signals to the (6k+2)-th row of sub-pixels; and during a second half of the charging period of the (6k+2)-th row of sub-pixels, applying a (6k+3)-th row of data signals to the (6k+2)-th row of sub-pixels; during first two unit scanning times of a pre-charging period of a (6k+3)-th row of sub-pixels, applying the (6k-1)-th row of data signals to the (6k+3)-th row of sub-pixels; during last two unit scanning times of the pre-charging period of the (6k+3)-th row of sub-pixels, applying the (6k+1)-th row of data signals to the (6k+3)-th row of sub-pixels; and during a charging period of the (6k+3)-th row of sub-pixels, applying a (6k+3)-th row of data signals to the (6k+3)-th row of sub-pixels; during a first one unit scanning time of a pre-charging period of a (6k+4)-th row of sub-pixels, applying the (6k-1)-th row of data signals to the (6k+4)-th row of sub-pixels; during middle two unit scanning times of the pre-charging period of the (6k+4)-th row of sub-pixels, applying the (6k+1)-th row of data signals to the (6k+4)-th row of sub-pixels; during a last one unit scanning time of the pre-charging period of the (6k+4)-th row of sub-pixels and a first half of a charging period of the (6k+4)-th row of sub-pixels, applying the (6k+3)-th row of data signals to the (6k+4)-th row of sub-pixels; and during a second half of the charging period of the (6k+4)-th row of sub-pixels, applying a (6k+5)-th row of data signals to the (6k+4)-th row of sub-pixels; wherein, k=1, 2, 3, . . . .

For example, a duration of the each row of sub-pixels being in the on-state is six times the unit scanning time, a duration of the pre-charging period is four times the unit scanning time, and start and end times of time periods of two adjacent rows of sub-pixels being in the on-state differ by the unit scanning time; the display driving method comprises: in the first frame or the second frame, during a second half of a charging period of a (6k-5)-th row of sub-pixels, applying a (6k-4)-th row of data signals to the (6k-5)-th row of sub-pixels; during a charging period of a (6k-4)-th row of sub-pixels, applying the (6k-4)-th row of data signals to the (6k-4)-th row of sub-pixels; during a last one unit scanning time of a pre-charging period of a (6k-3)-th row of sub-pixels and a first half of a charging period of the (6k-3)-th row of sub-pixels, applying the (6k-4)-th row of data signals to the (6k-3)-th row of sub-pixels; and during a second half of the charging period of the (6k-3)-th row of sub-pixels, applying a (6k-2)-th row of data signals to the (6k-3)-th row of sub-pixels; during last two unit scanning times of a pre-charging period of a (6k-2)-th row of sub-pixels, applying the (6k-4)-th row of data signals to the (6k-2)-th row of sub-pixels; and during a charging period of the (6k-2)-th row of sub-pixels, applying the (6k-2)-th row of data signals to the (6k-2)-th row of sub-pixels; during middle two unit scanning times of a pre-charging period of a (6k-1)-th row of sub-pixels, applying the (6k-4)-th row of data signals to the (6k-1)-th row of sub-pixels; during a last one unit scanning time of the pre-charging period of the (6k-1)-th row of sub-pixels and a first half of a charging period of the (6k-1)-th row of sub-pixels, applying the (6k-2)-th row of data signals to the (6k-1)-th row of sub-pixels; and during a second half of the charging period of the (6k-1)-th row of sub-pixels, applying a 6k-th row of data signals to the (6k-1)-th row of sub-pixels; during first two unit scanning times of a pre-charging period of a 6k-th row of sub-pixels, applying the (6k-4)-th row of data signals to the 6k-th row of sub-pixels; during last two unit scanning times of the pre-charging period of the 6k-th row of sub-pixels, applying the (6k-2)-th row of data signals to the 6k-th row of sub-pixels; and during a charging period of the 6k-th row of sub-pixels, applying the 6k-th row of data signals to the 6k-th row of sub-pixels; during a first one unit scanning time of a pre-charging period of a (6k+1)-th row of sub-pixels, applying the (6k-4)-th row of data signals to the (6k+1)-th row of sub-pixels; during middle two unit scanning times of the pre-charging period of the (6k+1)-th row of sub-pixels, applying the (6k-2)-th row of data signals to the (6k+1)-th row of sub-pixels; during a last one unit scanning time of the pre-charging period of the (6k+1)-th row of sub-pixels and a first half of a charging period of the (6k+1)-th row of sub-pixels, applying the 6k-th row of data signals to the (6k+1)-th row of sub-pixels; and during a second half of the charging period of the (6k+1)-th row of sub-pixels, applying a (6k+2)-th row of data signals to the (6k+1)-th row of sub-pixels; during first two unit scanning times of a pre-charging period of a (6k+2)-th row of sub-pixels, applying the (6k-2)-th row of data signals to the (6k+2)-th row of sub-pixels; during last two unit scanning times of the pre-charging period of the (6k+2)-th row of sub-pixels, applying the 6k-th row of data signals to the (6k+2)-th row of sub-pixels; and during a charging period of the (6k+2)-th row of sub-pixels, applying the (6k+2)-th row of data signals to the (6k+2)-th row of sub-pixels; during a first one unit scanning time of a pre-charging period of a (6k+3)-th row of sub-pixels, applying the (6k-2)-th row of data signals to the (6k+3)-th row of sub-pixels; during middle two unit scanning times of the pre-charging period of the (6k+3)-th row of sub-pixels, applying the 6k-th row of data signals to the (6k+3)-th row of sub-pixels; during a last one unit scanning time of the pre-charging period of the (6k+3)-th row of sub-pixels and a first half of a charging period of the (6k+3)-th row of sub-pixels, applying the (6k+2)-th row of data signals to the (6k+3)-th row of sub-pixels; and during a second half of the charging period of the (6k+3)-th row of sub-pixels, applying a (6k+4)-th row of data signals to the (6k+3)-th row of sub-pixels; during first two unit scanning times of a pre-charging period of a (6k+4)-th row of sub-pixels, applying the 6k-th row of data signals to the (6k+4)-th row of sub-pixels; during last two unit scanning times of the pre-charging period of the (6k+4)-th row of sub-pixels, applying the (6k+2)-th row of data signals to the (6k+4)-th row of sub-pixels; and during a charging period of the (6k+4)-th row of sub-pixels, applying the (6k+4)-th row of data signals to the (6k+4)-th row of sub-pixels; during a first one unit scanning time of a pre-charging period of a (6k+5)-th row of sub-pixels, applying the 6k-th row of data signals to the (6k+5)-th row of sub-pixels; during middle two unit scanning times of the pre-charging period of the (6k+5)-th row of sub-pixels, applying the (6k+2)-th row of data signals to the (6k+5)-th row of sub-pixels; during a last one unit scanning time of the pre-charging period of the (6k+5)-th row of sub-pixels and a first half of a charging period of the (6k+5)-th row of sub-pixels, applying the (6k+4)-th row of data signals to the (6k+5)-th row of sub-pixels; and during a second half of the charging period of the (6k+5)-th row of sub-pixels, applying a (6k+6)-th row of data signals to the (6k+5)-th row of sub-pixels; wherein, k=1, 2, 3, . . . .

For example, in the first frame, the plurality of sub-pixels are scanned one odd-numbered row by one odd-numbered row to turn on each odd-numbered row of sub-pixels that are scanned, such that two adjacent odd-numbered rows of sub-pixels are simultaneously in the on-state for a duration greater than or equal to twice the unit scanning time; and data signals are applied to each odd-numbered row of sub-pixels that are turned on, such that the odd-numbered row of sub-pixels are applied with data signals for a duration greater than or equal to twice the unit scanning time; and in the second frame, the plurality of sub-pixels are scanned one even-numbered row by one even-numbered row to turn on each even-numbered row of sub-pixels that are scanned, such that two adjacent even-numbered rows of sub-pixels are simultaneously in the on-state for a duration greater than or equal to twice the unit scanning time; and data signals are applied to each even-numbered row of sub-pixels that are turned on, such that the even-numbered row of sub-pixels are applied with data signals for a duration greater than or equal to twice the unit scanning time.

For example, in the first frame, the plurality of sub-pixels are scanned by progressive scanning, so as to turn on each row of sub-pixels that are scanned, such that two adjacent rows of sub-pixels are simultaneously in the on-state for a duration greater than twice the unit scanning time; and data signals are applied to each row of sub-pixels that are turned on, such that an odd-numbered row of sub-pixels are applied with data signals for a duration greater than the unit scanning time, and an even-numbered row of sub-pixels are applied with data signals for a duration less than the unit scanning time; and in the second frame, the plurality of sub-pixels are scanned by progressive scanning, so as to turn on each row of sub-pixels that are scanned, such that two adjacent rows of sub-pixels are simultaneously in the on-state for a duration greater than twice the unit scanning time; and data signals are applied to each row of sub-pixels that are turned on, such that an even-numbered row of sub-pixels are applied with data signals for a duration greater than the unit scanning time, and an odd-numbered row of sub-pixels are applied with data signals for a duration less than the unit scanning time.

For example, in a first time period of the first frame, a (2k-1)-th row of sub-pixels are turned on, wherein k is an integer, and $1<k<(N-2)/2$; in a second time period of the first frame, a (2k+1)-th row of sub-pixels are turned on, and a (2k-1)-th row of data signals are applied to the (2k-1)-th row of sub-pixels, wherein a length of the second time period of the first frame is greater than or equal to twice the unit scanning time.

For example, in a first time period of the second frame, a 2k-th row of sub-pixels are turned on, wherein k is an integer, and $1<k<(N-2)/2$; in a second time period of the second frame, a (2k+2)-th row of sub-pixels are turned on, and a 2k-th row of data signals are applied to the 2k-th row of sub-pixels, wherein a length of the second time period of the second frame is greater than or equal to twice the unit scanning time.

For example, in a first time period of the first frame, a (2k-1)-th row of sub-pixels are turned on, wherein k is an integer, and $1<k<(N-2)/2$; in a second time period of the first frame, a (2k-1)-th row of data signals are applied to the (2k-1)-th row of sub-pixels; in a third time period of the first frame, a (2k+1)-th row of sub-pixels are turned on, and the (2k-1)-th row of data signals are continuously applied to the (2k-1)-th row of sub-pixels; in a fourth time period of the first frame, a (2k+1)-th row of data signals are applied to the (2k-1)-th row of sub-pixels and the (2k+1)-th row of sub-pixels.

For example, in a first time period of the second frame, a 2k-th row of sub-pixels are turned on, wherein k is an integer, and $1<k<(N-2)/2$; in a second time period of the second frame, a 2k-th row of data signals are applied to the 2k-th row of sub-pixels; in a third time period of the second frame, a (2k+2)-th row of sub-pixels are turned on, and the 2k-th row of data signals are continuously applied to the 2k-th row of sub-pixels; in a fourth time period of the second frame, a (2k+2)-th row of data signals are applied to the 2k-th row of sub-pixels and the (2k+2)-th row of sub-pixels.

For example, in a first time period of the first frame, a n-th row of sub-pixels and a (n+1)-th row of sub-pixels are sequentially turned on, wherein n is an integer, and $1<n<N-1$; in a second time period of the first frame, a n-th row of data signals are applied to the n-th row of sub-pixels; in a third time period of the first frame, a (n+1)-th row of data signals are applied to the (n+1)-th row of sub-pixels, a length of the second time period of the first frame is greater than the unit scanning time, and a length of the third time period of the first frame is less than the unit scanning time, and a sum of the length of the second time period and the length of the third time period of the first frame is greater than or equal to twice the unit scanning time.

For example, in a first time period of the second frame, a n-th row of sub-pixels and (n+1)-th row of sub-pixels are sequentially turned on, wherein n is an integer, and $2<n<N-1$; in a second time period of the second frame, a n-th row of data signals are applied to the n-th row of sub-pixels; and in a third time period of the second frame, a (n+1)-th row of data signals are applied to the (n+1)-th row of sub-pixels, wherein a length of the second time period of the second frame is less than the unit scanning time, and a length of the third time period of the second frame is greater than the unit scanning time, and a sum of the length of the second time period and the length of the third time period of the second frame is greater than or equal to twice the unit scanning time.

For example, in the first frame, applying the data signals to the each odd-numbered row of sub-pixels that are turned on comprises: for M sub-pixels in each odd-numbered row that are turned on, applying data signals to sub-pixels located in a (2a-1)-th column and a 2a-th column, wherein a is an odd number, and $1<2a-1<M$; in the second frame, applying the data signals to the each even-numbered row of sub-pixels that are turned on comprises: for M sub-pixels in each even-numbered row that are turned on, applying data signals to sub-pixels located in a 2b-th column and a (2b+1)-th column, wherein b is an even number, and $2<2b<M$.

For example, in the first frame, applying data signals to each row of sub-pixels that are turned on comprises: applying data signals to sub-pixels located in a (2a-1)-th column and a 2a-th column of M sub-pixels in each odd-numbered row that are turned on, wherein a is an odd number, and $1<2a-1<M$; applying data signals to sub-pixels located in a 2b-th column and a (2b+1)-th column of M sub-pixels in each even-numbered row that are turned on, wherein b is an even number, and $2<2b<M$; in the second frame, applying data signals to each row of sub-pixels that are turned on comprises: applying data signals to sub-pixels located in a 2b-th column and a (2b+1)-th column of M sub-pixels in each odd-numbered row that are turned on, wherein b is an even number, and $2<2b<M$; applying data signals to sub-pixels located in a (2a-1)-th column and a 2a-th column of M sub-pixels in each even-numbered row that are turned on, wherein a is an odd number, and $1<2a-1<M$.

For example, the first frame is an odd-numbered frame, and the second frame is an even-numbered frame; or the first frame is an even-numbered frame, and the second frame is an odd-numbered frame.

An embodiment of the disclosure further provides a display device, comprising: a plurality of sub-pixels arranged in an N×M array, wherein N and M are both integers greater than 1; a gate driving circuit, connected to the plurality of sub-pixels, and the gate driving circuit is configured to scan the plurality of sub-pixels one row by one row, or multiple rows by multiple rows, so as to turn on each row of sub-pixels that are scanned, such that two adjacent rows of sub-pixels are simultaneously in an on-state for a duration greater than twice a unit scanning time, the unit scanning time is a time required to scan one row of sub-pixels; and a source driving circuit, connected to the plurality of sub-pixels, the source driving circuit is configured to apply data signals to at least two rows of sub-pixels that are simultaneously in the on-state, such that each row of sub-pixels are applied with data signals for a duration greater than the unit scanning time.

For example, the gate driving circuit is configured to be capable of scanning one odd-numbered row by one odd-numbered row according to a first start signal, scanning one even-numbered row by one even-numbered row according to a second start signal, and progressive scanning according to the first start signal and the second start signal, simultaneously.

An embodiment of the disclosure further provides a display device, comprising: a plurality of sub-pixels arranged in an N×M array, wherein N and M are both integers greater than 1; a gate driving circuit, connected to the plurality of sub-pixels, the gate driving circuit is configured to scan the plurality of sub-pixels by progressive scanning or interlaced scanning in an interval of at least one row, so as to turn on each row of sub-pixels that are scanned, such that two adjacent rows of sub-pixels that are sequentially turned on are simultaneously in an on-state for a duration greater than or equal to twice a unit scanning time, the unit scanning time is a time required to scan one row of sub-pixels; and a source driving circuit, connected to the plurality of sub-pixels, the source driving circuit is configured to sequentially apply data signals to each rows of sub-pixels that are turned on in a first frame, such that a portion of sub-pixels in the plurality of sub-pixels are applied with data signals for a duration greater than the unit scanning time; and sequentially apply data signals to each rows of sub-pixels that are turned on in a second frame, such that another portion of sub-pixels in the plurality of sub-pixels are applied with data signals for a duration greater than the unit scanning time.

For example, the gate driving circuit is configured to be capable of scanning one odd-numbered row by one odd-numbered row according to a first start signal, scanning one even-numbered row by one even-numbered row according to a second start signal, and progressive scanning according to the first start signal and the second start signal, simultaneously.

BRIEF DESCRIPTION OF THE DRAWINGS

In order to more clearly illustrate the technical schemes of the embodiments of the present disclosure, the accompanying drawings of the embodiments will be briefly introduced as below. It is obvious that the accompanying drawings in the following description merely relate to some embodiments of the present disclosure, and are not intended to limit the present disclosure.

FIG. 2 illustrates a signal timing diagram of a display driving method;

FIG. 3 illustrates a flowchart of a display driving method according to an embodiment of the present disclosure;

FIG. 4 illustrates a signal timing diagram of a display driving method according to an embodiment of the present disclosure;

DETAILED DESCRIPTION

Although the present disclosure will be fully described with reference to the accompanying drawings containing preferred embodiments of the present disclosure, prior to the description, it should be understood that, those of ordinary skill in the art can modify the disclosure described herein while obtaining the technical effects of the present disclosure. Therefore, it should be understood that the above description is a broad disclosure to those of ordinary skill in the art, and that its content is not intended to limit the exemplary embodiments described in the present disclosure.

Furthermore, in the following detailed description, for convenience of explanation, numerous specific details are set forth in order to provide a thorough understanding of the embodiments of the present disclosure. However, obviously, one or more embodiments may be implemented without these specific details. In other instances, well-known structures and devices are shown in view form in order to simplify the drawings.

Figure 1A:
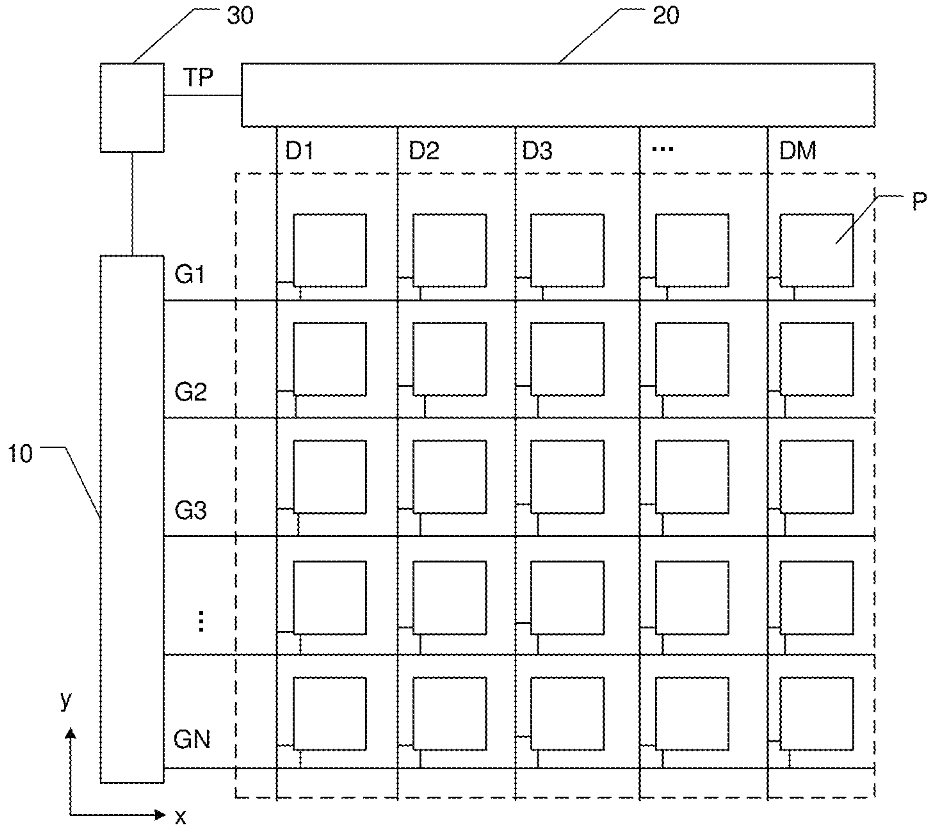
FIG. 1A illustrates a schematic view of a display device according to an embodiment of the present disclosure.

FIG. 1A illustrates a schematic view of a display device according to an embodiment of the present disclosure.

As illustrated in FIG. 1A, the display device 100 includes a plurality of sub-pixels P arranged in an N×M array, wherein N and M are both integers greater than 1.

The display device 100 may further include a gate driving circuit 10, and the gate driving circuit 10 is connected to the plurality of sub-pixels P. The gate driving circuit 10 may be connected to N rows of sub-pixels through a plurality of gate signal lines extending along a first direction (which is x direction in FIG. 1), respectively, for example, connected to a first row of sub-pixels P through a first gate signal line, so as to provide a first gate driving signal G1 to the first row of sub-pixels P, and connected to a second row of sub-pixels P through a second gate signal line, so as to provide a second gate driving signal G2 to the second row of the sub-pixels P, and so on. The first row of sub-pixels P are turned on in response to receiving the first gate driving signal G1, and the second row of sub-pixels P are turned on in response to receiving the second gate driving signal G2, and so on.

In some embodiments, the gate driving circuit 10 may scan N rows of sub-pixels P one row by one row or multiple rows by multiple rows. For example, the gate driving circuit 10 may scan one row of sub-pixels each time, for example, sequentially generate N gate driving signals G1, G2, GN, so as to sequentially turn on the first row of sub-pixels P, the second row of sub-pixels P, . . . the N-th row of sub-pixels P. The gate driving circuit 10 may also scan two or more rows of sub-pixels P each time. For example, the gate driving circuit 10 may simultaneously generate the first gate driving signal G1 and the second gate driving signal G2, so as to simultaneously turn on the first row of sub-pixels P and the second row of sub-pixels P, and then the gate driving circuit 10 may simultaneously generate the third gate driving signal G3 and the fourth gate driving signal G4, so as to simultaneously turn on the third row of sub-pixels P and the fourth-row of sub-pixels P, and so on. In some embodiments, the gate driving circuit 10 may perform interlaced scanning on N rows of sub-pixels P at intervals of at least one row, so as to sequentially turn on portions of rows of the sub-pixels P. For example, the gate driving circuit 10 may sequentially turn on the sub-pixels P in odd-numbered rows (for example, sequentially turn on the first row of sub-pixels P, the third row of sub-pixels P, the fifth row of sub-pixels P, and so on), or sequentially turn on the sub-pixels P in the even-numbered rows (for example, sequentially turn on the second row of sub-pixels P, the fourth row of sub-pixels P, the sixth row of sub-pixels P, and so on).

The display device 100 may further include a source driving circuit 20, and the source driving circuit 20 is connected to the plurality of sub-pixels P. For example, the source driving circuit 20 may be connected to the M columns of sub-pixels P through a plurality of data lines extending along a second direction (which is the y direction in FIG. 1), respectively. For example, the source driving circuit 20 may be connected to the first column of sub-pixels P through a first data line, so as to provide a first data signal D1 to the first column of sub-pixels P, and connected to the second column of sub-pixels P through a second data line, so as to provide a second data signal D2 to the second column of sub-pixels P, and so on.

For example, when the first row of sub-pixels P are turned on, the source driving circuit 20 may respectively provide M data signals D11, D12, . . . , D1M for the first row of sub-pixels to the M sub-pixels P in the first row through M data lines; when the second row of sub-pixels P are turned on, the source driving circuit 20 may respectively provide M data signals D21, D22, . . . , D2M for the second row of sub-pixels to the M sub-pixels Pin the second row through a plurality of data lines, and so on. Of course, the embodiments of the present disclosure are not limited thereto, and the details are further specifically described below.

In some embodiments, the display device 100 may further include a timing controller 30, the timing controller 30 is connected to the gate driving circuit 10 and the source driving circuit 20, and may provide corresponding control signals to the gate driving circuit 10 and the source driving circuit 20. For example, the timing controller 30 may provide a data control signal TP to the source driving circuit 20, and the source driving circuit 20 may output data signals for the respective rows under the control of the data control signal TP. The timing controller 30 may further provide other control signals to the source driving circuit 20, the other control signals include, but are not limited to, a row data start signal, a data synchronization signal, a data inversion signal, etc. The timing controller 30 may also provide various control signals to the gate driving circuit 10, the various control signals include, but are not limited to, a start-up signal, a clock signal, etc., which are required by the gate driving circuit 10.

Figure 1B:
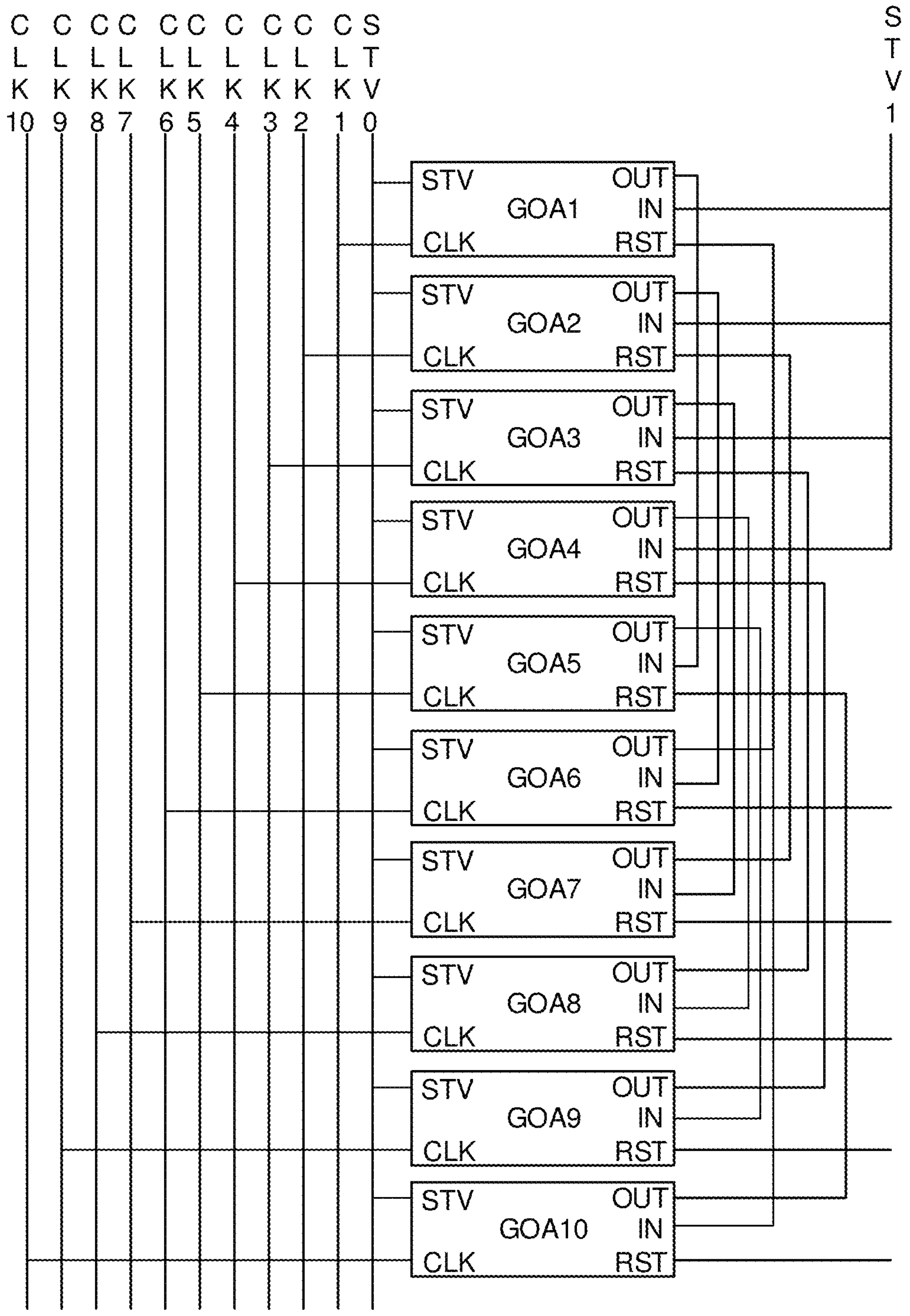
FIG. 1B illustrates an exemplary structure view of a gate driving circuit in the display device of FIG. 1A.

FIG. 1B illustrates an exemplary structure view of the gate driving circuit 10 in the display device of FIG. 1A. As illustrated in FIG. 1B, the gate driving circuit 10 includes multi-stages of shift register units GOA1, GOA2, . . . , GOAN connected in cascades. For the sake of brevity, FIG. 1B illustrates the first to tenth stages of shift register units GOA1 to GOA10. It can be seen from FIG. 1B that, the input terminal IN of the n-th stage of shift register unit GOAn is connected to the output terminal of the (n-4)-th stage of shift register unit GOA(n-4), and the reset terminal RST of the n-th stage of shift register unit is connected to the output terminal OUT of the (n+5)-th stage of shift register unit GOA(n+5), wherein 5 The input terminals IN of the first to fourth stages of shift register units GOA1 to GOA4 are connected to the start signal terminal STV1. The gate driving circuit 10 of FIG. 1B adopts 10 clock signals CLK1 to CLK10, wherein the clock signal terminal CLK of the first stage of shift register unit GOA1 is connected to receive a first clock signal CLK1, and the clock signal terminal CLK of the second stage of shift register unit GOA2 is connected to receive a second clock signal CLK2, and so on, the clock signal terminal CLK of the tenth stage of shift register unit GOA10 is connected to receive a tenth clock signal CLK10. In a similar manner, the eleventh stage to the twentieth stage of the shift register units GOA11 to GOA20 are connected to receive the first to tenth clock signals CLK1 to CLK10, respectively. Each stage of shift register unit GOA1, GOA2, . . . , GOAN further has a main reset terminal STV, which is connected to receive a main reset signal STV0. Each stage of shift register unit GOA1, GOA2, . . . , GOAN may generate an output signal as a gate driving signal at its output terminal OUT under the control of the signals of the clock signal terminal CLK and the input terminal IN. For example, the first stage of shift register unit GOA1 generates the first gate driving signal G1, the second stage of shift register unit GOA2 generates the second gate driving signal G2, and so on. Through connecting in cascades, the gate driving signal generated by one stage of shift register unit may be shifted relative to the gate driving signal generated by another stage of shift register unit.

The above is merely an illustration of the display device of the embodiment of the present disclosure, and the structure of the display device of the embodiments of the present disclosure is not limited thereto, and may have other structures as required. For example, the display device may be a display device based on a liquid crystal display (LCD) technology, or a display device based on an organic light-emitting diode (OLED) display technology. The gate driving circuit of the display device may be connected in cascades in a manner different from that is illustrated in FIG. 1B, for example, may be connected in cascades in a different manner using 8 or 12 clock signals.

FIG. 2 illustrates a signal timing diagram of a display driving method. The signal timing sequence of FIG. 2 is described below by taking the display device of FIG. 1A and FIG. 1B as an example.

As illustrated in FIG. 2, in each frame, the gate driving circuit 10 sequentially generates the first gate driving signal G1, the second gate driving signal G2, the third gate driving signal G3, the fourth gate driving signal G4, and so on, with a predetermined time interval. The time interval is the unit scanning time H, which is the time needed to scan one row of sub-pixels, that is, the time interval between generating the gate driving signal for one row of sub-pixels and generating the gate driving signal for the next row of sub-pixels. In FIG. 2, the effective electrical level duration of each gate driving signal is 4H.

For the first row of sub-pixels, in the time periods T1 to T4, the first gate driving signal G1 is at a high level, such that the first row of sub-pixels are in an on-state, and the lengths of the time periods T1 to T4 are all H, that is to say, the first sub-pixel is turned on for a duration of 4H. In the time period T4, the first high-level pulse of the data control signal TP arrives, thereby controlling the source driving circuit 20 to apply the data signals (also referred to as a first row of data signals) DATA1 for the first row of sub-pixels to the first row of sub-pixels in the on-state. The first row of data signals DATA1 may include M data signals D11, D12, . . . , D1M respectively for the M sub-pixels in the first row, wherein the data signal D11 is provided to the sub-pixel at the first row and first column, the data signal D12 is provided to the sub-pixel at the first row and the second column, . . . , the data signal D1M is provided to the sub-pixel at the first row and the M-th column.

Similarly, for the second row of sub-pixels, in the time period T2 to T5, the second gate driving signal G2 is at a high level, such that the second row of sub-pixels are in the on-state, wherein in the time period T5, a second high-level pulse of the data control signal TP arrives, thereby controlling the source driving circuit 20 to apply the data signals (also referred to as the second row of data signals) DATA2 for the second row of sub-pixels to the second row of sub-pixels in the on-state. The second row of data signals DATA2 may include M data signals D21, D22, D2M respectively for the M sub-pixels in the second row, wherein the data signal D21 is provided to the sub-pixel at the second row and first column, the data signal D22 is provided to the sub-pixel at the second row and second column, . . . , the data signal D2M is provided to the sub-pixel at the second row and the M-th column, and so on for other rows of sub-pixels.

It can be seen that, for each row of sub-pixels, although the sub-pixels are in the on-state for a time period of 4 times the unit scanning time, the length of time (also referred to as the actual charging time) for each row of sub-pixels being written data signals is only one times the unit scanning time H. Taking an 8K display device with a resolution of 7680×4320 as an example, in the case that the refresh rate is 60 Hz, the scanning time of one frame is 1/60 second, that is, the time spent for scanning 4320 rows of sub-pixels is 1/60 second, then, the time spent for scanning each row of sub-pixels (i.e., unit scanning time) is H=1/60÷ 4320 3.7 μs. In the case that the refresh rate is 120 Hz, the unit scanning time H is 1.85 μs, which is too short to fully charge the sub-pixels, thus affecting the display.

An embodiment of the present disclosure provides a display driving method, through simultaneously applying data signals to at least two rows of sub-pixels that are simultaneously in the on-state, the duration of applying data signals to each row of sub-pixels is longer than the unit scanning time. The display driving method may be performed by the above-described display device, and the display driving method will be described in detail below with reference to FIG. 3 to FIG. 6 and combining the display device described above with reference to FIG. 1A.

FIG. 3 illustrates a flowchart of a display driving method according to an embodiment of the present disclosure.

In step S301, a plurality of sub-pixels arranged in an N×M array are scanned one row by one row or multiple rows by multiple rows, so as to turn on each row of sub-pixels that are scanned, such that the duration of two adjacent rows of sub-pixels being simultaneously in the on-state is not less than twice the unit scanning time, and the unit scanning time is the time needed to scan one row of sub-pixels, wherein N and M are both integers greater than 1.

In step S302, data signals are applied to at least two rows of sub-pixels that are simultaneously in the on-state, such that the duration of at least a portion of the rows of sub-pixels being applied with data signals is greater than the unit scanning time.

FIG. 4 illustrates a signal timing diagram of a display driving method according to an embodiment of the present disclosure. The details are described below in conjunction with the display device of FIG. 1A.

In the time period T1 (first time period), the first gate driving signal G1 and the second gate driving signal G2 are at high levels, such that the first row of sub-pixels and the second row of sub-pixels are simultaneously turned on.

In the time period T2 (second time period), the third gate driving signal G3 and the fourth gate driving signal G4 are at high levels, such that the third row of sub-pixels and the fourth row of sub-pixels are simultaneously turned on, and the first gate driving signal G1 and the second gate driving signal G2 maintain at the high level, such that the first row of sub-pixels and the second row of sub-pixels remain in the on-state, and the source driving circuit 20 applies data signals to the first row of sub-pixels and the second row of sub-pixels under the control of the data control signal TP.

In FIG. 4, the time period T2 includes a first sub-period T21 and a second sub-period T22.

In the first sub-period T21, the first high-level pulse of the data control signal TP arrives, such that the source driving circuit 20 applies the data signals (also referred to as a first row of data signals) DATA1 for the first row of sub-pixels to the first row of sub-pixels and the second row of sub-pixels. The first row of data signals DATA1 may include M data signals D11, D12, . . . , D1M respectively for the M sub-pixels in the first row, wherein the data signal D11 may be applied to the sub-pixel at the first row and first column and the sub-pixel at the second row and first column, the data signal D12 may be applied to the sub-pixel at the first row and second column, and the sub-pixel at the second row and second column, and so on.

In the second sub-period T22, the second high-level pulse of the data control signal TP arrives, such that the source driving circuit 20 applies the data signals (also referred to as the second row of data signals) DATA2 for the second row of sub-pixels to both the first row of sub-pixels and the second row of sub-pixels. The second row of data signals DATA2 may include M data signals D21, D22, D2M respectively for the M sub-pixels in the second row, wherein the data signal D21 is applied to the sub-pixel at the first row and first column, and the sub-pixel at the second row and first column, and the data signal D22 is applied to the sub-pixel at the first row and second column and the sub-pixel at the second row and second column, and so on.

Similarly, for the third and fourth rows of sub-pixels, in the first time period (time period T2 in FIG. 4), the third and fourth rows of sub-pixels are turned on; in the second time period (time period T3 in FIG. 4), the fifth and sixth rows of sub-pixels are turned on, and the third and fourth rows of sub-pixels remain in the on-state, wherein in the first sub-period T31 of the time period T3, the third high-level pulse of the data control signal TP arrives, such that the source driving circuit 20 applies the third row of data signals DATA3 to the third row and fourth row of sub-pixels; in the second sub-period T32 of the time period T3, the fourth high-level pulse of the data control signal TP arrives, such that the source driving circuit 20 applies the fourth row of data signals DATA4 to the third row and fourth row of sub-pixels.

In such a way, it can be realized that, in the first time period, the n-th row of sub-pixels and the (n+1)-th row of sub-pixels are simultaneously turned on; in the first sub-period of the second time period, the n-th row of data signals are applied to the n-th row of sub-pixels and (n+1)-th row of sub-pixels, while in the second sub-period of the second time period, the (n+1)-th row of data signals are applied to the n-th row of sub-pixels and (n+1)-th row of sub-pixels, wherein n is an integer, and $1 \leq n \leq N-1$.

For each row of sub-pixels, the length of the second time period may be set to be greater than or equal to twice the unit scanning time H, such that the length of time for each row of sub-pixels being applied with data signals is larger than or equal to 2H. For example, in the example of FIG. 4, the time period during which the first row and second row of sub-pixels are applied with the data signals is the time period T2, the time period during which the third row and fourth row of sub-pixels are applied with the data signals is the time period T3, and so on. The lengths of the time period T1 and the time period T2 may be set as 2H, and the length of the first sub-period T21 and the second sub-period T22 of the time period T2 may be set as H, such that the actual charging time of the first row and the second row of sub-pixels reaches 2H. Similarly, the actual charging time of the third row and fourth row of sub-pixels may also reach 2H.

Optionally, the overlap time between the time during which the third row of sub-pixels and the fourth row of sub-pixels are turned on and the time during which the first row of sub-pixels and the second row of sub-pixels are turned on is T2. For example, the length of T2 may be set to be 2H.

Optionally, the time when the first row of sub-pixels and the second row of sub-pixels are turned on is earlier than the time when the third row of sub-pixels and fourth row of sub-pixels are turned on for a duration of T1, for example, the duration of T1 may be set to be 1H-3H; or T1 is 1/4-1/2 of the total duration of T1+T2.

Although in the above-described embodiment, the application of the data signals are triggered by the rising edge of the pulse of the data control signal TP, the embodiments of the present disclosure are not limited thereto, and the application of the data signals may also be triggered by the falling edge of the pulse of the data control signal TP, which may also be applied to subsequent embodiments, and details are not repeated here.

In the embodiments of the present disclosure, through applying data signals to two rows of sub-pixels that are simultaneously turned on, the actual charging duration of each row of sub-pixels can reach 2H or longer; through respectively applying two rows of data signals in two sub-periods of the second time period, complete picture information can be displayed.

Optionally, m rows of sub-pixels may be configured as a group, wherein m is an integer greater than or equal to 2, for example, m=3 or 4. The duration for which the respective rows of sub-pixels in each group are simultaneously in the on-state is not less than 2*m times the unit scanning time, the unit scanning time is the time required to scan one row of sub-pixels; and the overlap time of adjacent groups being turned on is not less than m times the unit scanning time. For example, the first row to the fourth row of sub-pixels (corresponding to G1-G4, respectively) are the first group, and the fifth row to the eighth row of sub-pixels (corresponding to G5-G8, respectively) are the second group, and so on.

Optionally, the data signals are applied to at least a group of m rows of sub-pixels that are simultaneously in the on-state, such that the duration of applying data signals to each row of sub-pixels is greater than the unit scanning time. Preferably, the data signals are applied to at least one group of m rows of sub-pixels that are simultaneously in the on-state, such that the duration of applying data signals to each row of sub-pixels is greater than m times the unit scanning time. Of course, the data signals may also be applied to at least one group of m rows of sub-pixels that are simultaneously in the on-state, such that the duration of applying data signals to each row of sub-pixels is equal to twice the unit scanning time.

Figure 5:
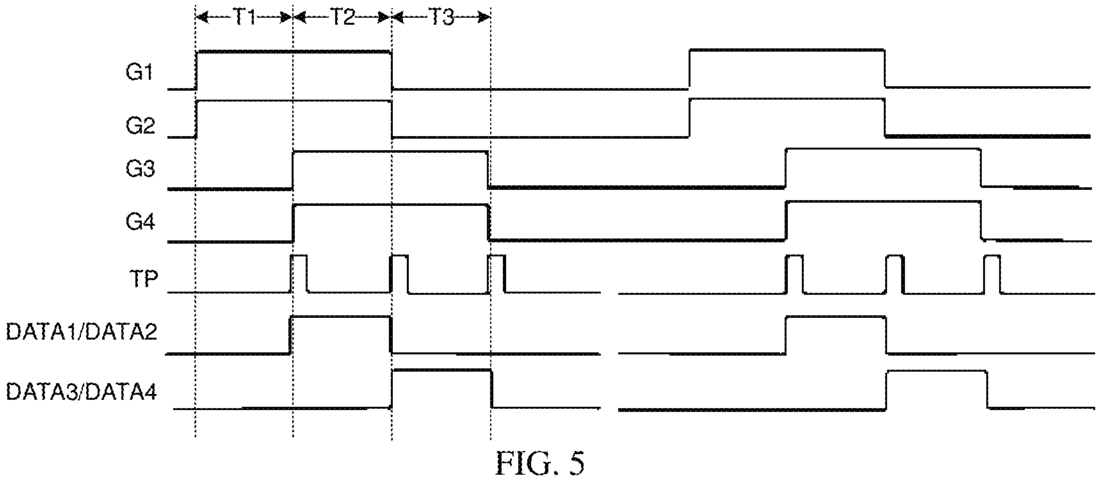
FIG. 5 illustrates a signal timing diagram of a display driving method according to another embodiment of the present disclosure.

FIG. 5 illustrates a signal timing diagram of a display driving method according to another embodiment of the present disclosure. The display driving method of FIG. 5 is similar to that of FIG. 4, and the difference lies at least in the manner of applying the data signals in the second time period. For the sake of brevity, the different parts will be mainly described in detail below.

In the time period T1 (first time period), similar to FIG. 4, the first row of sub-pixels and the second row of sub-pixels are simultaneously turned on.

In the time period T2 (the second period), the third row of sub-pixels and the fourth row of sub-pixels are simultaneously turned on, and the first row of sub-pixels and the second row of sub-pixels remain in the on-state, and different from FIG. 4, one of the first row of data signals DATA1 and the second row of data signals DATA2 are applied to the first row and second row of sub-pixels. For example, in the time period T2, the first high-level pulse of the data control signal TP arrives, such that the source driver 20 applies the first row of data signals DATA1 to the first row and second row of sub-pixels P that are simultaneously in the on-state. The first row of data signals DATA1 may include M data signals D11, D12, . . . , DIM, respectively for the M sub-pixels in the first row, the data signal D11 may be applied to the sub-pixel at the first row and first column and the sub-pixel at the second row and first column, the data signal D12 may be applied to the sub-pixel at the first row and second column and the sub-pixel at the second row and second column, and so on.

Similarly, for the third row and fourth row of sub-pixels, in the first time period (time period T2 in FIG. 5), the third row and fourth row of sub-pixels are turned on; in the next second time period (time period T3 in FIG. 5), the fifth row and sixth row of sub-pixels are turned on, while the third row and fourth row of sub-pixels remain in the on-state, and the second high-level pulse of the data control signal TP arrives, such that the source driving circuit 20 applies the third row of data signals DATA3 to the third row and fourth row of sub-pixels.

In the above embodiments, the first row of data signals DATA1 are applied to the first row and second row of sub-pixels, and the third row of data signals DATA3 are applied to the third row and fourth row of sub-pixels, but the embodiments of the present disclosure are not limited thereto. In some embodiments, the second row of data signals DATA2 may be applied to the first row and second row of sub-pixels, and the fourth row of data signals DATA4 may be applied to the third row and fourth row of sub-pixels, and so on.

In this way, it can be realized that the n-th row and (n+1)-th row of the sub-pixels are simultaneously turned on in the first time period, and one of the n-th row of data signals and (n+1)-th row of data signals are applied to the n-th row of sub-pixels and the (n+1)-th row of sub-pixels in the second time period.

For each row of sub-pixels, the length of the second time period may be set to be greater than or equal to twice the unit scanning time H, such that the duration for which each row of sub-pixels is applied with data signals is greater than or equal to 2H. For example, the lengths of the time period T1 and the time period T2 may both be equal to 2H, such that the actual charging duration of the first row and second row of sub-pixels reaches 2H. Similarly, the actual charging duration of the third row and fourth row of sub-pixels can also reach 2H.

In the embodiments of the present disclosure, through applying data signals to two rows of sub-pixels that are simultaneously turned on, the actual charging duration of each row of sub-pixels can reach 2H or more, and through applying one row of data signals to two rows of sub-pixels, the amount of data can be reduced.

Figure 6:
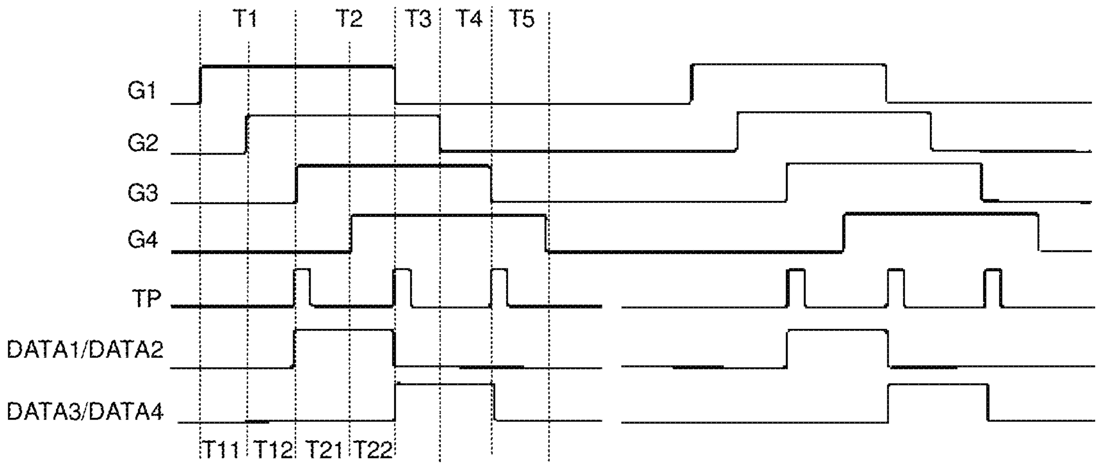
FIG. 6 illustrates a timing diagram of a display driving method according to another embodiment of the present disclosure.

FIG. 6 illustrates a timing diagram of a display driving method according to another embodiment of the present disclosure.

In the time period T1 (the first time period), the first row of sub-pixels and the second row of sub-pixels are sequentially turned on. For example, in the first sub-period T11 of the first time period T1, the first gate driving signal G1 is at a high level, thereby turning on the first row of sub-pixels; in the second sub-period T12 of the first time period T1, the second gate driving signal G2 is at a high level, thereby turning on the second row of sub-pixels.

In the time period T2 (the second time period), the third row of sub-pixels and the fourth row of sub-pixels are sequentially turned on, and data signals are applied to the first row of sub-pixels and the second row of sub-pixels. For example, the first high-level pulse of the data control signal TP arrives, such that the source driving circuit 20 applies one of the first row of data signals DATA1 and the second row of data signals DATA2 (which is the first row of data signals DATA1 in this embodiment) to the first row of sub-pixels and the second row of sub-pixels.

In the time period T3 (the third time period), the first row of sub-pixels are turned off, and data signals are applied to the second row of sub-pixels, the third row of sub-pixels, and the fourth row of sub-pixels. For example, the second high-level pulse of the data control signal TP arrives, such that one of the third row of data signals DATA3 and the fourth row of data signals DATA4 (which is the third row of data signals DATA3 in this embodiment) are applied to the second row of sub-pixels, the third row of sub-pixels and the fourth row of sub-pixels that are in the on-state.

Similarly, for the third row and fourth row of sub-pixels, the third row and fourth row of sub-pixels are sequentially turned on in the first time period (time period T2 in FIG. 6). For example, in the first sub-period T21 of the time period T2, the third gate driving signal G3 is at a high level, thereby turning on the third row of sub-pixels; in the second sub-period T22 of the time period T2, the fourth gate driving signal G2 is at a high level, thereby turning on the fourth row of sub-pixels. In the second time period (time periods T3 and T4 in FIG. 6), the fifth row of sub-pixels and the sixth row of sub-pixels are sequentially turned on, and one of the third row of data signals DATA3 and the fourth row of data signals DATA4 are applied to the third row of sub-pixels and the fourth row of sub-pixels. In the third time period (time period T5 in FIG. 6), the third row of sub-pixels are turned off, and one of the fifth row of data signals DATA5 and the sixth row of data signals DATA6 (which is the fifth row of data signals DATA5 in this embodiment) are applied to the fourth row of sub-pixels, the fifth row of sub-pixels and the sixth row of sub-pixels.

In this way, it can be realized that, in the first time period, the n-th row of sub-pixels and the (n+1)-th row of sub-pixels are sequentially turned on; in the second time period, the (n+2)-th row of sub-pixels and the (n+3)-th row of sub-pixels are sequentially turned on, while one of the n-th row of data signals and (n+1)-th row of data signals are applied to the n-th row of sub-pixels and the (n+1)-th row of sub-pixels; in the third time period, the n-th row of sub-pixels are turned off, and one of the (n+2)-th row of data signals and (n+3)-th row of data signals are applied to the (n+1)-th row of sub-pixels, the (n+2)-th row of sub-pixels and the (n+3)-th row of sub-pixels, wherein n is an integer, and $1 \leq n \leq N-1$.

The length of the second time period may be set to be greater than or equal to 2H, such that the duration for which each row of sub-pixels is applied with data signals is greater than or equal to 2H. For example, in the example of FIG. 6, the time period during which the first row of sub-pixels is applied with data signals is the time period T2, and the time period during which the second row of sub-pixels are applied with data signals is the time periods T2 and T3. The lengths of the time period T1 and the time period T2 may be set to be 2H, and the length of the time period T3 may be set to be H. In this case, the actual charging duration of the first row of sub-pixels is 2H (the length of the time period T2), and the actual charging duration of the second row of sub-pixels is 3H (the sum of the lengths of the periods T2 and T3). Similarly, the actual charging duration of the third row of sub-pixels is 2H, while the actual charging duration of the fourth row of sub-pixels is 3H.

In the embodiments of the present disclosure, through sequentially turning on two rows of sub-pixels and applying data signals to the two rows of sub-pixels that are simultaneously in the on-state, the actual charging duration of portions of the sub-pixels (for example, odd-numbered rows of sub-pixels) can reach 2H or more, the actual charging duration of other portions of the sub-pixels (for example, even-numbered rows of sub-pixels) can reach 3H or more.

Figure 13A:
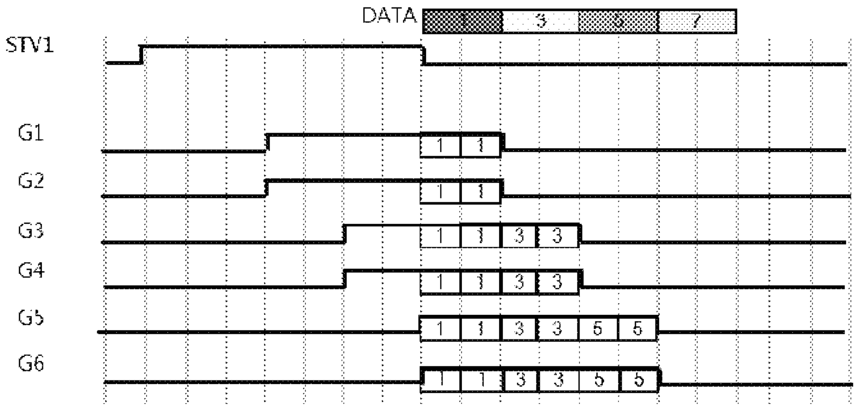
FIG. 13A illustrates a signal timing diagram of a display driving method according to an embodiment of the present disclosure.
Figure 13B:
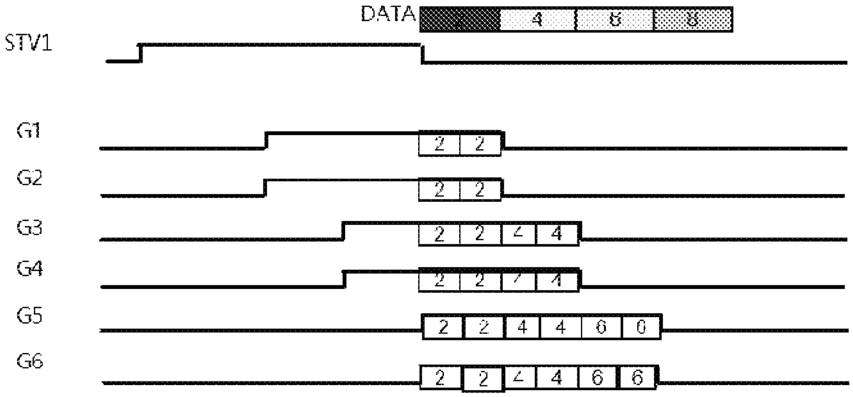
FIG. 13B illustrates a signal timing diagram of a display driving method according to another embodiment of the present disclosure.

FIG. 13A illustrates a signal timing diagram of a display driving method according to an embodiment of the present disclosure, and FIG. 13B illustrates a signal timing diagram of a display driving method according to another embodiment of the present disclosure. In FIG. 13A and FIG. 13B, the time period of each row of sub-pixels being in the on-state (the corresponding gate driving signals, such as G1-G6, are at high levels) includes a charging period and a pre-charging period before the charging period, wherein, the duration of the charging period is equal to twice the unit scanning time H, and the duration of the pre-charging period is greater than or equal to the unit scanning time H. Illustratively, in FIG. 13A and FIG. 13B, the duration of each row of sub-pixels being in the on-state is 6H, wherein the first 4H is the pre-charging period, and the last 2H is the charging period. The pre-charging period of each row of sub-pixels includes a first pre-charging period, and the duration of the first pre-charging period is equal to the unit scanning time H. For example, the first pre-charging period is a time period before the charging period and immediately adjacent to the charging period, and the duration thereof is 1H.

For example, in some embodiments, as illustrated in FIG. 13A and FIG. 13B, the start and end times of the time periods of the (2k-1)-th row of sub-pixels and the 2k-th row of sub-pixels being in the on-state are the same, wherein k=1, 2, 3, . . . ; Accordingly, the start and end times of the pre-charging periods of the (2k-1)-th row of sub-pixels and the 2k-th row of sub-pixels are the same, and the start and end times of the charging periods of the (2k-1)-th row of sub-pixels and the 2k-th row of sub-pixels are the same. In this case, the display driving method may include:

- during the charging period of the (2k-1)-th row of sub-pixels and the 2k-th row of sub-pixels, applying one of the (2k-1)-th row of data signals and the 2k-th row of data signals to the (2k-1)-th row of sub-pixels and the 2k-th row of sub-pixels; and
- during the first pre-charging period of the (2k+1)-th row of sub-pixels and the (2k+2)-th row of sub-pixels, applying one of the (2k-1)-th row of data signals and the 2k-th row of data signals to the (2k-1)-th row of sub-pixels and the 2k-th row of sub-pixels.

For example, in some examples, as shown in FIG. 13A, during the charging period of the first row of sub-pixels and the second row of sub-pixels, the first row of data signals are applied to the first row of sub-pixels and the second row of sub-pixels; during the first pre-charging period of the third row of sub-pixels and the fourth row of sub-pixels, the first row of data signals are applied to the third row of sub-pixels and the fourth row of sub-pixels, during the charging period of the third row of sub-pixels and the fourth row of sub-pixels, the third row of data signals are applied to the third row of sub-pixels and the fourth row of sub-pixels; and so on.

For example, in some other examples, as shown in FIG. 13B, during the charging period of the first row of sub-pixels and the second row of sub-pixels, the second row of data signals are applied to the first row of sub-pixels and the second row of sub-pixels; during the first pre-charging period of the third row of sub-pixels and the fourth row of sub-pixels, the second row of data signals are applied to the third row of sub-pixels and the fourth row of sub-pixels, during the charging period of the third row of sub-pixels and the fourth row of sub-pixels, the fourth row of data signals are applied to the third row of sub-pixels and the fourth row of sub-pixels; and so on.

Optionally, as illustrated in FIG. 13A and FIG. 13B, the rising edge of the start signal STV1 is 2H or 3H earlier than the first gate driving signal G1, and the falling edge of the start signal STV1 corresponds to the start times of the charging periods of the first row of sub-pixels (corresponding to the first gate driving signal G1) and the second row of sub-pixels (corresponding to the second gate driving signal G2).

Optionally, as illustrated in FIG. 13A and FIG. 13B, the pre-charging period of the fifth row of sub-pixels (corresponding to the fifth gate driving signal G5) and the sixth row of sub-pixels (corresponding to the sixth gate driving signal G6) are overlapped with the charging period of the first row of sub-pixels (corresponding to the first gate driving signal G1) and the second row of sub-pixels (corresponding to the second gate driving signal G2), and the overlapping time is at least 2H. For example, the start time of the pre-charging period of the fifth row of sub-pixels and the sixth row of sub-pixels are consistent with the start time of the charging period of the first row of sub-pixels and the second row of sub-pixels.

Figure 14A:
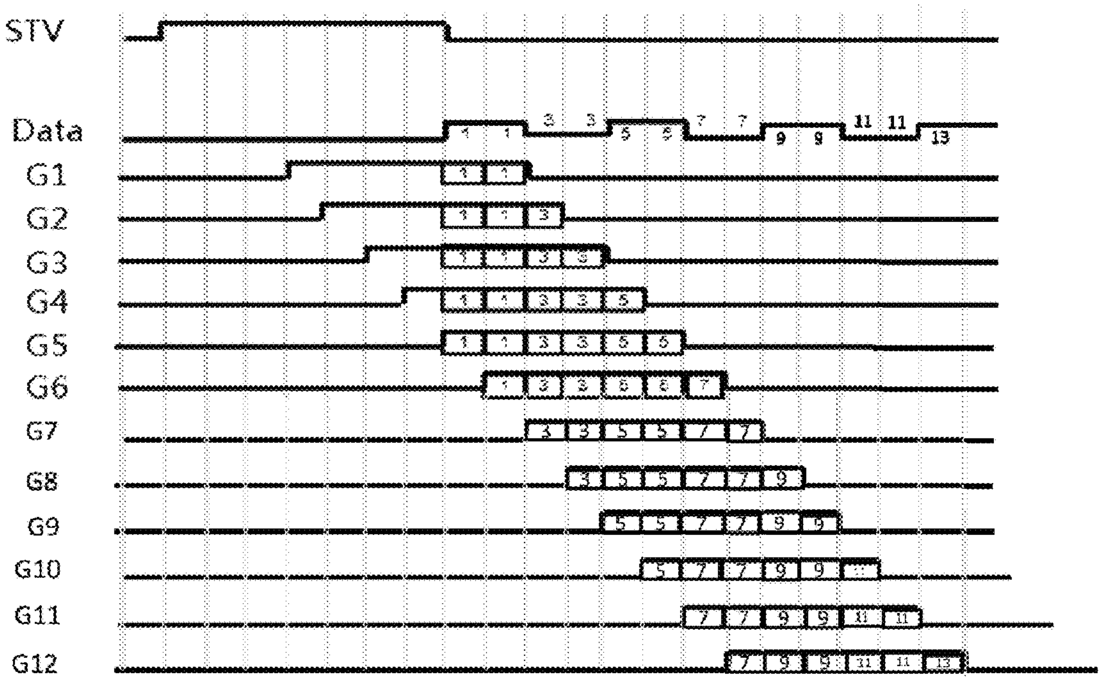
FIG. 14A illustrates a signal timing diagram of a display driving method according to an embodiment of the present disclosure.
Figure 14B:
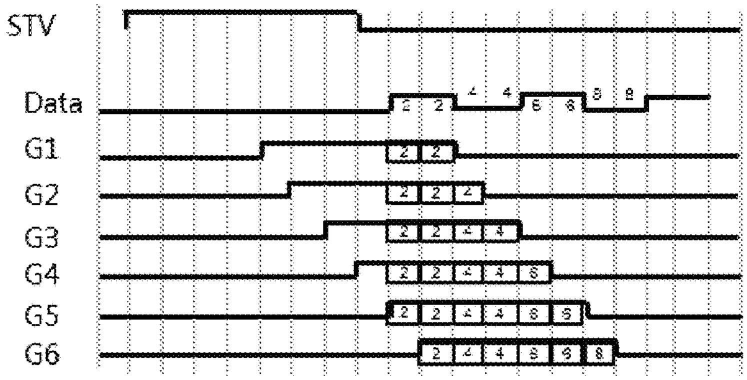
FIG. 14B illustrates a signal timing diagram of a display driving method according to another embodiment of the present disclosure.

FIG. 14A illustrates a signal timing diagram of a display driving method according to an embodiment of the present disclosure, and FIG. 14B illustrates a signal timing diagram of a display driving method according to another embodiment of the present disclosure. In FIG. 14A and FIG. 14B, the time period of each row of sub-pixels being in the on-state (the corresponding gate driving signals, such as G1-G6, are at high levels) includes a charging period and a pre-charging period before the charging period, wherein, the duration of the charging period is equal to twice the unit scanning time H, and the duration of the pre-charging period is greater than or equal to the unit scanning time H. Illustratively, in FIG. 14A and FIG. 14B, the duration of each row of sub-pixels being in the on-state is 6H, wherein the first 4H is the pre-charging period, and the last 2H is the charging period. The pre-charging period of each row of sub-pixels includes a first pre-charging period, and the duration of the first pre-charging period is equal to the unit scanning time H. For example, the first pre-charging period is a time period before the charging period and immediately adjacent to the charging period, and the duration thereof is 1H.

For example, in some embodiments, as illustrated in FIG. 14A and FIG. 14B, the start and end times of the time periods of two adjacent rows of sub-pixels being in the on-state differ by a unit scanning time H; Accordingly, the start and end times of the pre-charging periods of the two adjacent rows of sub-pixels differ by the unit scanning time H, and the start and end times of the charging periods of the two adjacent rows of sub-pixels differ by the unit scanning time H. In this case, the display driving method may include:

- during the charging period of the (2k-1)-th row of sub-pixels, applying one of the (2k-1)-th row of data signals and the 2k-th row of data signals to the (2k-1)-th row of sub-pixels;
- during the first pre-charging period of the 2k-th row of sub-pixels and the first half of the charging period of the 2k-th row of sub-pixels, applying one of the (2k-1)-th row of data signals and the 2k-th row of data signals to the 2k-th row of sub-pixels; during the second half of the charging period of the 2k-th row of sub-pixels, applying one of the (2k+1)-th row of data signals and the 2(k+1)-th row of data signals to the 2k-th row of sub-pixels; and during the first pre-charging period of the (2k+1)-th row of sub-pixels, applying one of the (2k-1)-th row of data signals and the 2k-th row of data signals to the (2k+1)-th row of sub-pixels, wherein k=1, 2, 3, . . . .

For example, in some examples, as illustrated in FIG. 14A, during the charging period of the first row of sub-pixels, the first row of data signals are applied to the first row of sub-pixels; during the first pre-charging period and the first half of the charging period of the second row of sub-pixels, the first row of data signals are applied to the second row of sub-pixels, and during the second half of the charging period of the second row of sub-pixels, the third row of data signals are applied to the second row of sub-pixels; during the first pre-charging period of the third row of sub-pixels, the first row of data signals are applied to the second row of sub-pixels; during the charging period of the third row of sub-pixels, the third row of data signals are applied to the third row of sub-pixels; and so on.

For example, in some other examples, as illustrated in FIG. 14B, during the charging period of the first row of sub-pixels, the second row of data signals are applied to the first row of sub-pixels; during the first pre-charging period and the first half of the charging period of the second row of sub-pixels, the second row of data signals are applied to the second row of sub-pixels, and during the second half of the charging period of the second row of sub-pixels, the fourth row of data signals are applied to the second row of sub-pixels; during the first pre-charging period of the third row of sub-pixels, the second row of data signals are applied to the third row of sub-pixels, during the charging period of the third row of sub-pixels, the fourth row of data signals are applied to the third row of sub-pixels; and so on.

For example, in a specific embodiment, as illustrated in FIG. 14A, the duration of each row of sub-pixels being in the on-state is 6 times the unit scanning time H (i.e., 6H), wherein the first 4H is the pre-charging period, and the last 2H is the charging period. The start and end times of the time periods of two adjacent rows of sub-pixels being in the on-state differ by the unit scanning time H; Accordingly, the start and end times of the pre-charging periods of the two adjacent rows of sub-pixels differ by the unit scanning time H, and the start and end times of the charging periods of the two adjacent rows of sub-pixels differ by the unit scanning time H. In this case, the display driving method may include:

during the charging period of the (6k-5)-th row of sub-pixels, applying the (6k-5)-th row of data signals to the (6k-5)-th row of sub-pixels;

during the last unit scanning time in the pre-charging period of the (6k-4)-th row of sub-pixels and the first half of the charging period of the (6k-4)-th row of sub-pixels, applying the (6k-5)-th row of data signals to the (6k-4)-th row of sub-pixels, in the second half of the charging period of the (6k-4)-th row of sub-pixels, applying the (6k-3)-th row of data signals to the (6k-4)-th row of sub-pixels;

during the last two unit scanning times in the pre-charging period of the (6k-3)-th row of sub-pixels, applying the (6k-5)-th row of data signals to the (6k-3)-th row of sub-pixels, in the charging period of the (6k-3)-th row of sub-pixels, applying the (6k-3)-th row of data signals to the (6k-3)-th row of sub-pixels;

during the middle two unit scanning times in the pre-charging period of the (6k-2)-th row of sub-pixels, applying the (6k-5)-th row of data signals to the (6k-2)-th row of sub-pixels; during the last unit scanning time in the pre-charging period of the (6k-2)-th row of sub-pixels and the first half of the charging period of the (6k-2)-th row of sub-pixels, applying the (6k-3)-th row of data signals to the (6k-2)-th row of sub-pixels, and in the second half of the charging period of the (6k-2)-th row of sub-pixels, applying the (6k-1)-th row of data signals to the (6k-2)-th row of sub-pixels;

during the first two unit scanning times in the pre-charging period of the (6k-1)-th row of sub-pixels, applying the (6k-5)-th row of data signals to the (6k-1)-th row of sub-pixels, during the last two unit scanning times in the pre-charging period of the (6k-1)-th row of sub-pixels, applying the (6k-3)-th row of data signals to the (6k-1)-th row of sub-pixels, and during the charging period of the (6k-1)-th row of sub-pixels, applying the (6k-1)-th row of data signals to the (6k-1)-th row of sub-pixels;

during the first one unit scanning time in the pre-charging period of the 6k-th row of sub-pixels, applying the (6k-5)-th row of data signals to the 6k-th row of sub-pixels, during the middle two unit scanning times in the pre-charging period of the 6k-th row of sub-pixels, applying the (6k-3)-th row of data signals to the 6k-th row of sub-pixels, during the last one unit scanning time in the pre-charging period of the 6k-th row of sub-pixels and the first half of the charging period of the 6k-th row of sub-pixels, applying the (6k-1)-th row of data signals to the 6k-th row of sub-pixels, and during the second half of the charging period of the 6k-th row of sub-pixels, applying the (6k+1)-th row of data signals to the 6k-th row of sub-pixels;

during the first two unit scanning times in the pre-charging period of the (6k+1)-th row of sub-pixels, applying the (6k-3)-th row of data signals to the (6k+1)-th row of sub-pixels, in the last two unit scanning times in the pre-charging period of the (6k+1)-th row of sub-pixels, applying the (6k-1)-th row of data signals to the (6k+1)-th row of sub-pixels, and in the charging period of the (6k+1)-th row of sub-pixels, applying the (6k+1)-th row of data signals to the (6k+1)-th row of sub-pixels;

during the first one unit scanning time in the pre-charging period of the (6k+2)-th row of sub-pixels, applying the (6k-3)-th row of data signals to the (6k+2)-th row of sub-pixels, in the middle two unit scanning times in the pre-charging period of the (6k+2)-th row of sub-pixels, applying the (6k-1)-th row of data signals to the (6k+2)-th row of sub-pixels, in the last one unit scanning time in the pre-charging period of the (6k+2)-th row of sub-pixels and the first half of the charging period of the (6k+2)-th row of sub-pixels, applying the (6k+1)-th row of data signals to the (6k+2)-th row of sub-pixels, and in the second half of the charging period of the (6k+2)-th row of sub-pixels, applying the (6k+3)-th row of data signals to the (6k+2)-th row of sub-pixels;

during the first two unit scanning times in the pre-charging period of the (6k+3)-th row of sub-pixels, applying the (6k-1)-th row of data signals to the (6k+3)-th row of sub-pixels, in the last two unit scanning times in the pre-charging period of the (6k+3)-th row of sub-pixels, applying the (6k+1)-th row of data signals to the (6k+3)-th row of sub-pixels, and in the charging period of the (6k+3)-th row of sub-pixels, applying the (6k+3)-th row of data signals to the (6k+3)-th row of sub-pixels;

during the first one unit scanning time in the pre-charging period of the (6k+4)-th row of sub-pixels, applying the (6k-1)-th row of data signals to the (6k+4)-th row of sub-pixels, in the middle two unit scanning times in the pre-charging period of the (6k+4)-th row of sub-pixels, applying the (6k+1)-th row of data signals to the (6k+4)-th row of sub-pixels, in the last one unit scanning time in the pre-charging period of the (6k+4)-th row of sub-pixels and the first half of the charging period of the (6k+4)-th row of sub-pixels, applying the (6k+3)-th row of data signals to the (6k+4)-th row of sub-pixels, and in the second half of the charging period of the (6k+4)-th row of sub-pixels, applying the (6k+5)-th row of data signals to the (6k+4)-th row of sub-pixels, wherein k=1, 2, 3, . . . .

For example, as illustrated in FIG. 14A, the duration of the start signal STV (which may also be referred to as a "first start signal", referring to subsequent related descriptions) (i.e., the duration of the start signal STV being at high level in FIG. 14A) may be greater than or equal to the duration of the first gate driving signal G1(e.g., 6H). For example, as illustrated in FIG. 14A, the duration of the start signal STV is 7H, the rising edge of the start signal STV is 3H earlier than the rising edge of the first gate driving signal G1, and the falling edge of the start signal STV corresponds to the start time of the charging period of the first row of sub-pixels. Of course, the duration of the start signal STV may also be less than the duration of the first gate driving signal G1; for example, the duration of the start signal STV may be 2H or the like.

Optionally, taking m rows of sub-pixels as one cycle, in the m rows of sub-pixels, the overlapping time between the duration of the second row of sub-pixels being in the on-state and the duration of the first row of sub-pixels being in the on-state is (m-1)*H, the overlapping time between the duration of the third row of sub-pixels being in the on-state and the duration of the first row of sub-pixels being in the on-state is (m-2)*H, . . . , and so on, the overlapping time between the duration of the m-th row of sub-pixels being in the on-state and the duration of the first row of sub-pixels being in the on-state is H. For example, m=6 (as illustrated in FIG. 14A) or m=8, the embodiments of the present disclosure is not limited thereto.

For example, the display driving method used in the specific embodiment shown in FIG. 14B may refer to the display driving method used in the specific embodiment illustrated in FIG. 14A (of course, the difference between the timing sequence shown in FIG. 14B and the timing sequence shown in FIG. 14A should be noted), the specific details will not be repeated here.

Figure 15A:
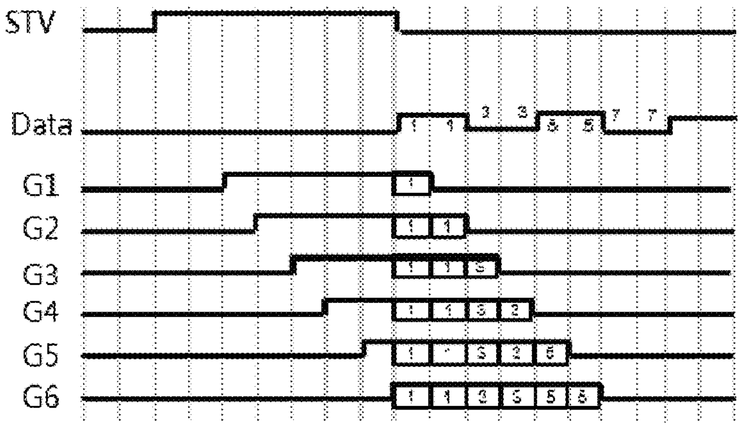
FIG. 15A illustrates a signal timing diagram of a display driving method according to an embodiment of the present disclosure.
Figure 15B:
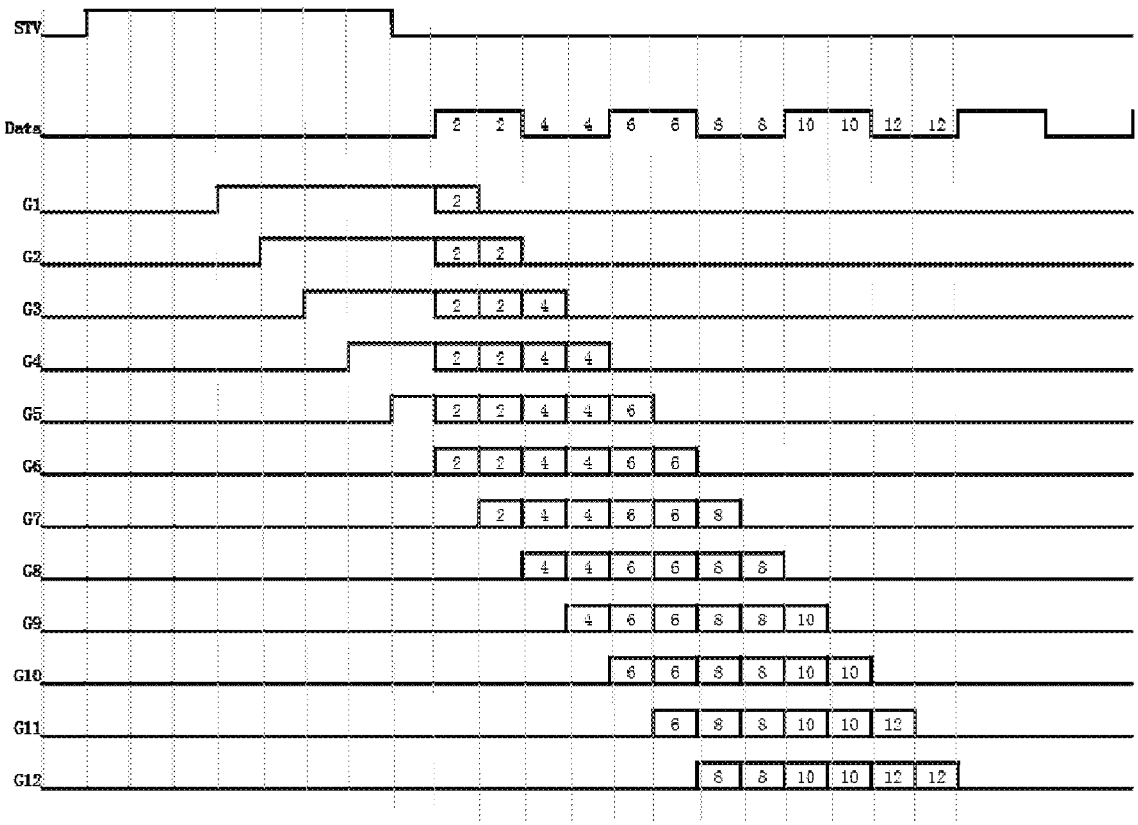
FIG. 15B illustrates a signal timing diagram of a display driving method according to another embodiment of the present disclosure.

FIG. 15A illustrates a signal timing diagram of a display driving method according to an embodiment of the present disclosure, and FIG. 15B illustrates a signal timing diagram of a display driving method according to another embodiment of the present disclosure. In FIG. 15A and FIG. 15B, the time period of each row of sub-pixels being in the on-state (the corresponding gate driving signals, such as G1-G6, being at high levels) includes a charging period and a pre-charging period before the charging period, wherein, the duration of the charging period is equal to twice the unit scanning time H, and the duration of the pre-charging period is greater than or equal to the unit scanning time H. Illustratively, in FIG. 15A and FIG. 15B, the duration of each row of sub-pixels being in the on-state is 6H, wherein the first 4H is a pre-charging period, and the last 2H is a charging period. The pre-charging period of each row of sub-pixels includes a first pre-charging period, and the duration of the first pre-charging period is equal to the unit scanning time H. For example, the first pre-charging period is a time period before the charging period and immediately adjacent to the charging period, and the duration thereof is 1H.

For example, in some embodiments, as illustrated in FIG. 15A and FIG. 15B, the start and end times of the time periods of two adjacent rows of sub-pixels being in the on-states differ by a unit scanning time H; Accordingly, the start and end times of the pre-charging periods of the two adjacent rows of sub-pixels differ by the unit scanning time H, and the start and end times of the charging periods of the two adjacent rows of sub-pixels differ by the unit scanning time H. In this case, the display driving method may include:

- during the second half of the charging period of the (2k-1)-th row of sub-pixels, applying one of the (2k-1)-th row of data signals and the 2k-th row of data signals to the (2k-1)-th row of sub-pixels;
- during the charging period of the 2k-th row of sub-pixels, applying one of the (2k-1)-th row of data signals and the 2k-th row of data signals to the 2k-th row of sub-pixels;
- during the first pre-charging period of the (2k+1)-th row of sub-pixels and the first half of the charging period of the (2k+1)-th row of sub-pixels, applying one of the (2k-1)-th row of data signals and the 2k-th row of data signals to the (2k+1)-th row of sub-pixels, during the second half of the charging period of the (2k+1)-th row of sub-pixels, applying one of the (2k+1)-th row of data signals and the 2(*k*+1)-th row of data signals to the (2k+1)-th row of sub-pixels; and
- during the first pre-charging period of the 2(k+1)-th row of sub-pixels, applying one of the (2k-1)-th row of data signals and the 2k-th row of data signals to the 2(k+1)-th row of sub-pixels, wherein, k=1, 2, 3, . . . .

For example, in some examples, as illustrated in FIG. 15A, in the second half of the charging period of the first row of sub-pixels, the first row of data signals are applied to the first row of sub-pixels; during the charging period of the second row of sub-pixels, the first row of data signals are applied to the second row of sub-pixels; in the first pre-charging period and the first half of the charging period of the third row of sub-pixels, the first row of data signals are applied to the third row of sub-pixels, in the second half of the charging period of the third row of sub-pixels, the third row of data signals are applied to the third row of sub-pixels; in the first pre-charging period of the fourth row of sub-pixels, the first row of data signals are applied to the fourth row of sub-pixels, during the charging period of the fourth row of sub-pixels, the third row of data signals are applied to the fourth row of sub-pixels; and so on.

For example, in some other examples, as illustrated in FIG. 15B, during the second half of the charging period of the first row of sub-pixels, the second row of data signals are applied to the first row of sub-pixels; during the charging period of the second row of sub-pixels, the second row of data signals are applied to the second row of sub-pixels; during the first pre-charging period and the first half of the charging period of the third row of sub-pixels, the second row of data signals are applied to the third row of sub-pixels, during the second half of the charging period of the third row of sub-pixels, the fourth row of data signals are applied to the third row of sub-pixels; during the first pre-charging period of the fourth row of sub-pixels, the second row of data signals are applied to the fourth row of sub-pixels, during the charging period of the fourth row of sub-pixels, the fourth row of data signals are applied to the fourth row of sub-pixels; and so on.

For example, in a specific embodiment, as shown in FIG. 15B, the duration of each row of sub-pixels being in the on-state is 6 times the unit scanning time H (i.e., 6 H), wherein, the first 4 H is the pre-charging period, and the last 2H is the charging period. The start and end times of the time periods of two adjacent rows of sub-pixels being in the on-state differ by a unit scanning time H; Accordingly, the start and end times of the pre-charging periods of the two adjacent rows of sub-pixels differ by the unit scanning time H, the start and end times of the charging periods of the two adjacent rows of sub-pixels differ by the unit scanning time H. In this case, the display driving method may include:

during the second half of the charging period of the (6k-5)-th row of sub-pixels, applying the (6k-4)-th row of data signals to the (6k-5)-th row of sub-pixels;

during the charging period of the (6k-4)-th row of sub-pixels, applying the (6k-4)-th row of data signals to the (6k-4)-th row of sub-pixels;

during the last one unit scanning time in the pre-charging period of the (6k-3)-th row of sub-pixels and the first half of the charging period of the (6k-3)-th row of sub-pixels, applying the (6k-4)-th row of data signals to the (6k-3)-th row of sub-pixels; during the second half of the charging period of the (6k-3)-th row of sub-pixels, applying the (6k-2)-th row of data signals to the (6k-3)-th row of sub-pixels;

during the last two unit scanning times in the pre-charging period of the (6k-2)-th row of sub-pixels, applying the (6k-4)-th row of data signals to the (6k-2)-th row of sub-pixels; during the charging period of the (6k-2)-th row of sub-pixels, applying the (6k-2)-th row of data signals to the (6k-2)-th row of sub-pixels;

during the middle two unit scanning times in the pre-charging period of the (6k-1)-th row of sub-pixels, applying the (6k-4)-th row of data signals to the (6k-1)-th row of sub-pixels; during the last one unit scanning time in the pre-charging period of the (6k-1)-th row of sub-pixels and the first half of the charging period of the (6k-1)-th row of sub-pixels, applying the (6k-2)-th row of data signals to the (6k-1)-th row of sub-pixels; during the second half of the charging period of the (6k-1)-th row of sub-pixels, applying the 6k-th row of data signals to the (6k-1)-th row of sub-pixels;

during the first two unit scanning times in the pre-charging period of the 6k-th row of sub-pixels, applying the (6k-4)-th row of data signals to the 6k-th row of sub-pixels;

during the last two unit scanning times in the pre-charging period of the 6k-th row of sub-pixels, applying the (6k-2)-th row of data signals to the 6k-th row of sub-pixels; during the charging period of the 6k-th row of sub-pixels, applying the 6k-th row of data signals to the 6k-th row of sub-pixels;

during the first one unit scanning time in the pre-charging period of the (6k+1)-th row of sub-pixels, applying the (6k-4)-th row of data signals to the (6k+1)-th row of sub-pixels; during the middle two unit scanning times in the pre-charging period of the (6k+1)-th row of sub-pixels, applying the (6k-2)-th row of data signals to the (6k+1)-th row of sub-pixels; during the last one unit scanning time in the pre-charging period of the (6k+1)-th row of sub-pixels and the first half of the charging period of the (6k+1)-th row of sub-pixels, applying the 6k-th row of data signals to the (6k+1)-th row of sub-pixels; during the second half of the charging period of the (6k+1)-th row of sub-pixels, applying the (6k+2)-th row of data signals to the (6k+1)-th row of sub-pixels;

during the first two unit scanning times in the pre-charging period of the (6k+2)-th row of sub-pixels, applying the (6k-2)-th row of data signals to the (6k+2)-th row of sub-pixels; during the last two unit scanning times in the pre-charging period of the (6k+2)-th row of sub-pixels, applying the 6k-th row of data signals to the (6k+2)-th row of sub-pixels; during the charging period of the (6k+2)-th row of sub-pixels, applying the (6k+2)-th row of data signals to the (6k+2)-th row of sub-pixels;

during the first one unit scanning time in the pre-charging period of the (6k+3)-th row of sub-pixels, applying the (6k-2)-th row of data signals to the (6k+3)-th row of sub-pixels; during the middle two unit scanning times in the pre-charging period of the (6k+3)-th row of sub-pixels, applying the 6k-th row of data signals to the (6k+3)-th row of sub-pixels; during the last one unit scanning time in the pre-charging period of the (6k+3)-th row of sub-pixels and the first half of the charging period of the (6k+3)-th row of sub-pixels, applying the (6k+2)-th row of data signals to the (6k+3)-th row of sub-pixels; during the second half of the charging period of the (6k+3)-th row of sub-pixels, applying the (6k+4)-th row of data signals to the (6k+3)-th row of sub-pixels;

during the first two unit scanning times in the pre-charging period of the (6k+4)-th row of sub-pixels, applying the 6k-th row of data signals to the (6k+4)-th row of sub-pixels; during the last two unit scanning times in the pre-charging period of the (6k+4)-th row of sub-pixels, applying the (6k+2)-th row of data signals to the (6k+4)-th row of sub-pixels; during the charging period of the (6k+4)-th row of sub-pixels, applying the (6k+4)-th row of data signals to the (6k+4)-th row of sub-pixels;

during the first one unit scanning time in the pre-charging period of the (6k+5)-th row of sub-pixels, applying the 6k-th row of data signals to the (6k+5)-th row of sub-pixels; during the middle two unit scanning times in the pre-charging period of the (6k+5)-th row of sub-pixels, applying the (6k+2)-th row of data signals to the (6k+5)-th row of sub-pixels; during the last one unit scanning time in the pre-charging period of the (6k+5)-th row of sub-pixels and the first half of the charging period of the (6k+5)-th row of sub-pixels, applying the (6k+4)-th row of data signals to the (6k+5)-th row of sub-pixels; during the second half of the charging period of the (6k+5)-th row of sub-pixels, applying the (6k+6)-th row of data signals to the (6k+5)-th row of sub-pixels; wherein k=1, 2, 3, . . . .

For example, as illustrated in FIG. 15B, the duration of the start signal STV (which may also be referred to as a "second start signal", referring to subsequent related descriptions) (i.e., the duration of the start signal STV being at high level in FIG. 15B) may be greater than or equal to the duration of the first gate driving signal G1(e.g., 6H). For example, as illustrated in FIG. 15B, the duration of the start signal STV is 7H, the rising edge of the start signal STV is 3H earlier than the rising edge of the first gate driving signal G1, and the falling edge of the start signal STV corresponds to the start time of the charging period of the first row of sub-pixels, or the falling edge of the start signal STV is H earlier than the rising edge of the first gate driving signal G1. Of course, the duration of the start signal STV may also be less than the duration of the first gate driving signal G1; for example, the duration of the start signal STV may be 2H or the like.

Optionally, taking m rows of sub-pixels as one cycle, in the m rows of sub-pixels, the overlapping time between the duration of the second row of sub-pixels being in the on-state and the duration of the first row of sub-pixels being in the on-state is (m-1)*H, the overlapping time between the duration of the third row of sub-pixels being in the on-state and the duration of the first row of sub-pixels being in the on-state is (m-2)*H, . . . , and so on, the overlapping time between the duration of the m-th row of sub-pixels being in the on-state and the duration of the first row of sub-pixels being in the on-state is H. For example, m=6 (as illustrated in FIG. 15B) or m=8, the embodiments of the present disclosure is not limited thereto.

For example, the display driving method used in the specific embodiment illustrated in FIG. 15A may refer to the display driving method used in the specific embodiment illustrated in FIG. 15B (of course, the difference between the timing sequence illustrated in FIG. 15A and the timing sequence illustrated in FIG. 15B should be noted), the specific details will not be repeated here.

In the above-mentioned embodiment, pre-charging may realize charging improvement, because the data signals hardly need to consider the rise delay, and the difference between two adjacent row of data signals is small, such that the image quality of the display device is good.

It should be understood that, in the embodiments of the present disclosure, the charging period and the pre-charging period aim to distinguish two different (sub) periods in the time period of each row of sub-pixels being in the on state, a portion or the whole of the pre-charging period(s) of one certain row or several certain rows of sub-pixels may not perform the operation of per-charging, and a first half of the charging period of the first row of sub-pixels may not perform the charging operation.

In the embodiments of the present disclosure, through sequentially turning on the respective rows of sub-pixels, and applying data signals to the respective rows of sub-pixels that are simultaneously in the on-state, the actual charging duration (the total duration of the pre-charging period and the charging period) of a portion of the sub-pixels can reach 2H or more.

The embodiments of the present disclosure also provide a display driving method in which through driving a portion of the sub-pixels and another portion of the sub-pixels in different manners in different frames, the actual charging duration of each sub-pixel in at least one frame is longer than the unit scanning time. The display driving method may be performed by the above-mentioned display device, and the display driving method will be described in detail below with reference to FIG. 7 to FIG. 10C combing the display device described above with reference to FIG. 1A.

Figure 7:
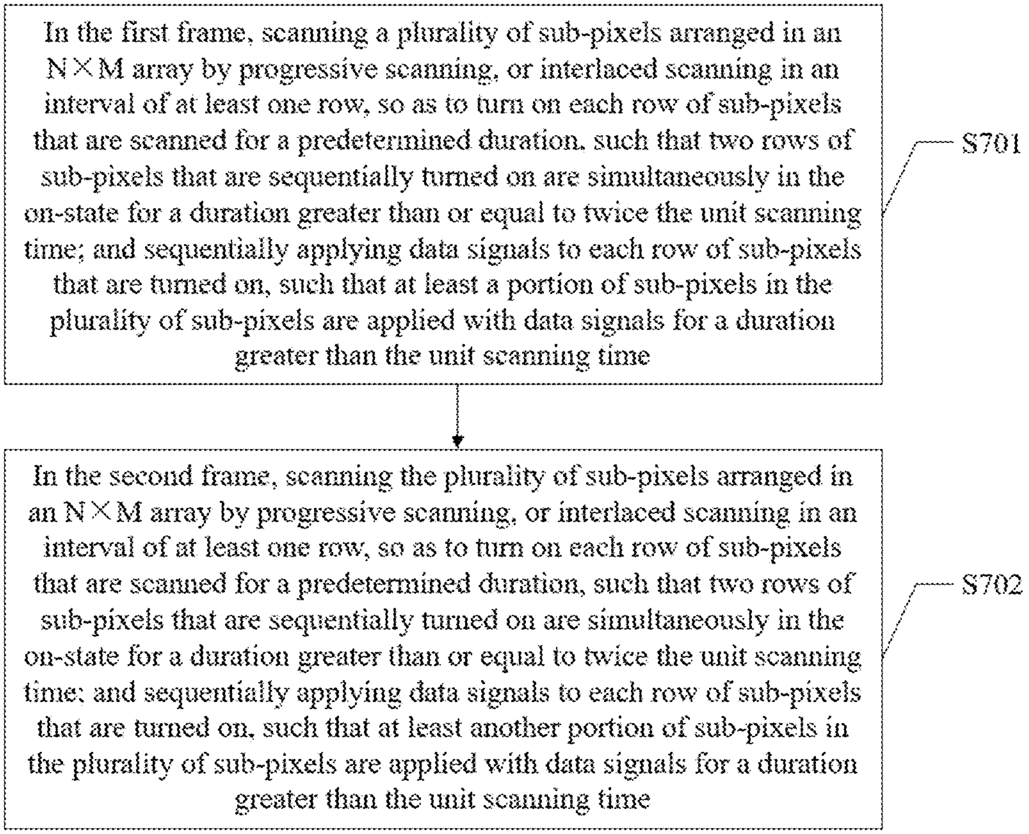
FIG. 7 illustrates a flowchart of a display driving method according to another embodiment of the present disclosure.

FIG. 7 illustrates a flowchart of a display driving method according to another embodiment of the present disclosure.

In step S701, in the first frame, a plurality of sub-pixels arranged in an N×M array are scanned by progressive scanning, or scanned by interlaced scanning in an interval of at least one row, so as to turn on the each row of sub-pixels that are scanned, such that the duration of two rows of sub-pixels that are sequentially turned on being simultaneously in the on-state is greater than or equal to 2H; and the data signals are sequentially applied to each row of sub-pixels that are turned on, such that at least a portion of sub-pixels in the plurality of sub-pixels are applied with data signals for a duration greater than H.

In step S702, in the second frame, the plurality of sub-pixels arranged in an N×M array are scanned by progressive scanning, or scanned by interlaced scanning in an interval of at least one row, so as to turn on each row of the sub-pixels that are scanned, such that the duration of two rows of sub-pixels that are sequentially turned on being simultaneously in the on-state is greater than or equal to 2H; and the data signals are sequentially applied to each row of sub-pixels that are turned on, such that at least another portion of sub-pixels in the plurality of sub-pixels are applied with data signals for a duration greater than H.

In some embodiments, in the first frame, the plurality of sub-pixels may be scanned one odd-numbered row by one odd-numbered row, and data signals are applied to each odd-numbered row of sub-pixels of that are turned on, such that the odd-numbered row of sub-pixels are applied with data signals for a duration greater than or equal to 2H; in the second frame, the plurality of sub-pixels may be scanned one even-numbered row by one even-numbered row, and data signals are applied to each even-numbered row of sub-pixels of that are turned on, such that the even-numbered row of sub-pixels are applied with data signals for a duration greater than or equal to 2H. This will be described below with reference to FIG. 8A to FIG. 9C.

Figure 8A:
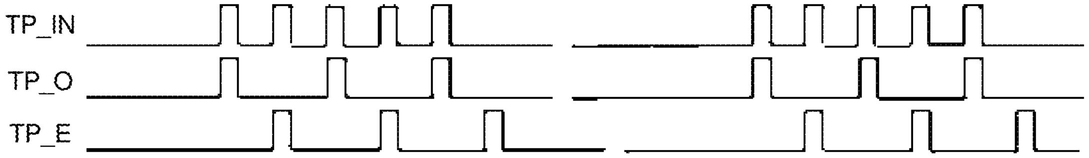
FIG. 8A illustrates a timing diagram of data control signals in a display driving method according to another embodiment of the present disclosure.
Figure 8B:
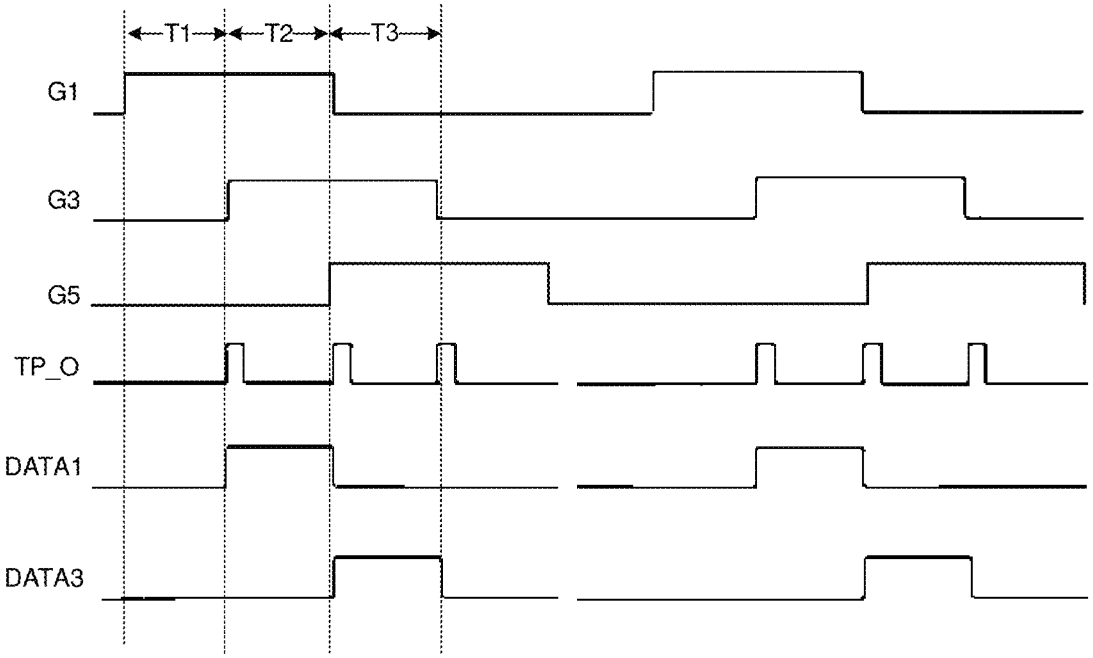
FIG. 8B illustrates a signal timing diagram in an odd-numbered frame of a display driving method according to another embodiment of the present disclosure.
Figure 8C:
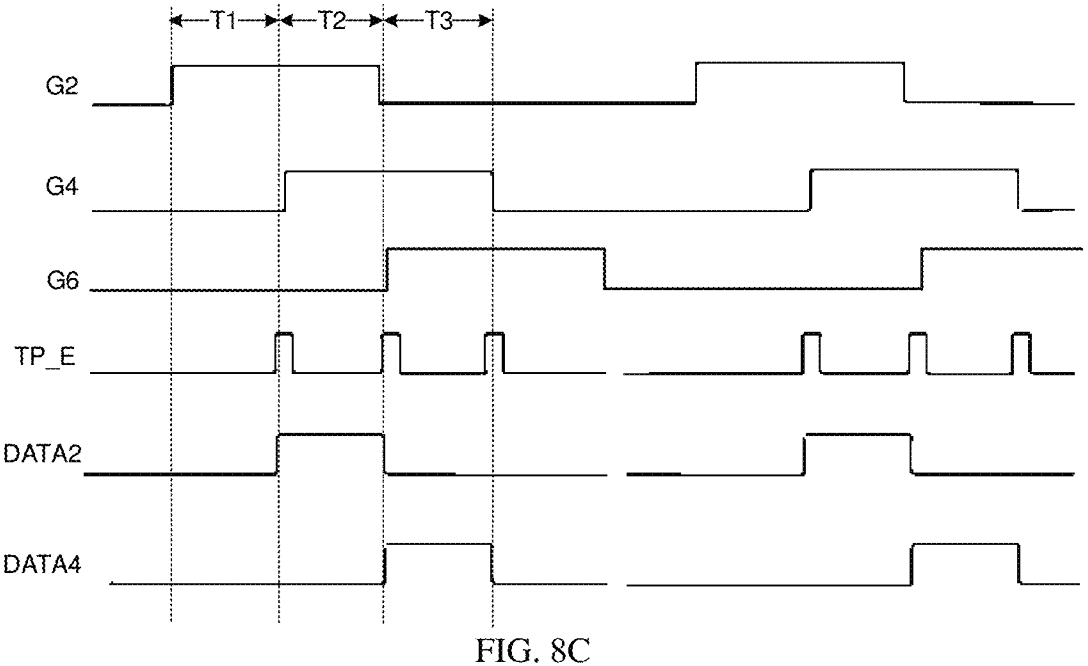
FIG. 8C illustrates a signal timing diagram in an even-numbered frame of a display driving method according to another embodiment of the present disclosure.

FIG. 8A illustrates a timing diagram of data control signals in a display driving method according to another embodiment of the present disclosure, and FIG. 8B illustrates a signal timing diagram in an odd-numbered frame of a display driving method according to another embodiment of the present disclosure. FIG. 8C illustrates a signal timing diagram in an even-numbered frame of a display driving method according to another embodiment of the present disclosure.

As illustrated in FIG. 8A, data control signals for odd-numbered frames (also referred to as odd-numbered frame data control signals) TP_O and data control signals for even-numbered frames (also referred to as even-numbered frame data control signals) TP_E may be generated based on the initial data control signals TP_IN. The signal cycles of the odd-numbered frame data control signal TP_O and the even-numbered frame data control signal TP_E may be twice that of the initial data control signal TP_IN. The duty ratios of the odd-numbered frame data control signal TP_O and the even-numbered frame data control signal TP_E may both be half of that of the initial data control signal TP_IN. The even-numbered frame data control signal TP_E may be shifted with respect to the odd-numbered frame data control signal TP_O, for example, by a half cycle. The application of the data signals in the odd-numbered frame may be controlled by the odd-numbered frame data control signal TP_O, and the application of the data signals in the even-numbered frame may be controlled by the even-numbered frame data control signal TP_E.

As illustrated in FIG. 8B, in an odd-numbered frame, the plurality of sub-pixels may be scanned one odd-numbered row by one odd-numbered row, and data signals are applied to each odd-numbered row of sub-pixels of that are turned on, under the control of the odd-numbered frame data control signal TP_O.

During the time period T1 (a first time period), the first gate driving signal G1 is at a high level, thereby turning on the first row of sub-pixels.

During the time period T2 (a second time period), the third gate driving signal G3 is at a high level, thereby turning on the third row of sub-pixels, and the first high-level pulse of the odd-numbered frame data control signal TP_O arrives, such that a first row of data signals DATA1 are applied to the first row of sub-pixels.

Similarly, for the third and fifth rows of sub-pixels, in the first time period (time period T2 in FIG. 8B), the third row of sub-pixels are turned on; in the second time period (time period T3 in FIG. 8B), the fifth row of sub-pixels are turned on, and the second high-level pulse of the odd-numbered frame data control signal TP_O arrives, such that the third row of data signals DATA3 are applied to the third row of sub-pixels.

In this way, it can be realized that, in the odd-numbered frame, the (2k-1)-th row of sub-pixels are turned on during the first time period; the (2k+1)-th row of sub-pixels are turned on, and the (2k-1)-th row of data signals are applied to the (2k-1)-th row of sub-pixels during the second time period; wherein k is an integer, and 1<k<(N-2)/2.

The length of the second time period may be set to be greater than or equal to 2H, such that the actual charging duration of each odd-numbered row of sub-pixels is greater than or equal to 2H. For example, in the embodiment of FIG. 8B, the time period during which the first row of sub-pixels are applied with the data signals is the time period T2, the time period during which the third row of sub-pixels are applied with the data signals is the time period T3, and so on. The lengths of the time periods T1, T2, T3 . . . may all be set to be equal to 2H, such that the actual charging duration of each odd-numbered row of sub-pixels is 2H.

As illustrated in FIG. 8C, in an even-numbered frame, the plurality of sub-pixels may be scanned one even-numbered row by one even-numbered row, and data signals are applied to each even-numbered row of sub-pixels that are turned on, under the control of the even-numbered frame data control signal TP_E.

In the time period T1 (a first time period), the second gate driving signal G2 is at a high level, such that the second row of sub-pixels are turned on.

In the time period T2 (a second time period), the fourth gate driving signal G4 is at a high level, such that the fourth row of sub-pixels are turned on, and the first high-level pulse of the even-numbered frame data control signal TP_E arrives, such that the second row of data signals DATA2 are applied to the second row of sub-pixels.

Similarly, for the fourth and sixth rows of sub-pixels, in the first time period (time period T2 in FIG. 8B), the fourth row of sub-pixels are turned on; in the second time period (time period T3 in FIG. 8B), the sixth row of sub-pixels are turned on and the second high-level pulse of the even-numbered frame data control signal TP_E arrives, such that the fourth row of data signals DATA4 are applied to the fourth row of sub-pixels.

In this way, it can be realized that, in the even-numbered frame, the 2k-th row of sub-pixels are turned on during the first time period; the (2k+2)-th row of sub-pixels are turned on, and the (2k+2)-th row of data signals are applied to the (2k+2)-th row of sub-pixels, during the second time period.

The length of the second time period may be set to be greater than or equal to 2H, such that the actual charging duration of each even-numbered row of sub-pixels is greater than or equal to 2H. For example, in the embodiment of FIG. 8C, the time period during which the second row of sub-pixels are applied with the data signals is the time period T2, the time period during which the fourth row of sub-pixels are applied with the data signals is the time period T3, and so on. The lengths of the time periods T1, T2, T3 . . . may all be set to be equal to 2H, such that the actual charging duration of each even-numbered row of sub-pixels is 2H.

Figure 9A:
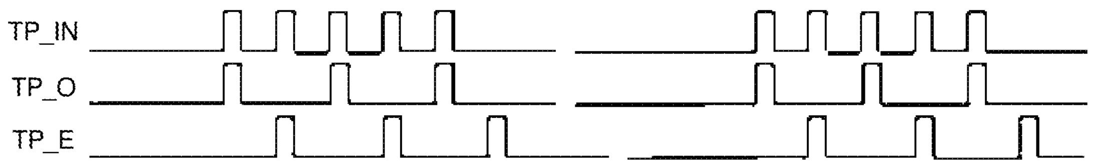
FIG. 9A illustrates a timing diagram of data control signals in a display driving method according to another embodiment of the present disclosure.
Figure 9B:
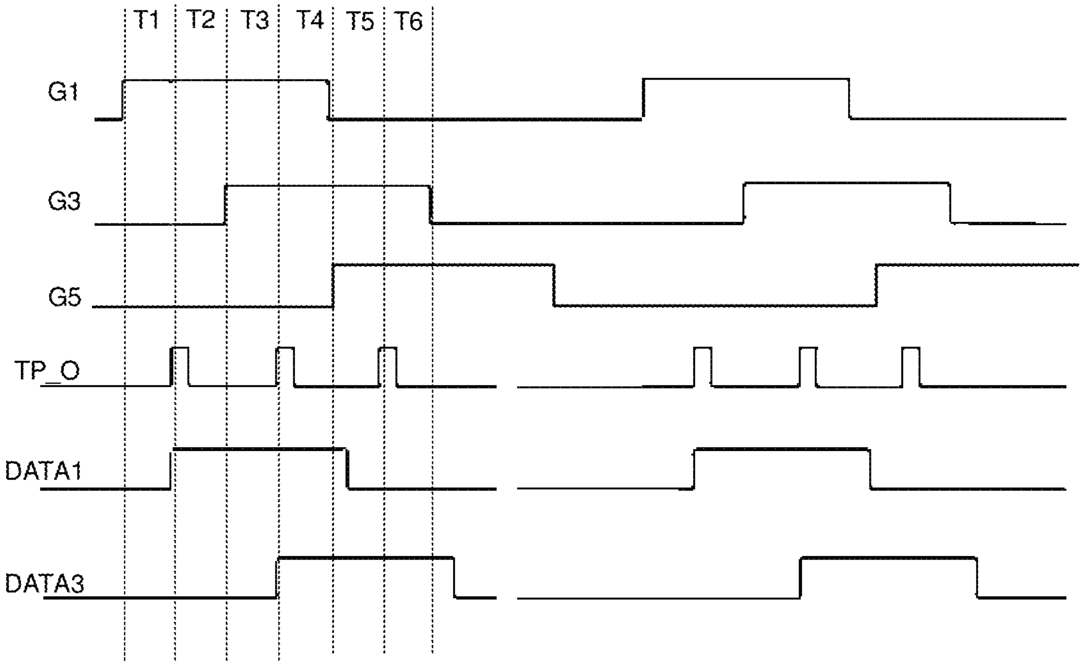
FIG. 9B illustrates a signal timing diagram in an odd-numbered frame of a display driving method according to another embodiment of the present disclosure.
Figure 9C:
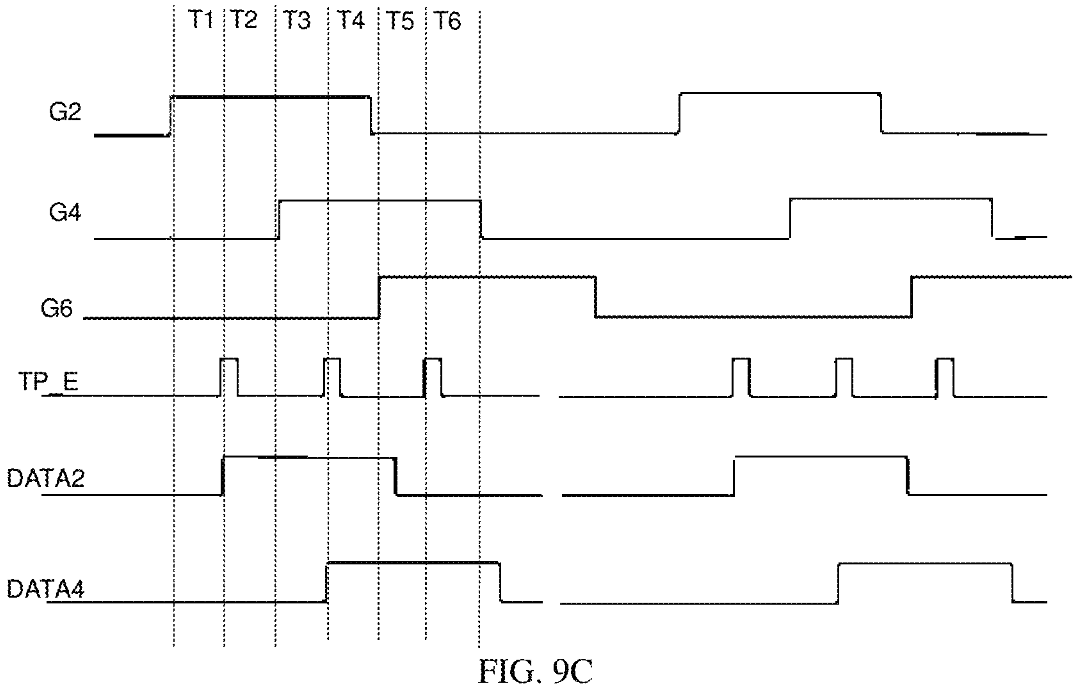
FIG. 9C illustrates a signal timing diagram in an even-numbered frame of a display driving method according to another embodiment of the present disclosure.

FIG. 9A illustrates a timing diagram of data control signals in a display driving method according to another embodiment of the present disclosure, and FIG. 9B illustrates a signal timing diagram in an odd-numbered frame of a display driving method according to another embodiment of the present disclosure. FIG. 9C illustrates a signal timing diagram in an even-numbered frame of a display driving method according to another embodiment of the present disclosure. The display driving method of FIG. 9A to FIG. 9C are similar to the display driving method of FIG. 8A to FIG. 8C, and the difference lies at least in that, each row of sub-pixels are applied with data signals for a longer duration. For the sake of brevity, the difference is mainly described in detail below.

As illustrated in FIG. 9A, similar to FIG. 8A, the odd-numbered frame data control signals TP_O and the even-numbered frame data control signals TP_E are generated based on the initial data control signals TP_IN.

As illustrated in FIG. 9B, in an odd-numbered frame, the plurality of sub-pixels may be scanned one odd-numbered row by one odd-numbered row, and data signals are applied to each odd-numbered row of the sub-pixels that are turned on, under the control of the odd-numbered frame data control signal TP_O.

During the time period T1 (a first time period), the first gate driving signal G1 is at a high level, such that the first row of sub-pixels are turned on.

During the time period T2 (a second time period), the first gate driving signal G1 is still at a high level, such that the first row of sub-pixels remain in the on-state, and the first high-level pulse of the odd-numbered frame data control signal TP_O arrives, such that the first row of data signals DATA1 are applied to the first row of sub-pixels.

During the time period T3 (a third time period), the first gate driving signal G1 is still at a high level, such that the first row of sub-pixels remain in the on-state, and the third gate driving signal G3 is at a high level, such that the third row of sub-pixels are turned on, and the first row of data signals DATA1 are continuously applied to the first row of sub-pixels.

During the time period T4 (the fourth time period), the first gate driving signal G1 and the third gate driving signal G1 are still at high level, such that the first row of sub-pixels and the third row of sub-pixels remain in the on-state, and a second high-level pulse of the odd-numbered frame data control signal TP_O arrives, such that the third row of data signals DATA3 are applied to the first row of sub-pixels and the third row of sub-pixels.

Similarly, for the third row of sub-pixels and the fifth row of sub-pixels, in the first time period (time period T3 in FIG. 9B), the third row of sub-pixels are turned on; in the second time period (time period T4 in FIG. 9B), a second high-level pulse of the odd-numbered frame data control signal TP_O arrives, such that the third row of data signals DATA3 are applied to the third row of sub-pixels; in the third time period (time period T5 in FIG. 9B), the fifth row of sub-pixels are turned on, and the third row of data signals DATA3 are continuously applied to the third row of sub-pixels; in the fourth time period (time period T6 in FIG. 9B), the third high-level pulse of the odd-numbered frame data control signal TP_O arrives, such that the fifth row of data signals DATA5 are applied to the third row of sub-pixels and the fifth row of sub-pixels.

In this way, it can be realized that, in the odd-numbered frame, during the first time period, the (2k-1)-th row of sub-pixels are turned on, wherein k is an integer; during the second time period, the (2k-1)-th row of data signals are applied to the (2k-1)-th row of sub-pixels; during the third time period, the (2k+1)-th row of sub-pixels are turned on, and the (2k-1)-th row of data signals are continuously applied to the (2k-1)-th row of sub-pixels; during the fourth time period, the (2k+1)-th row of data signals are applied to the (2k-1)-th row of sub-pixels and the (2k+1)-th row of sub-pixels, wherein k is an integer, and 1<k<(N-2)/2.

As illustrated in FIG. 9C, in an even-numbered frame, a plurality of sub-pixels may be scanned one even-numbered row by one even-numbered row, and data signals are applied to the each even-numbered row of sub-pixels that are turned on, under the control of the even-numbered frame data control signal TP_E.

In the time period T1 (a first time period), the second gate driving signal G2 is at a high level, such that the second row of sub-pixels are turned on.

In the time period T2 (a second time period), the second gate driving signal G2 is still at a high level, such that the second row of sub-pixels remain in the on-state, and the first high-level pulse of the even-numbered frame data control signal TP_E arrives, such that the second row of data signals DATA2 are applied to the second row of sub-pixels.

In the time period T3 (a third time period), the second gate driving signal G2 is still at a high level, such that the second row of sub-pixels remain in the on-state, and the fourth gate driving signal G4 is at a high level, such that the fourth row of sub-pixels are turned on, and the second row of data signals DATA2 are continuously applied to the second row of sub-pixels.

In the time period T4 (a fourth time period), the second gate driving signal G2 and the fourth gate driving signal G4 are still at high level, such that both the second row of sub-pixels and the fourth row of sub-pixels remain in the on-state, and the second high-level pulse of the even-numbered frame data control signal TP_E arrives, and the fourth row of data signals are applied to the second row of sub-pixels and the fourth row of sub-pixels.

Similarly, for the fourth row of sub-pixels and the sixth row of sub-pixels, during the first time period (time period T3 in FIG. 9C), the fourth row of sub-pixels are turned on; during the second time period (time period T4 in FIG. 9C), the second high-level pulse of the even-numbered frame data control signal TP_E arrives, such that the fourth row of data signals DATA4 are applied to the fourth row of sub-pixels; during the third period (time period T5 in FIG. 9C), the sixth row of sub-pixels are turned on and the fourth row of data signals DATA4 are continuously applied to the fourth row of sub-pixels; in the fourth period (time period T6 in FIG. 9C), the third high-level pulse of the even-numbered frame data control signal TP_E arrives, such that the sixth row of data signals DATA6 are applied to the fourth row of sub-pixels and the sixth row of sub-pixels.

In this way, it can be realized that, in the even-numbered frame, during the first time period, the 2k-th row of sub-pixels are turned on; during the second time period, the 2k-th row of data signals are applied to the 2k-th row of sub-pixels; during the third time period, the (2k+2)-th row of sub-pixels are turned on, and the 2k-th row of data signals are continuously applied to the 2k-th row of sub-pixels; during the fourth time period, the (2k+2)-th row of data signals are applied to the 2k-th row of sub-pixels and the (2k+2)-th row of sub-pixels, wherein k is an integer, and 1<k<(N-2)/2.

In some other embodiments, in the first frame, the plurality of sub-pixels may be scanned by progressive scanning, and data signals are applied to each row of sub-pixels that are turned on, such that the duration of the odd-numbered row of sub-pixels being applied with data signals is longer than the unit scanning time, and the duration of the even-numbered row of sub-pixels being applied with data signals is less than the unit scanning time; in the second frame, a plurality of sub-pixels may be scanned by progressive scanning, and data signals are applied to each row of sub-pixels that are turned on, such that the duration of the even-numbered row of sub-pixels being applied with data signals is longer than the unit scanning time, and the duration of the odd-numbered row of sub-pixels being applied with data signals is less than the unit scanning time. This will be described in detail below with reference to FIG. 10A to FIG. 10C.

Figure 10A:
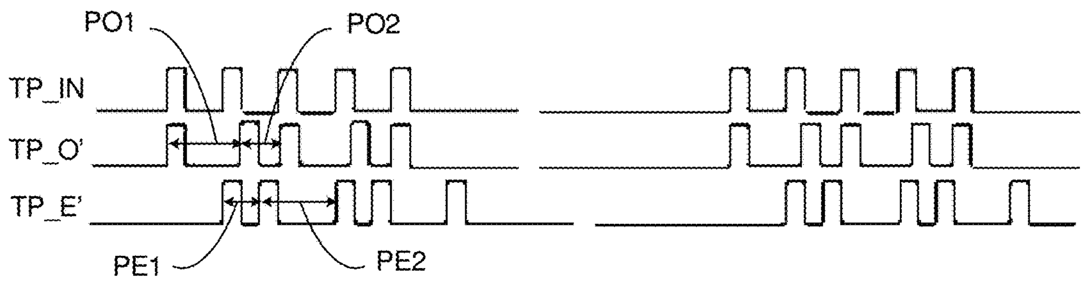
FIG. 10A illustrates a timing diagram of data control signals in a display driving method according to another embodiment of the present disclosure.
Figure 10B:
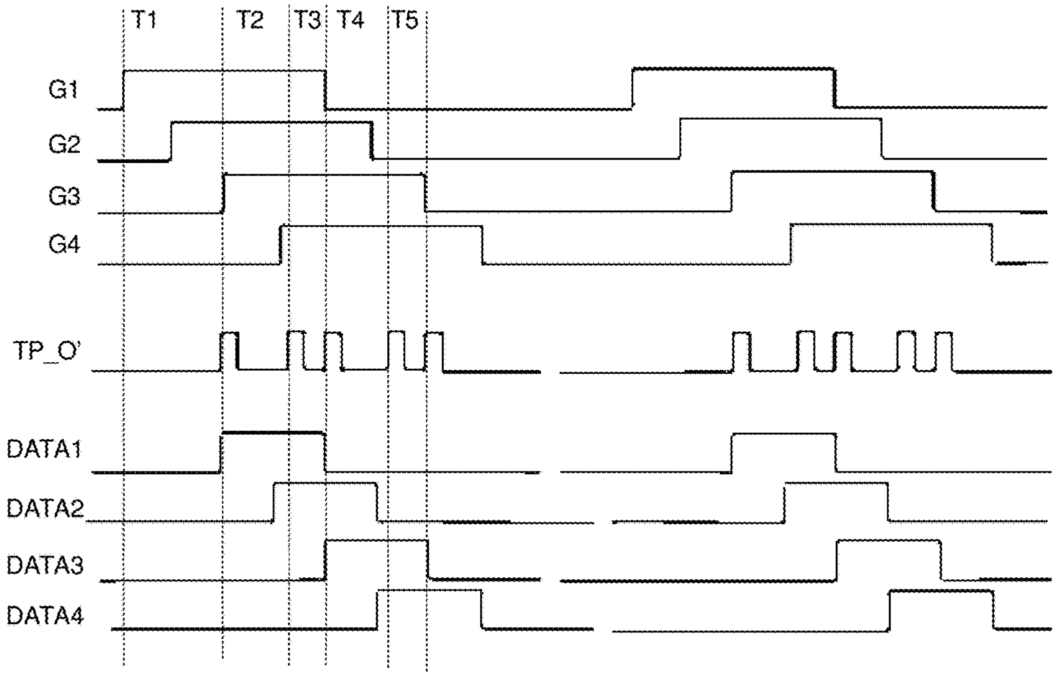
FIG. 10B illustrates a signal timing diagram in an odd-numbered frame of a display driving method according to another embodiment of the present disclosure.
Figure 10C:
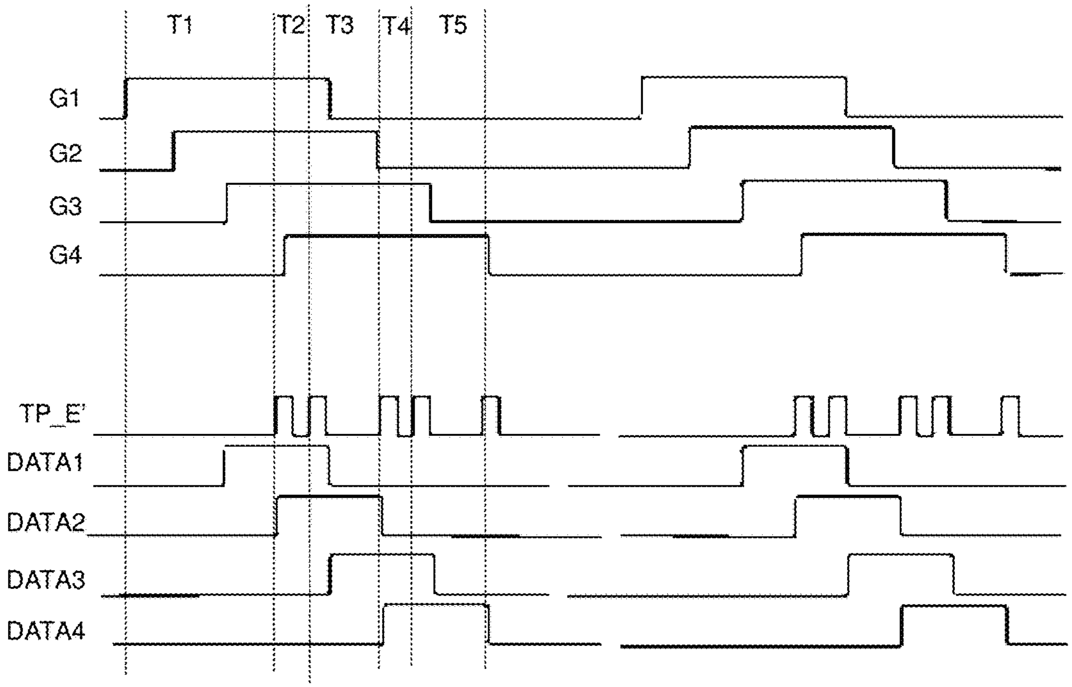
FIG. 10C illustrates a signal timing diagram in an even-numbered frame of a display driving method according to another embodiment of the present disclosure.

FIG. 10A illustrates a timing diagram of data control signals in a display driving method according to another embodiment of the present disclosure, and FIG. 10B illustrates a signal timing diagram in an odd-numbered frame of a display driving method according to another embodiment of the present disclosure. FIG. 10C illustrates a signal timing diagram in an even-numbered frame of a display driving method according to another embodiment of the present disclosure.

As illustrated in FIG. 10A, data control signals for odd-numbered frames (also referred to as odd-numbered frame data control signals) TP_O' and data control signals for even-numbered frames (also referred to as even-numbered frame data control signals) TP_E' may be generated based on the initial data control signals TP_IN. The application of the data signals in the odd-numbered frame may be controlled by the odd-numbered frame data control signal TP_O', while the application of the data signals in the even-numbered frame may be controlled by the even-numbered frame data control signal TP_E'.

In FIG. 10A, the signal cycles of the odd-numbered frame data control signal TP_O' and the even-numbered frame data control signal TP_E' may be twice that of the initial data control signal TP_IN. One signal cycle of the odd-numbered frame data control signal TP_O' includes a first sub-portion PO1 and a second sub-portion PO2, wherein the duty ratio of the first sub-portion PO1 is smaller than the duty ratio of the initial data control signal TP_IN, while the duty ratio of the second sub-portion PO2 is greater than the duty ratio of the initial data control signal TP_IN. One signal cycle of the even-numbered frame data control signal TP_E' includes a first sub-portion PE1 and a second sub-portion PE2, wherein the duty ratio of the first sub-portion PE1 is greater than the duty ratio of the initial data control signal TP_IN, while the duty ratio of the second sub-portion PE2 is smaller than the duty ratio of the initial data control signal TP_IN. The even-numbered frame data control signal TP_E' may be shifted with respect to the odd-numbered frame data control signal TP_O'.

As illustrated in FIG. 10B, in an odd-numbered frame, the respective rows of sub-pixels may be turned on row by row, and data signals are applied to each row of sub-pixels that are turned on under the control of the odd-numbered frame data control signal TP_O'.

In the time period T1, the first row of sub-pixels and the second row of sub-pixels are sequentially turned on. For example, in the first sub-period of the time period T1, the first gate driving signal G1 is at a high level, such that the first row of sub-pixels are turned on; in the second sub-period of the time period T1, the second gate driving signal G2 is at a high level, such that the second row of sub-pixels are turned on.

In the time period T2, the first high-level pulse of the odd-numbered frame data control signal TP_O' arrives, such that the first row of data signals DATA1 are applied to the first row of sub-pixels.

In the time period T3, the second high-level pulse of the odd-numbered frame data control signal TP_O' arrives, such that the second row of data signals DATA2 are applied to the second row of sub-pixels.

Similarly, for the third row of sub-pixels and the fourth row of sub-pixels, in the first time period (time periods T2 and T3 in FIG. 10B), the third row of sub-pixels and the fourth row of sub-pixels are turned on in sequence; in the second time period (time period T4 in FIG. 10B), the third row of data signals DATA3 are applied to the third row of sub-pixels; in the third time period (time period T5 in FIG. 10B), the fourth row of data signals DATA4 are applied to the fourth row of sub-pixels.

In this way, it can be realized that, in an odd-numbered frame, during the first time period, the n-th row of sub-pixels and the (n+1)-th row of sub-pixels are sequentially turned on; during the second time period, the n-th row of data signals are applied to the n-th row of sub-pixels; and during the third time period, the (n+1)-th row of data signals are applied to the (n+1)-th row of sub-pixels, wherein n is an integer, and $1<n<N-1$.

In the odd-numbered frame, the length of the second time period may be greater than H, the length of the third time period may be less than H, and the sum of the lengths of the second time period and the third time period may be greater than or equal to 2H. This makes that in the odd-numbered frame, the actual charging duration of each odd-numbered row of sub-pixels is greater than H, while the actual charging duration of each even-numbered row of sub-pixels is less than H.

For example, in FIG. 10B, the time interval between turning on each row of sub-pixels may be H, the duration of each row of sub-pixels being in the on-state may be 4H, the length of the time period T1 is 2H, the sum of the lengths of the time periods T2 and T3 is 2H, wherein the length of the time period T2 is greater than H, while the length of the time period T3 is less than H. Since the time period in which the first row of sub-pixels are applied with the data signals is the time period T2, while the time period in which the second row of sub-pixels are applied with the data signals is the time period T3, it can be realized that, the actual charging duration of the first row of sub-pixels (i.e., the length of the time period T2) is greater than H, while the actual charging duration of the second row of sub-pixels (i.e., the length of the time period T3) is less than H. Similarly, for the third row of sub-pixels and the fourth row of sub-pixels, it can be realized that, the actual charging duration of the third row of sub-pixels (i.e., the length of the time period T4) is greater than H, while the actual charging duration of the fourth row of sub-pixels (i.e., the length of the time period T5) is less than H.

As illustrated in FIG. 10C, in an even-numbered frame, the respective rows of sub-pixels may be turned on row by row, and data signals are applied to each row of sub-pixels that are turned on under the control of the even-numbered frame data control signal TP_E'. The signal timing sequence of FIG. 10C is similar to that of FIG. 10B, and the difference lies at least in the lengths of the time periods T2 and T3. The difference will be mainly described in detail below for the sake of brevity.

In the time period T1, the first gate driving signal G1 to the third gate driving signal G3 sequentially become high level, thereby sequentially turning on the first row of sub-pixels and the second row of sub-pixels.

In the time period T2, the first high-level pulse of the even-numbered frame data control signal TP_E' arrives, such that the first row of data signals are applied to the first row of sub-pixels.

In the time period T3, the second high-level pulse of the even-numbered frame data control signal TP_E' arrives, such that the second row of data signals DATA2 are applied to the second row of sub-pixels.

Similarly, for the third row of sub-pixels and the fourth row of sub-pixels, in the first time period (from the moment when the third gate driving signal G3 becomes a high level to the start moment of the time period T4 in FIG. 10C), the third row of sub-pixels and the fourth row of sub-pixels are sequentially turned on; in the second time period (time period T4 in FIG. 10C), the third high-level pulse of the even-numbered frame data control signal TP_E' arrives, such that the third row of data signal DATA3 are applied to the third row of sub-pixels; in the third time period (time period T5 in FIG. 10C), the fourth high-level pulse of the even-numbered frame data control signal TP_E' arrives, such that the fourth row of data signals DATA4 are applied to the fourth row of sub-pixels.

In an even-numbered frame, the length of the second time period may be less than H, the length of the third time period may be greater than H, and the sum of the lengths of the second time period and the third time period may be greater than or equal to 2H. This makes that, in the even-numbered frame, the actual charging duration of each odd-numbered row of sub-pixels is less than H, while the actual charging duration of each even-numbered row of sub-pixels is greater than H.

For example, in FIG. 10C, the time interval between turning on each row of sub-pixels may be H, the duration of each row of sub-pixels being in the on-state may be 4H, the length of the time period T1 is 2H, the sum of the lengths of the time periods T2 and T3 is 2H, wherein the length of the time period T2 is less than H, while the length of the time period T3 is greater than H. Since the time period in which the first row of sub-pixels are applied with the data signals is the time period T2, while the time period in which the second row of sub-pixels are applied with the data signals is the time period T3, it can be realized that, the actual charging duration of the first row of sub-pixels (i.e., the length of the time period T2) is less than H, while the actual charging duration of the second row of sub-pixels (i.e., the length of the time period T3) is greater than H. Similarly, for the third row of sub-pixels and the fourth row of sub-pixels, it can be realized that, the actual charging duration of the third row of sub-pixels (i.e., the length of the time period T4) is less than H, while the actual charging duration of the fourth row of sub-pixels (i.e., the length of the time period T5) is greater than H.

In the embodiments of the present disclosure, through making the actual charging duration of the odd-numbered row of sub-pixels longer than the actual charging duration of the even-numbered row of sub-pixels in the odd-numbered frame, and making the actual charging duration of the even-numbered row of sub-pixels longer than the actual charging duration of the odd-numbered row of sub-pixels in the even-numbered frame, the actual charging duration of each row of sub-pixels in one of the two frames is greater than H. Compared with the case where the actual charging duration of sub-pixel in each frame is always H in the conventional technology, the actual charging duration of at least part of the sub-pixels is prolonged in at least part of the frames.

In some embodiments, the data signals may also be applied every multiple columns of sub-pixels, thereby reducing the amount of data required to display a picture, which will be described in detail below with reference to FIG. 11A to FIG. 12B.

Figure 11A:
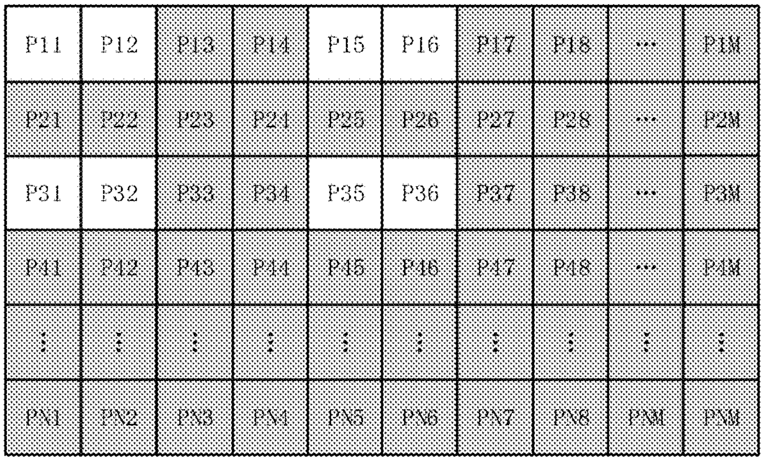
FIG. 11A is a schematic view illustrating a method of applying data signals to each row of sub-pixels that are turned on in an odd-numbered frame according to an embodiment of the present disclosure.
Figure 11B:
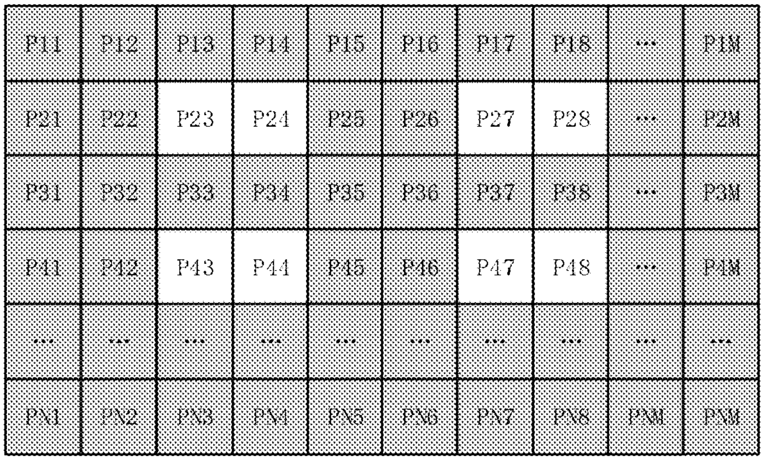
FIG. 11B is a schematic view illustrating a method of applying data signals to each row of sub-pixels that are turned on in an even-numbered frame according to an embodiment of the present disclosure.

FIG. 11A is a schematic view illustrating a method of applying data signals to each row of sub-pixels that are turned on in an odd-numbered frame according to an embodiment of the present disclosure, and FIG. 11A is a schematic view illustrating a method of applying data signals to each row of sub-pixels that are turned on in an even-numbered frame according to an embodiment of the present disclosure. FIG. 11A and FIG. 11B will be described below in conjunction with the display driving method described above with reference to FIG. 8A to FIG. 8C.

In an odd-numbered frame, according to the signal timing sequence of FIG. 8B, the first row of sub-pixels, the third row of sub-pixels, the fifth row of sub-pixels are sequentially turned on, and data signals are applied to each row of sub-pixels that are turned on.

As illustrated in FIG. 11A, during the time period in which the M sub-pixels P11, P12, . . . , P1M in the first row are in the on-state, data signals may be applied to the sub-pixels in the (2a-1)-th column and the 2*a*-th column, wherein a is an odd number, and 1<2a-1<M. For example, in FIG. 11A, data signals are applied to the first row of sub-pixels that are located in the first column, the second column, the fifth column, the sixth column . . . (i.e., the sub-pixels P11, P12, P15, P16 . . . ), such that the sub-pixels can display (as shown by the white box in FIG. 11A). For example, the data signal D11 may be applied to the sub-pixel P11, the data signal D12 may be applied to sub-pixel P12, the data signal D15 may be applied to sub-pixel P15, the data signal D16 may be applied to sub-pixel P16, and so on.

In a similar way, during the time period when the M sub-pixels P31, P32, . . . P3M in the third row are in the on-state, data signals may be applied to the sub-pixels P31, P32, P35, P36 . . . , such that the sub-pixels can display (as illustrated by the white box in FIG. 11A). By analogy, for the M sub-pixels in each odd-numbered rows that are turned on, the data signals are applied to the sub-pixels located in the (2a-1)-th column and the 2a-th column.

For other sub-pixels other than the above-mentioned sub-pixels to which the data signals are applied, the data signals applied thereto may be set to a default value (e.g., OV) or may be calculated based on the existing data signals, for example, the data signal D13 for sub-pixel P13 and the data signal D14 for sub-pixel P14 may be calculated based on the data signals D11, D12, D15, and D16, and so on.

In an even-numbered frame, according to the signal timing sequence of FIG. 8C, the second row of sub-pixels, the fourth row of sub-pixels, the sixth row of sub-pixels . . . are turned on sequentially, and data signals are applied to each row of sub-pixels that are turned on.

As illustrated in FIG. 11B, during the time period when the M sub-pixels P21, P22, P2M in the second row are in the on-state, data signals may be applied to the sub-pixels located in the (2b-1)-th column and the 2b-th column, wherein b is an even number, and 2<2b<M. For example, in FIG. 11B, data signals are applied to the sub-pixels P23, P24, P27, P28, . . . , for display (as illustrated by the white box in FIG. 11B). For example, the data signal D23 may be applied to the sub-pixel P23, the data signal D24 may be applied to sub-pixel P24, the data signal D27 may be applied to sub-pixel P27, the data signal D28 may be applied to sub-pixel P28, and so on.

In a similar way, during the time period when the M sub-pixels P41, P42, . . . , P4M in the fourth row are in the on-state, data signals may be applied to the sub-pixels P43, P44, P47, P48, . . . for display (as illustrated by the white box in FIG. 11B). By analogy, for M sub-pixels in each even-numbered row that are turned on, the data signals are applied to the sub-pixels located in the 2b-th column and the (2b+1)-th column.

Likewise, the data signals for other sub-pixels other than the above-described sub-pixels to which the data signals are applied may be set as default values (e.g., OV) or may be calculated based on existing data signals, for example, the data signal D25 for the sub-pixel P25 and the data signal D26 for the sub-pixel P26 may be calculated based on the data signals D23, D24, D27 and D28, and so on.

Figure 12A:
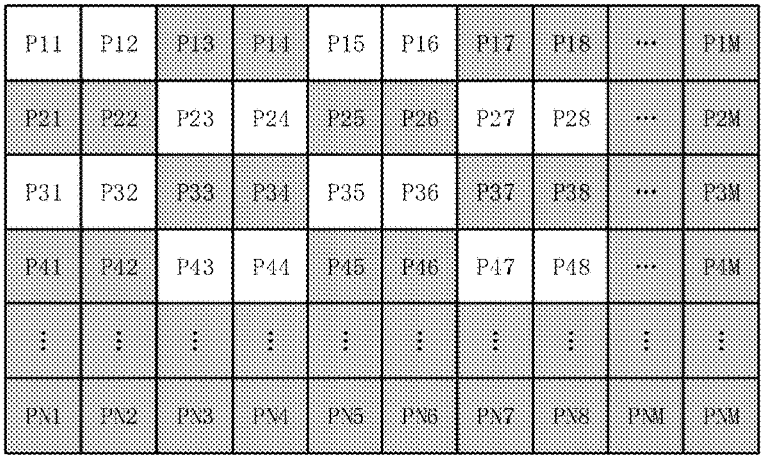
FIG. 12A is a schematic view illustrating a method of applying data signals to each row of sub-pixels that are turned on in an odd-numbered frame according to another embodiment of the present disclosure.
Figure 12B:
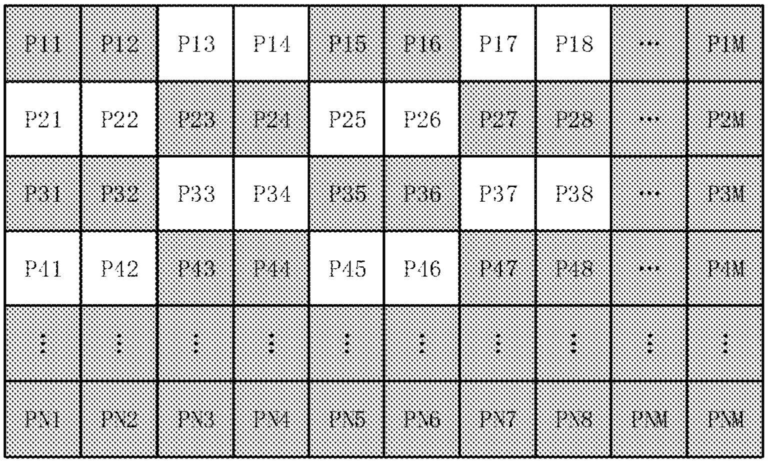
FIG. 12B is a schematic view illustrating a method of applying data signals to each row of sub-pixels that are turned on in an even-numbered frame according to another embodiment of the present disclosure.

FIG. 12A is a schematic view illustrating a method of applying data signals to each row of sub-pixels that are turned on in an odd-numbered frame according to another embodiment of the present disclosure, and FIG. 12B is a schematic view illustrating a method of applying data signals to each row of sub-pixels that are turned on in an even-numbered frame according to another embodiment of the present disclosure. FIG. 12A and FIG. 12B will be described below in conjunction with the display driving method described above with reference to FIG. 10A to FIG. 10C.

In an odd-numbered frame, according to the signal timing sequence of FIG. 10B, the first row of sub-pixels, the second row of sub-pixels, the third row of sub-pixels . . . are sequentially turned on, and data signals are applied to each row of sub-pixels that are turned on.

As illustrated in FIG. 12A, during the time period in which the M sub-pixels P11, P12, . . . , P1M in the first row are in the on-state, data signals may be applied to the sub-pixels in the (2a-1)-th column and the 2a-th column, wherein a is an odd number, and 1<2a-1<M. For example, in FIG. 12A, data signals D11, D12, D15, D16. are respectively applied to the sub-pixels P11, P12, P15, P16 . . . for display (as illustrated by the white box in FIG. 12A).

During the time period in which the M sub-pixels P21, P22, P2M in the second row are in the on-state, data signals may be applied to the sub-pixels in the 2b-th column and the (2b+1)-th column, wherein b is an even number, and 2<2b<M. For example, in FIG. 12A, data signals D23, D24, D27, D28. are respectively applied to the sub-pixels P23, P24, P27, P28 . . . for display (as illustrated by the white box in FIG. 12A).

During the time period in which the M sub-pixels P31, P32, P3M in the third row are in the on-state, data signals D31, D32, D35, D36. may be respectively applied to the sub-pixels P31, P32, P35, P36 . . . for display (as illustrated by the white box in FIG. 12A).

During the fourth period in which the M sub-pixels P41, P42, P4M in the fourth row are in the on-state, data signals D43, D44, D47, D48. may be respectively applied to the sub-pixels P43, P44, P47, P48 . . . for display (as illustrated by the white box in FIG. 12A).

By analogy, for the M sub-pixels in each odd-numbered row that are turned on, the data signals are applied to the sub-pixels located in the (2a-1)-th column and the 2a-th column; for the M sub-pixels in each even-numbered row that are turned on, the data signals are applied to the sub-pixels located in the 2b-th column and the (2b+1)-th column.

In an even-numbered frame, according to the signal timing sequence of FIG. 10C, the first row of sub-pixels, the second row of sub-pixels, the third row of sub-pixels . . . are sequentially turned on, and data signals are applied to each row of sub-pixels that are turned on.

As illustrated in FIG. 12B, during the time period in which the M sub-pixels P11, P12, . . . , P1M in the first row are in the on-state, data signals may be applied to the sub-pixels in the 2b-th column and the (2b+1)-th column. For example, in FIG. 12B, data signals D13, D14, D17, D18 are respectively applied to the sub-pixels P13, P14, P17, P18 . . . for display (as illustrated by the white box in FIG. 12B).

During the time period in which the M sub-pixels P21, P22, P2M in the second row are in the on-state, data signals may be applied to the sub-pixels in the (2a-1)-th column and the 2a-th column. For example, in FIG. 12B, data signals D21, D22, D25, D26 are respectively applied to the sub-pixels P21, P22, P25, P26 . . . for display (as illustrated by the white box in FIG. 12B).

During the time period in which the M sub-pixels P31, P32, P3M in the third row are in the on-state, data signals D33, D34, D37, D38 may be respectively applied to the sub-pixels P33, P34, P37, P38 . . . for display (as shown by the white box in FIG. 12B).

During the fourth period in which the M sub-pixels P41, P42, P4M in the fourth row are in the on-state, data signals D41, D42, D45, D46 may be respectively applied to the sub-pixels P41, P42, P45, P46 . . . for display (as shown by the white box in FIG. 12B).

By analogy, for the M sub-pixels in each odd-numbered row that are turned on, the data signals are applied to the sub-pixels located in the 2b-th column and the (2b+1)-th column; for the M sub-pixels in each even-numbered row that are turned on, the data signals are applied to the sub-pixels located in the (2a-1)-th column and the 2a-th column.

For other sub-pixels other than the above-mentioned sub-pixels to which the data signals are applied, the data signals applied thereto may be set as default values (e.g., 0 V) or may be calculated based on the existing data signals. For example, for the odd-numbered frame, the data signal D13 for the sub-pixel P13 and the data signal D14 for the sub-pixel P14 may be calculated based on the data signals D11, D12, D15, and D16; for the even-numbered frame, the data signal D15 for the sub-pixel P15 and the data signal D16 for the sub-pixel P16 may be calculated based on the data signals D13, D14, D17 and D18, and so on, which will not be repeated here.

Although the application manners of the data signals of FIG. 11A to FIG. 12B are described above combining FIG. 8A to FIG. 8C and FIG. 10A to FIG. 10C, the embodiments of the present disclosure are not limited thereto. In the display driving method of any of the above-described embodiments, the above-described method of applying data signals every multiple columns of sub-pixels can be used to reduce the data amount.

For example, in some embodiments, in the first frame, either of the display driving methods illustrated in FIG. 13A and FIG. 13B may be used to perform progressive scanning; in the second frame, either of the display driving methods shown in FIG. 13A and FIG. 13B may be used to perform progressive scanning. For example, in the first frame, one of the display driving methods illustrated in FIG. 13A and FIG. 13B may be used to perform progressive scanning; while in the second frame, the other one of the display driving methods illustrated in FIG. 13A and FIG. 13B may be used to perform progressive scanning. For example, the first frame is an odd-numbered frame, and the second frame is an even-numbered frame; or, the first frame is an even-numbered frame, and the second frame is an odd-numbered frame. The specific details of the display driving methods illustrated in FIG. 13A and FIG. 13B may be refer to the foregoing related descriptions, which will not be repeated here.

For example, in some embodiments, in the first frame, any one of the display driving methods illustrated in FIG. 14A, FIG. 14B, FIG. 15A and FIG. 15B may be used to perform progressive scanning; in the second frame, any one of the display driving methods illustrated in FIG. 14A, FIG. 14B, FIG. 15A and FIG. 15B may be used to perform progressive scanning. For example, in one of the first frame and the second frame, the display driving method illustrated in FIG. 14A may be used to perform progressive scanning; while in the other one of the first frame and the second frame, the display driving method illustrated in FIG. 15B may be used to perform progressive scanning. For another example, in one of the first frame and the second frame, the display driving method illustrated in FIG. 14B may be used to perform progressive scanning; while in the other one of the first frame and the second frame, the display driving method illustrated in FIG. 15A may be used to perform progressive scanning. It is noted that, the embodiments of the disclosure include but are not limited to this. For example, the first frame is an odd-numbered frame, and the second frame is an even-numbered frame; or, the first frame is an even-numbered frame and the second frame is an odd-numbered frame. The specific details of the display driving methods illustrated in FIG. 14A, FIG. 14B, FIG. 15A and FIG. 15B may be referred to the foregoing related descriptions, which will not be repeated here.

Although the display driving methods of the embodiments of the disclosure are described in the above embodiments, taken "odd-numbered frame" and "even-numbered frame" as examples, the embodiments of the present disclosure are not limited thereto, and "odd-numbered frame" and "even-numbered frame" may be mutually exchanged. In some embodiments, "odd-numbered frame" and "even-numbered frame" may also be replaced by "one frame" and "another frame", respectively, as long as the two frames are different frames.

The embodiments of the present disclosure also provide a display device, such as the display device 100 described above with reference to FIG. 1A and FIG. 1B, the display driving method of any of the above-described embodiments can be performed in the display device. For example, the above-described display device 100 includes a plurality of sub-pixels P arranged in an N×M array, and a gate driving circuit 10 and a source driving circuit 20 connected to the plurality of sub-pixels P.

In some embodiments, the gate driving circuit 10 may scan the plurality of sub-pixels P one row by one row or multiple rows by multiple rows, so as to turn on each row of the sub-pixels P that are scanned, such that the duration for which two adjacent rows of sub-pixels P are simultaneously in the on-state is greater than twice the unit scanning time. The source driving circuit 20 may apply data signals to at least two rows of sub-pixels P that are simultaneously in the on-state, such that the duration of each row of sub-pixels P being applied with data signals is greater than the unit scanning time.

In some other embodiments, the gate driving circuit 10 may scan the plurality of sub-pixels P by progress scanning or interlaced scanning at interval of at least one row, so as to turn on each row of sub-pixels P that are scanned, such that the duration of two rows of sub-pixels P that are sequentially turned on being simultaneously in the on-state is greater than or equal to twice the unit scanning time. The source driving circuit 20 may sequentially apply data signals to each row of sub-pixels P that are turned on in the first frame, such that the duration of a portion of the sub-pixels P in the plurality of sub-pixels P being applied with data signals is longer than the unit scanning time, and may sequentially apply data signals to each row of sub-pixels P that are turned on in the second frame, such that the duration of another portion of the sub-pixels P in the plurality of sub-pixels P being applied with data signals is longer than the unit scanning time.

Figure 16A:
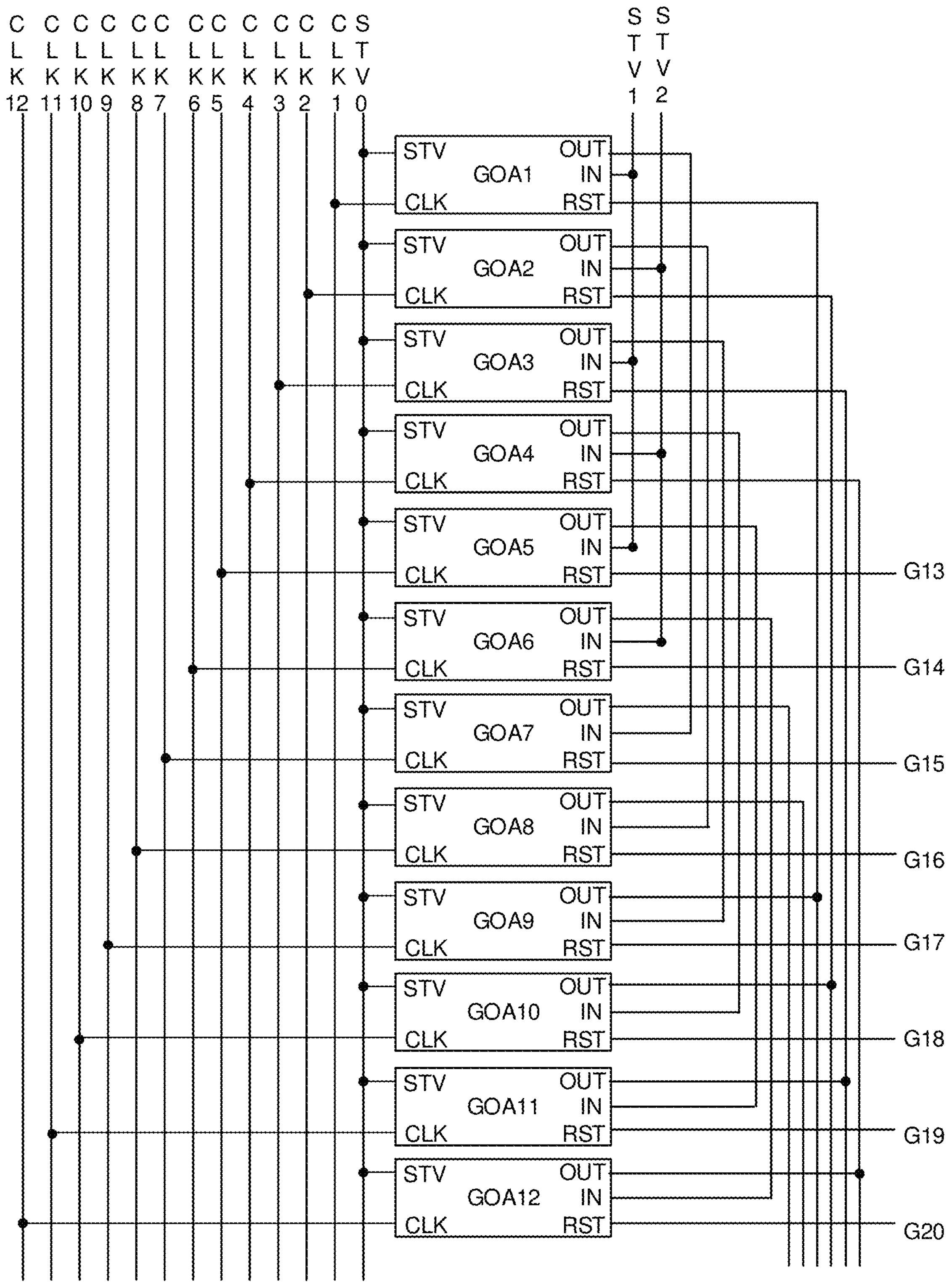
FIG. 16A is an exemplary structure view illustrating a gate driving circuit in a display device according to an embodiment of the present disclosure.
Figure 16B:
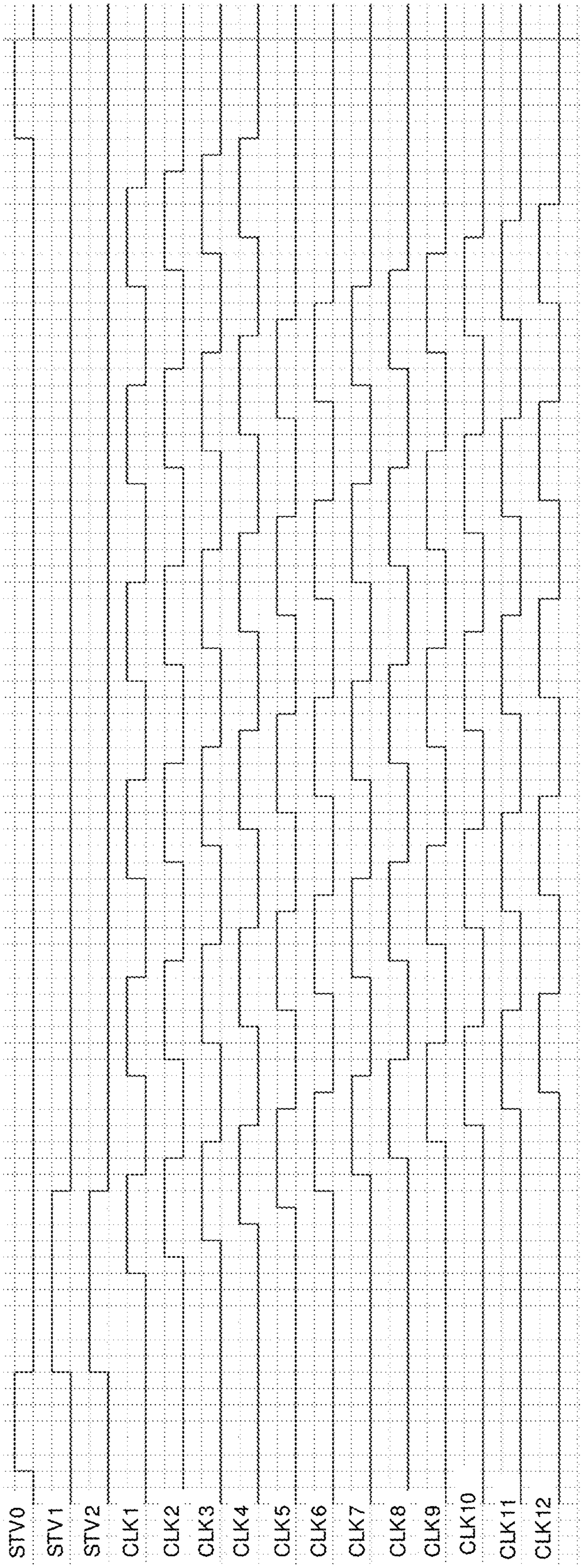
FIG. 16B illustrates a signal timing diagram suitable for the gate drive circuit illustrated in FIG. 16A.

FIG. 16A illustrates an exemplary structure view of a gate driving circuit in a display device according to an embodiment of the present disclosure, and FIG. 16B illustrates a signal timing diagram suitable for the gate driving circuit shown in FIG. 16A.

As illustrated in FIG. 16A, the gate driving circuit 10 includes multi-stages of shift register units GOA1, GOA2, . . . GOAN connected in cascades. For the sake of brevity, FIG. 16A illustrates the first to twelfth stages of shift register units GOA1 to GOA12. It can be seen from FIG. 16A that, the input terminal IN of the n-th stage of shift register unit GOAn is connected to the output terminal of the (n-6)-th stage of shift register unit GOA(n-6), wherein 7<n<N; The reset terminal RST of the k-th stage of shift register unit GOAk is connected to the output terminal OUT of the (k+8)-th stage of shift register unit GOA(k+8), wherein 1<k<N−8. The input terminals IN of the first, third, and fifth stages of shift register units GOA1, GOA3, and GOA5 are connected to the first start signal terminal STV1, and the input terminals IN of the second, fourth, and sixth stages of shift register units GOA2, GOA4, GOA6 are connected to the second start signal terminal STV2. The gate driving circuit 10 of FIG. 16A adopts 12 clock signals CLK1 to CLK12, wherein the clock signal terminal CLK of the first stage of shift register unit GOA1 is connected to receive the first clock signal CLK1, and the clock signal terminal CLK of the second stage of shift register unit GOA2 is connected to receive the second clock signal CLK2, and so on, the clock signal terminal CLK of the twelfth stage of shift register unit GOA12 is connected to receive the twelfth clock signal CLK12. In a similar way, the (12n+1)-th to 12(n+1)-th stages of shift register units GOA(12n+1) to GOA(12(n+1)) are respectively connected to receive the first to twelfth clock signals CLK1 to CLK12, wherein n=1, 2, 3, 4, Each stage of shift register unit GOA1, GOA2, . . . , GOAN further has a main reset terminal STV, which is connected to receive a main reset signal STV0. Each stage of shift register unit GOA1, GOA2, . . . , GOAN may generate an output signal as a gate driving signal at its output terminal OUT under the control of the signals of the clock signal terminal CLK and the input terminal IN. For example, the first stage of shift register unit GOA1 generates the first gate driving signal G1, the second stage of shift register unit GOA2 generates the second gate driving signal G2, and so on. Through connecting in cascades, the gate driving signal generated by one stage of shift register unit may be shifted relative to the gate driving signal generated by another stage of shift register unit.

FIG. 16B exemplarily illustrates the timing sequence of the main reset signal STV0, the first start signal STV1, the second start signal STV2, and the first to twelfth clock signals CLK1 to CLK12. For example, as illustrated in FIG. 16B, the high level (active level) of each clock signal lasts 6H, and the two adjacent clock signals are shifted by 1H. For example, as illustrated in FIG. 16B, the first start signal STV1 and the second start signal STV2 may be the same. For example, the high level duration of each start signal is not less than the high level duration of each clock signal; for example, the high level duration of each start signal is 7H to 12H.

In the gate driving circuit illustrated in FIG. 16A, the first start signal terminal STV1 can control the odd-numbered stages of shift register units to scan, and the second start signal terminal STV2 can control the even-numbered stages of shift register units to scan. Therefore, in some examples, when the display device displays, it may be realized to sequentially scan for odd-numbered rows, or sequentially scan for even-numbered rows, or alternately perform sequential scanning for odd-numbered rows and sequential scanning for even-numbered rows, thereby reducing the display power consumption, as well as extending the service life of the display device. Of course, when the display device displays, the progressive scanning can also be implemented according to the first start signal STV1 as well as the second start signal STV2.

Those skilled in the art can understand that the above-described embodiments are all for illustration, and those skilled in the art can make improvements thereto, and the structures described in various embodiments can be freely combined without conflicts in structure or principle.

After describing the preferred embodiments of the present disclosure in detail, those skilled in the art can clearly understand that various changes and modifications can be made without departing from the scope and spirit of the accompanying claims, and the present disclosure is not limited by the implementations of the exemplary embodiments set forth in the specification.

The invention claimed is:

1. A display driving method, comprising:

scanning a plurality of sub-pixels arranged in an N×M array one row by one row or multiple rows by multiple rows, so as to turn on each row of sub-pixels that are scanned, such that two adjacent rows of sub-pixels are simultaneously in an on-state for a duration greater than or equal to twice a unit scanning time, the unit scanning time is a time required to scan one row of sub-pixels, wherein N and M are both integers greater than 1; and applying data signals to at least two rows of sub-pixels that are simultaneously in the on-state, such that at least a portion of rows of sub-pixels are applied with data signals for a duration greater than the unit scanning time, wherein a duration of each row of sub-pixels being applied with data signals is greater than the unit scanning time; or a duration of a first row of sub-pixels being applied with data signals is equal to the unit scanning time, and a duration of each row of sub-pixels other than the first row of sub-pixels being applied with data signals is greater than the unit scanning time.

2. The display driving method according to claim 1, wherein a time period of each row of sub-pixels being in the on-state comprises a charging period and a pre-charging period before the charging period, wherein a duration of the charging period is equal to twice the unit scanning time, and a duration of the pre-charging period is greater than or equal to the unit scanning time.

3. The display driving method according to claim 2, wherein the pre-charging period of the each row of sub-pixels comprises a first pre-charging period, and a duration of the first pre-charging period is equal to the unit scanning time, start and end times of time periods during which a (2k-1)-th row of sub-pixels and a 2k-th row of sub-pixels are in the on-state are the same;

the display driving method comprises:

during a charging period of the (2k-1)-th row of sub-pixels and the 2k-th row of sub-pixels, applying one of a (2k-1)-th row of data signals and a 2k-th row of data signals to the (2k-1)-th row of sub-pixels and the 2k-th row of sub-pixels; and during a pre-charging period of a (2k+1)-th row of sub-pixels and a (2k+2)-th row of sub-pixels, applying one of the (2k-1)-th row of data signals and the 2k-th row of data signals to the (2k+1)-th row of sub-pixels and the (2k+2)-th row of sub-pixels;

wherein, k=1, 2, 3, . . . , and k is smaller than or equal to (N-2)/2.

4. The display driving method according to claim 2, wherein the pre-charging period of the each row of sub-pixels comprises a first pre-charging period, and a duration of the first pre-charging period is equal to the unit scanning time, and start and end times of time periods during which two adjacent rows of sub-pixels are in the on-state differ by the unit scanning time;

the display driving method comprises:

during a charging period of a (2k-1)-th row of sub-pixels, applying one of a (2k-1)-th row of data signals and a 2k-th row of data signals to the (2k-1)-th row of sub-pixels;

during a first pre-charging period of a 2k-th row of sub-pixels and a first half of a charging period of the 2k-th row of sub-pixels, applying one of the (2k-1)-th row of data signals and the 2k-th row of data signals to the 2k-th row of sub-pixels; and during a second half of the charging period of the 2k-th row of sub-pixels, applying one of a (2k+1)-th row of data signals and a 2(k+1)-th row of data signals to the 2k-th row of sub-pixels; and during a first pre-charging period of a (2k+1)-th row of sub-pixels, applying one of the (2k-1)-th row of data signals and the 2k-th row of data signals to the (2k+1)-th row of sub-pixels;

wherein, k=1, 2, 3, . . . , and k is smaller than or equal to (N-1)/2.

5. The display driving method according to claim 2, wherein the pre-charging period of the each row of sub-pixels comprises a first pre-charging period, and a duration of the first pre-charging period is equal to the unit scanning time, and start and end times of time periods during which two adjacent rows of sub-pixels are in the on-state differ by the unit scanning time;

the display driving method comprises:

during a second half of a charging period of a (2k-1)-th row of sub-pixels, applying one of a (2k-1)-th row of data signals and a 2k-th row of data signals to the (2k-1)-th row of sub-pixels;

during a charging period of a 2k-th row of sub-pixels, applying one of the (2k-1)-th row of data signals and the 2k-th row of data signals to the 2k-th row of sub-pixels;

during a first pre-charging period of a (2k+1)-th row of sub-pixels and a first half of a charging period of the (2k+1)-th row of sub-pixels, applying one of the (2k-1)-th row of data signals and the 2k-th row of data signals to the (2k+1)-th row of sub-pixels; and during a second half of the charging period of the (2k+1)-th row of sub-pixels, applying one of a (2k+1)-th row of data signals and a 2(k+1)-th row of data signals to the (2k+1)-th row of sub-pixels; and during a first pre-charging period of a 2(k+1)-th row of sub-pixels, applying one of the (2k-1)-th row of data signals and the 2k-th row of data signals to the 2(*k*+1)-th row of sub-pixels;

wherein, k=1, 2, 3, . . . , and k is smaller than or equal to (N-2)/2.

6. The display driving method according to claim 2, wherein a duration of the each row of sub-pixels being in the on-state is six times the unit scanning time, a duration of the pre-charging period is four times the unit scanning time, and start and end times of time periods during which two adjacent rows of sub-pixels are in the on-state differ by the unit scanning time;

the display driving method comprises:

during a charging period of a (6k-5)-th row of sub-pixels, applying a (6k-5)-th row of data signals to the (6k-5)-th row of sub-pixels;

during a last one unit scanning time of a pre-charging period of a (6k-4)-th row of sub-pixels and a first half of a charging period of the (6k-4)-th row of sub-pixels, applying the (6k-5)-th row of data signals to the (6k-4)-th row of sub-pixels; and during a second half of the charging period of the (6k-4)-th row of sub-pixels, applying a (6k-3)-th row of data signals to the (6k-4)-th row of sub-pixels;

during last two unit scanning times of a pre-charging period of a (6k-3)-th row of sub-pixels, applying the (6k-5)-th row of data signals to the (6k-3)-th row of sub-pixels; and during a charging period of the (6k-3)-th row of sub-pixels, applying a (6k-3)-th row of data signals to the (6k-3)-th row of sub-pixels;

during middle two unit scanning times of a pre-charging period of a (6k-2)-th row of sub-pixels, applying the (6k-5)-th row of data signals to the (6k-2)-th row of sub-pixels; during a last one unit scanning time of the pre-charging period of the (6k-2)-th row of sub-pixels and a first half of a charging period of the (6k-2)-th row of sub-pixels, applying the (6k-3)-th row of data signals to the (6k-2)-th row of sub-pixels; and during a second half of the charging period of the (6k-2)-th row of sub-pixels, applying a (6k-1)-th row of data signals to the (6k-2)-th row of sub-pixels;

during first two unit scanning times of a pre-charging period of a (6k-1)-th row of sub-pixels, applying the (6k-5)-th row of data signals to the (6k-1)-th row of sub-pixels; during last two unit scanning times of the pre-charging period of the (6k-1)-th row of sub-pixels, applying the (6k-3)-th row of data signals to the (6k-1)-th row of sub-pixels; and during a charging period of the (6k-1)-th row of sub-pixels, applying the (6k-1)-th row of data signals to the (6k-1)-th row of sub-pixels;

during a first one unit scanning time of a pre-charging period of a 6k-th row of sub-pixels, applying the (6k-5)-th row of data signals to the 6k-th row of sub-pixels; during middle two unit scanning times of the pre-charging period of the 6k-th row of sub-pixels, applying the (6k-3)-th row of data signals to the 6k-th row of sub-pixels; during a last one unit scanning time of the pre-charging period of the 6k-th row of sub-pixels and a first half of a charging period of the 6k-th row of sub-pixels, applying the (6k-1)-th row of data signals to the 6k-th row of sub-pixels; and during a second half of the charging period of the 6k-th row of sub-pixels, applying a (6k+1)-th row of data signals to the 6k-th row of sub-pixels;

during first two unit scanning times of a pre-charging period of a (6k+1)-th row of sub-pixels, applying the (6k-3)-th row of data signals to the (6k+1)-th row of sub-pixels; during last two unit scanning times of the pre-charging period of the (6k+1)-th row of sub-pixels, applying the (6k-1)-th row of data signals to the (6k+1)-th row of sub-pixels; and during a charging period of the (6k+1)-th row of sub-pixels, applying the (6k+1)-th row of data signals to the (6k+1)-th row of sub-pixels;

during a first one unit scanning time of a pre-charging period of a (6k+2)-th row of sub-pixels, applying the (6k-3)-th row of data signals to the (6k+2)-th row of sub-pixels; during middle two unit scanning times of the pre-charging period of the (6k+2)-th row of sub-pixels, applying the (6k-1)-th row of data signals to the (6k+2)-th row of sub-pixels; during a last one unit scanning time of the pre-charging period of the (6k+2)-th row of sub-pixels and a first half of a charging period of the (6k+2)-th row of sub-pixels, applying the (6k+1)-th row of data signals to the (6k+2)-th row of sub-pixels; and during a second half of the charging period of the (6k+2)-th row of sub-pixels, applying a (6k+3)-th row of data signals to the (6k+2)-th row of sub-pixels;

during first two unit scanning times of a pre-charging period of a (6k+3)-th row of sub-pixels, applying the (6k-1)-th row of data signals to the (6k+3)-th row of sub-pixels; during last two unit scanning times of the pre-charging period of the (6k+3)-th row of sub-pixels, applying the (6k+1)-th row of data signals to the (6k+3)-th row of sub-pixels; and during a charging period of the (6k+3)-th row of sub-pixels, applying the (6k+3)-th row of data signals to the (6k+3)-th row of sub-pixels;

during a first one unit scanning time of a pre-charging period of a (6k+4)-th row of sub-pixels, applying the (6k-1)-th row of data signals to the (6k+4)-th row of sub-pixels; during middle two unit scanning times of the pre-charging period of the (6k+4)-th row of sub-pixels, applying the (6k+1)-th row of data signals to the (6k+4)-th row of sub-pixels; during a last one unit scanning time of the pre-charging period of the (6k+4)-th row of sub-pixels and a first half of a charging period of the (6k+4)-th row of sub-pixels, applying the (6k+3)-th row of data signals to the (6k+4)-th row of sub-pixels; and during a second half of the charging period of the (6k+4)-th row of sub-pixels, applying a (6k+5)-th row of data signals to the (6k+4)-th row of sub-pixels;

wherein, k=1, 2, 3, . . . , and k is smaller than or equal to (N-5)/2.

7. The display driving method according to claim 1, wherein, during a first time period, a n-th row of sub-pixels and a (n+1)-th row of sub-pixels are simultaneously turned on, where n is an integer, and 1≤n≤N-1;

during a second time period, a (n+2)-th row of sub-pixels and a (n+3)-th row of sub-pixels are simultaneously turned on, and data signals are applied to the n-th row of sub-pixels and the (n+1)-th row of sub-pixels, and a length of the second time period is greater than or equal to twice the unit scanning time, wherein lengths of the first time period and the second time period are both equal to twice the unit scanning time.

8. The display driving method according to claim 7, wherein applying the data signals to the n-th row of sub-pixels and the (n+1)-th row of sub-pixels comprises:

applying one of a n-th row of data signals and a (n+1)-th row of data signals to the n-th row of sub-pixels and the (n+1)-th row of sub-pixels.

9. The display driving method according to claim 7, wherein the second time period comprises a first sub-period and a second sub-period, and applying the data signals to the n-th row of sub-pixels and the (n+1)-th row of sub-pixels comprises:

during the first sub-period of the second time period, applying a n-th row of data signals to the n-th row of sub-pixels and the (n+1)-th row of sub-pixels; and during the second sub-period of the second time period, applying a (n+1)-th row of data signals to the n-th row of sub-pixels and the (n+1)-th row of sub-pixels.

10. The display driving method according to claim 1, wherein, during a first time period, a n-th row of sub-pixels and a (n+1)-th row of sub-pixels are sequentially turned on, where n is an integer, and 1<n<N-3;

during a second time period, a (n+2)-th row of sub-pixels and a (n+3)-th row of sub-pixels are sequentially turned on, and one of a n-th row of data signals and a (n+1)-th row of data signals are applied to the n-th row of sub-pixels and the (n+1)-th row of sub-pixels, wherein a length of the second time period is greater than or equal to twice the unit scanning time;

during a third time period, the n-th row of sub-pixels are turned off, and one of a (n+2)-th row of data signals and a (n+3)-th row of data signals are applied to the (n+1)-th row of sub-pixels, the (n+2)-th row of sub-pixels, and the (n+3)-th row of sub-pixels, wherein lengths of the first time period and the second time period are both equal to twice the unit scanning time, and a length of the third time period is equal to the unit scanning time.

11. A display driving method, comprising:

in a first frame, scanning a plurality of sub-pixels arranged in an N×M array by progressive scanning or interlaced scanning in an interval of at least one row, so as to turn on each row of sub-pixels that are scanned, such that two adjacent rows of sub-pixels that are sequentially turned on are simultaneously in an on-state for a duration greater than or equal to twice a unit scanning time; and applying data signals to the each row of sub-pixels that are turned on, such that at least a portion of sub-pixels in the plurality of sub-pixels are applied with data signals for a duration greater than the unit scanning time, the unit scanning time is a time required to scan one row of sub-pixels, wherein N and M are both integers greater than 1; and in a second frame, scanning the plurality of sub-pixels arranged in the N×M array by progressive scanning or interlaced scanning in an interval of at least one row, so as to turn on each row of sub-pixels that are scanned, such that two adjacent rows of sub-pixels that are sequentially turned on are simultaneously in an on-state for a duration greater than or equal to twice the unit scanning time; and applying data signals to the each row of sub-pixels that are turned on, such that another portion of sub-pixels in the plurality of sub-pixels are applied with data signals for a duration greater than the unit scanning time.

12. The display driving method of claim 11, wherein a time period of the each row of sub-pixels being in the on-state comprises a charging period and a pre-charging period before the charging period, wherein a duration of the charging period is equal to twice the unit scanning time, and a duration of the pre-charging period is greater than or equal to the unit scanning time.

13. The display driving method according to claim 11, wherein, in the first frame, the plurality of sub-pixels are scanned one odd-numbered row by one odd-numbered row to turn on each odd-numbered row of sub-pixels that are scanned, such that two adjacent odd-numbered rows of sub-pixels are simultaneously in the on-state for a duration greater than or equal to twice the unit scanning time; and data signals are applied to each odd-numbered row of sub-pixels that are turned on, such that the odd-numbered row of sub-pixels are applied with data signals for a duration greater than or equal to twice the unit scanning time; and in the second frame, the plurality of sub-pixels are scanned one even-numbered row by one even-numbered row to turn on each even-numbered row of sub-pixels that are scanned, such that two adjacent even-numbered rows of sub-pixels are simultaneously in the on-state for a duration greater than or equal to twice the unit scanning time; and data signals are applied to each even-numbered row of sub-pixels that are turned on, such that the even-numbered row of sub-pixels are applied with data signals for a duration greater than or equal to twice the unit scanning time.

14. The display driving method according to claim 11, wherein, in the first frame, the plurality of sub-pixels are scanned by progressive scanning, so as to turn on each row of sub-pixels that are scanned, such that two adjacent rows of sub-pixels are simultaneously in the on-state for a duration greater than twice the unit scanning time; and data signals are applied to each row of sub-pixels that are turned on, such that an odd-numbered row of sub-pixels are applied with data signals for a duration greater than the unit scanning time, and an even-numbered row of sub-pixels are applied with data signals for a duration less than the unit scanning time; and in the second frame, the plurality of sub-pixels are scanned by progressive scanning, so as to turn on each row of sub-pixels that are scanned, such that two adjacent rows of sub-pixels are simultaneously in the on-state for a duration greater than twice the unit scanning time; and data signals are applied to each row of sub-pixels that are turned on, such that an even-numbered row of sub-pixels are applied with data signals for a duration greater than the unit scanning time, and an odd-numbered row of sub-pixels are applied with data signals for a duration less than the unit scanning time.

15. The display driving method according to claim 13, wherein, in a first time period of the first frame, a (2k-1)-th row of sub-pixels are turned on, wherein k is an integer, and $1<k<(N-2)/2$;

in a second time period of the first frame, a (2k+1)-th row of sub-pixels are turned on, and a (2k-1)-th row of data signals are applied to the (2k-1)-th row of sub-pixels, wherein a length of the second time period of the first frame is greater than or equal to twice the unit scanning time.

16. The display driving method according to claim 13, wherein, in a first time period of the first frame, a (2k-1)-th row of sub-pixels are turned on, wherein k is an integer, and $1<k<(N-2)/2$;

in a second time period of the first frame, a (2k-1)-th row of data signals are applied to the (2k-1)-th row of sub-pixels;

in a third time period of the first frame, a (2k+1)-th row of sub-pixels are turned on, and the (2k-1)-th row of data signals are continuously applied to the (2k-1)-th row of sub-pixels;

in a fourth time period of the first frame, a (2k+1)-th row of data signals are applied to the (2k-1)-th row of sub-pixels and the (2k+1)-th row of sub-pixels.

17. The display driving method according to claim 14, wherein, in a first time period of the first frame, a n-th row of sub-pixels and a (n+1)-th row of sub-pixels are sequentially turned on, wherein n is an integer, and $1<n<N$-1;

in a second time period of the first frame, a n-th row of data signals are applied to the n-th row of sub-pixels;

in a third time period of the first frame, a (n+1)-th row of data signals are applied to the (n+1)-th row of sub-pixels, a length of the second time period of the first frame is greater than the unit scanning time, and a length of the third time period of the first frame is less than the unit scanning time, and a sum of the length of the second time period and the length of the third time period of the first frame is greater than or equal to twice the unit scanning time.

18. The display driving method according to claim 13, wherein, in the first frame, applying the data signals to the each odd-numbered row of sub-pixels that are turned on comprises: for M sub-pixels in each odd-numbered row that are turned on, applying data signals to sub-pixels located in a (2a-1)-th column and a 2a-th column, wherein a is an odd number, and $1<2a-1<M$;

in the second frame, applying the data signals to the each even-numbered row of sub-pixels that are turned on comprises: for M sub-pixels in each even-numbered row that are turned on, applying data signals to sub-pixels located in a 2b-th column and a (2b+1)-th column, wherein b is an even number, and $2<2b<M$.

19. A display device, comprising:

a plurality of sub-pixels arranged in an N×M array, wherein N and M are both integers greater than 1;

a gate driving circuit, connected to the plurality of sub-pixels, and the gate driving circuit is configured to scan the plurality of sub-pixels one row by one row, or multiple rows by multiple rows, so as to turn on each row of sub-pixels that are scanned, such that two adjacent rows of sub-pixels are simultaneously in an on-state for a duration greater than twice a unit scanning time, the unit scanning time is a time required to scan one row of sub-pixels; and a source driving circuit, connected to the plurality of sub-pixels, the source driving circuit is configured to apply data signals to at least two rows of sub-pixels that are simultaneously in the on-state, such that each row of sub-pixels are applied with data signals for a duration greater than the unit scanning time, wherein a duration of each row of sub-pixels being applied with data signals is greater than the unit scanning time; or a duration of a first row of sub-pixels being applied with data signals is equal to the unit scanning time, and a duration of each row of sub-pixels other than the first row of sub-pixels being applied with data signals is greater than the unit scanning time.

* * * * *